March 1, 1960  J. W. HOLDEMAN ET AL  2,926,543
TRANSMISSION CONTROLS
Filed Nov. 17, 1955  15 Sheets-Sheet 14

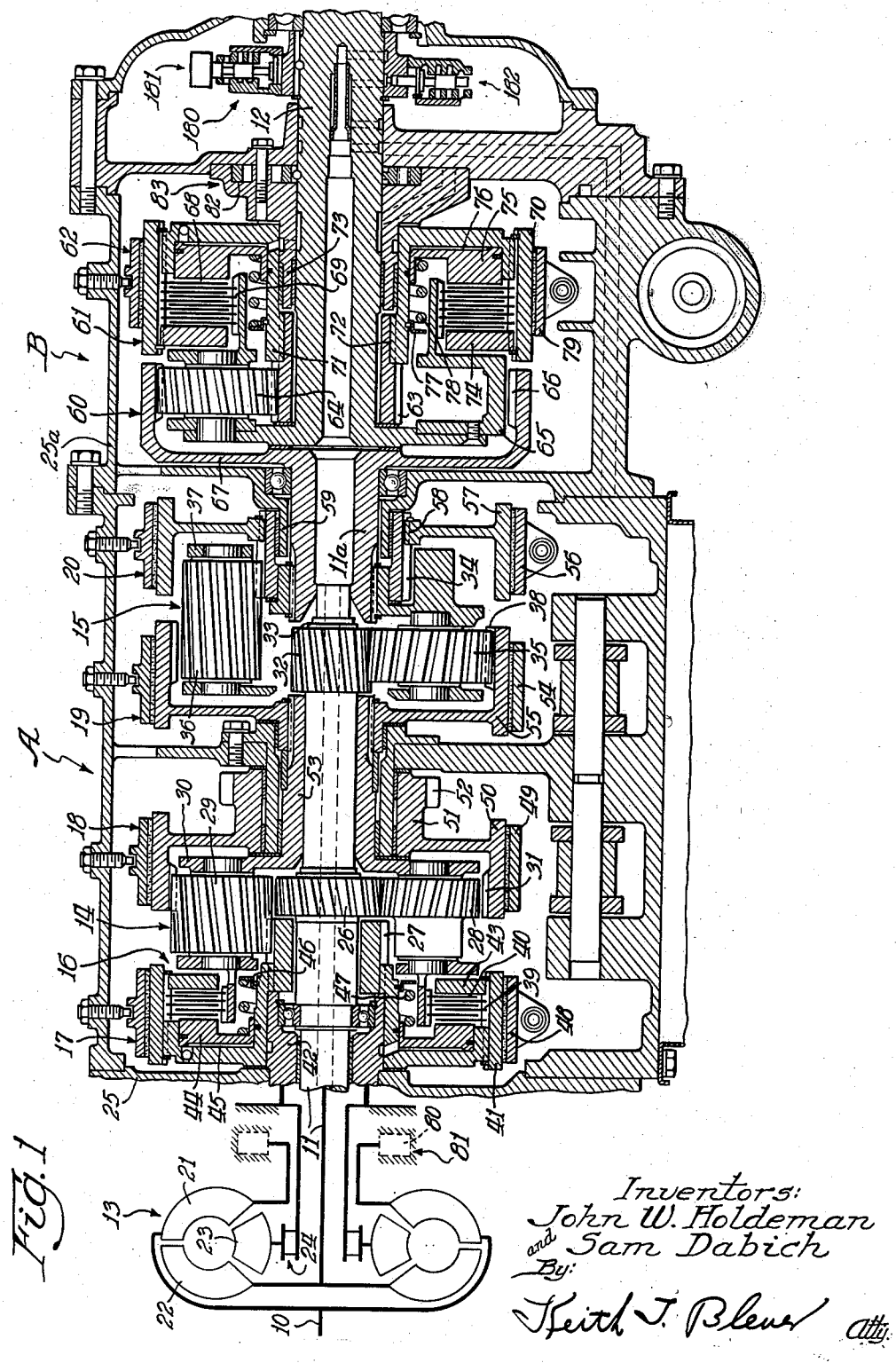

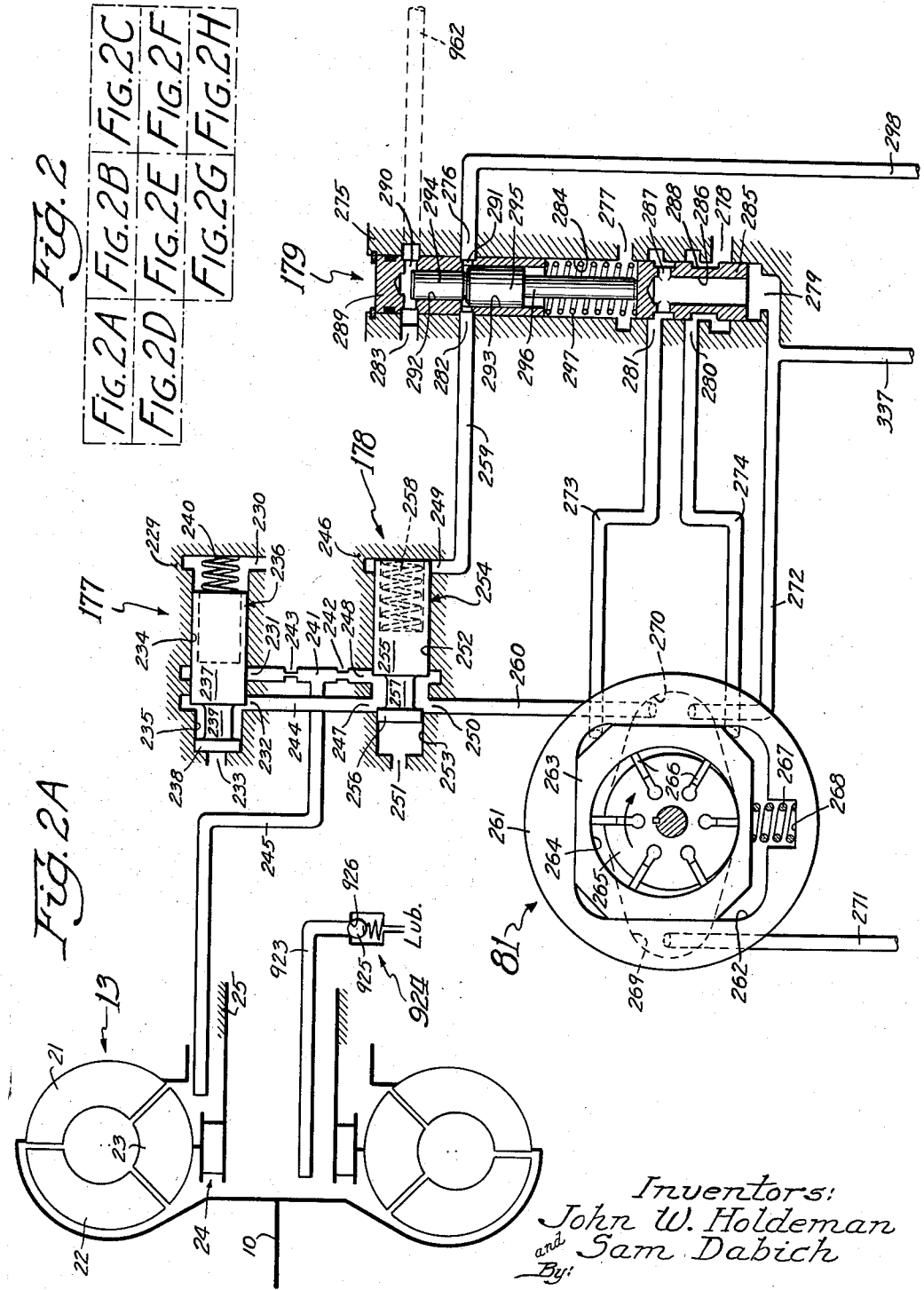

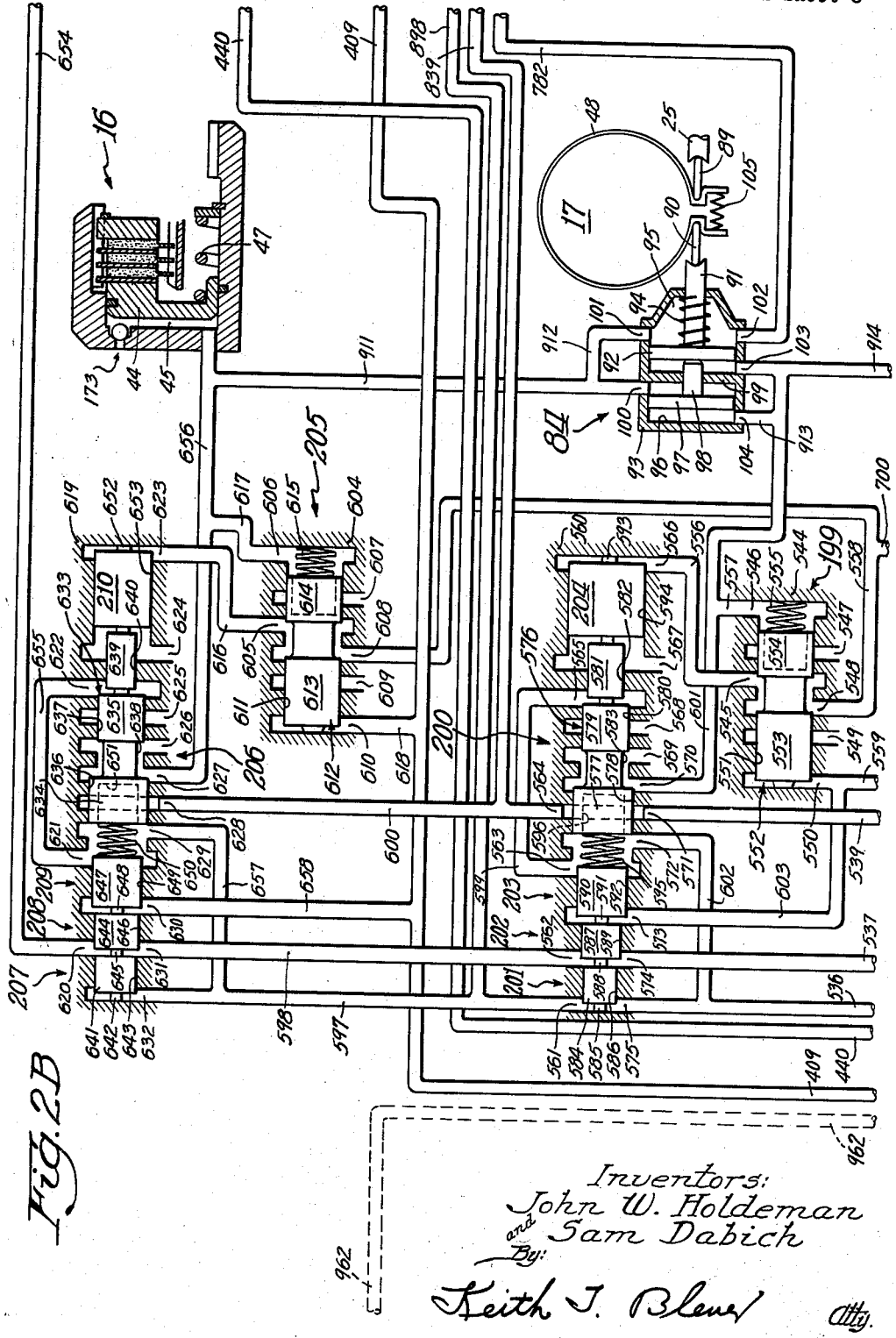

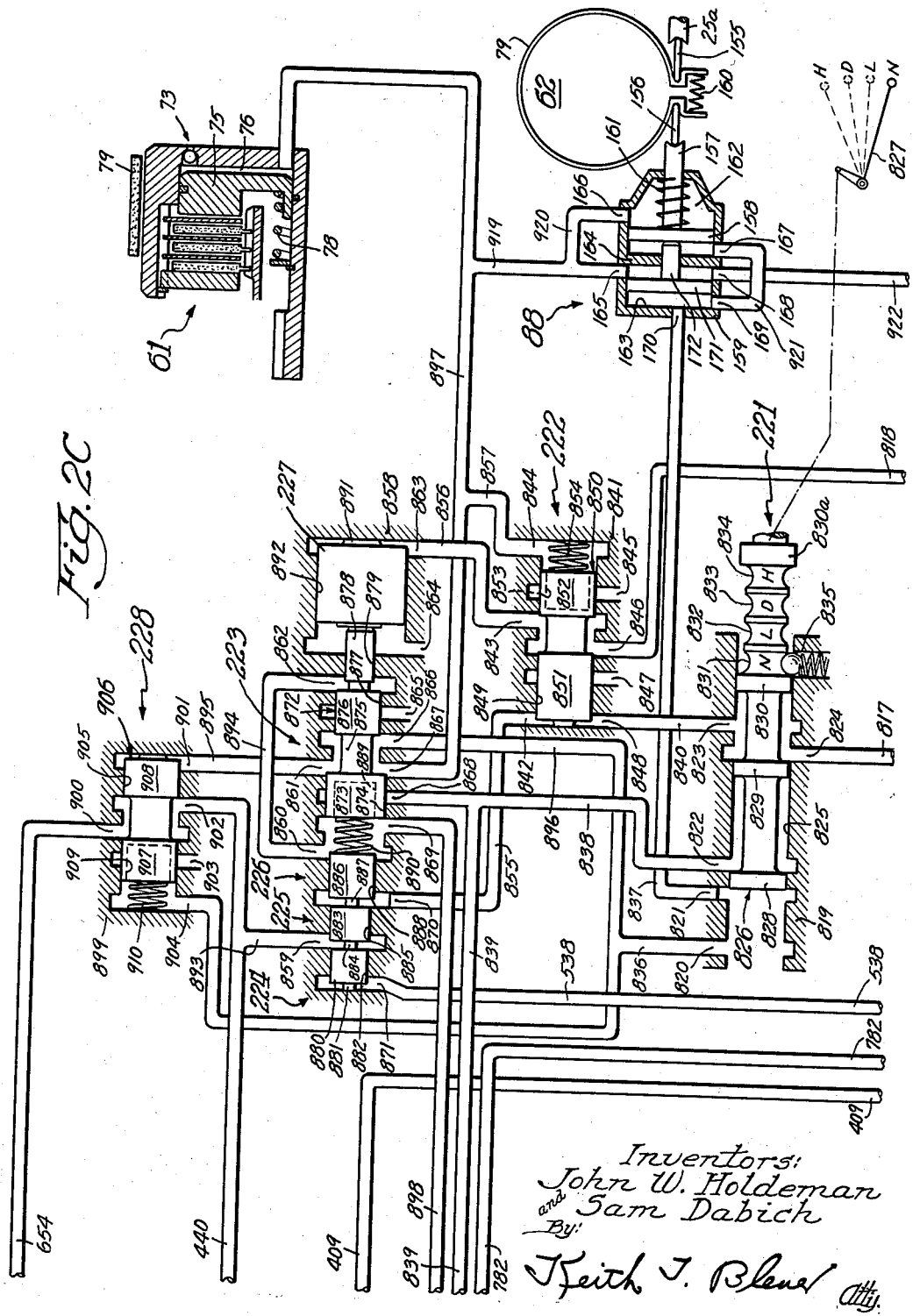

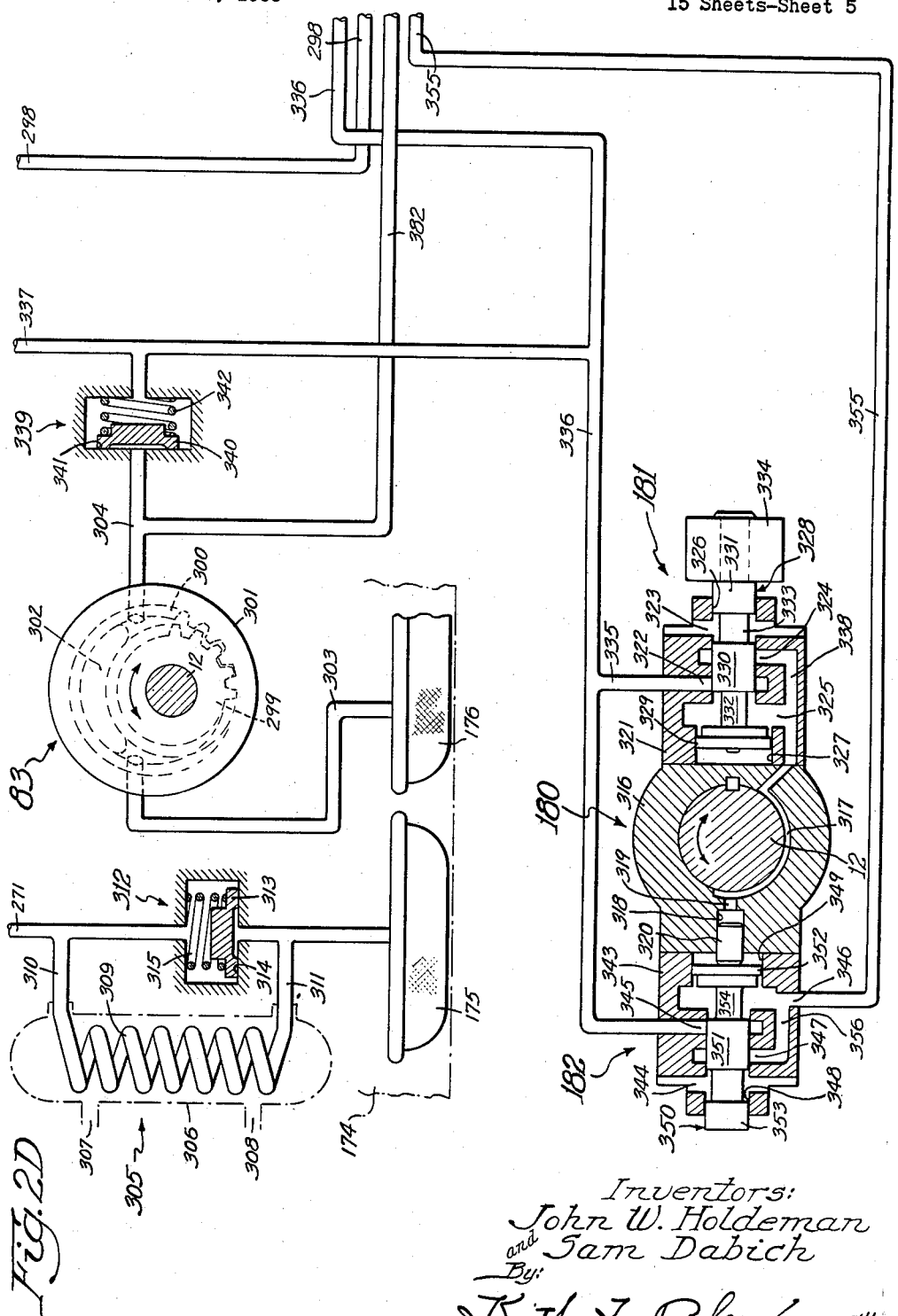

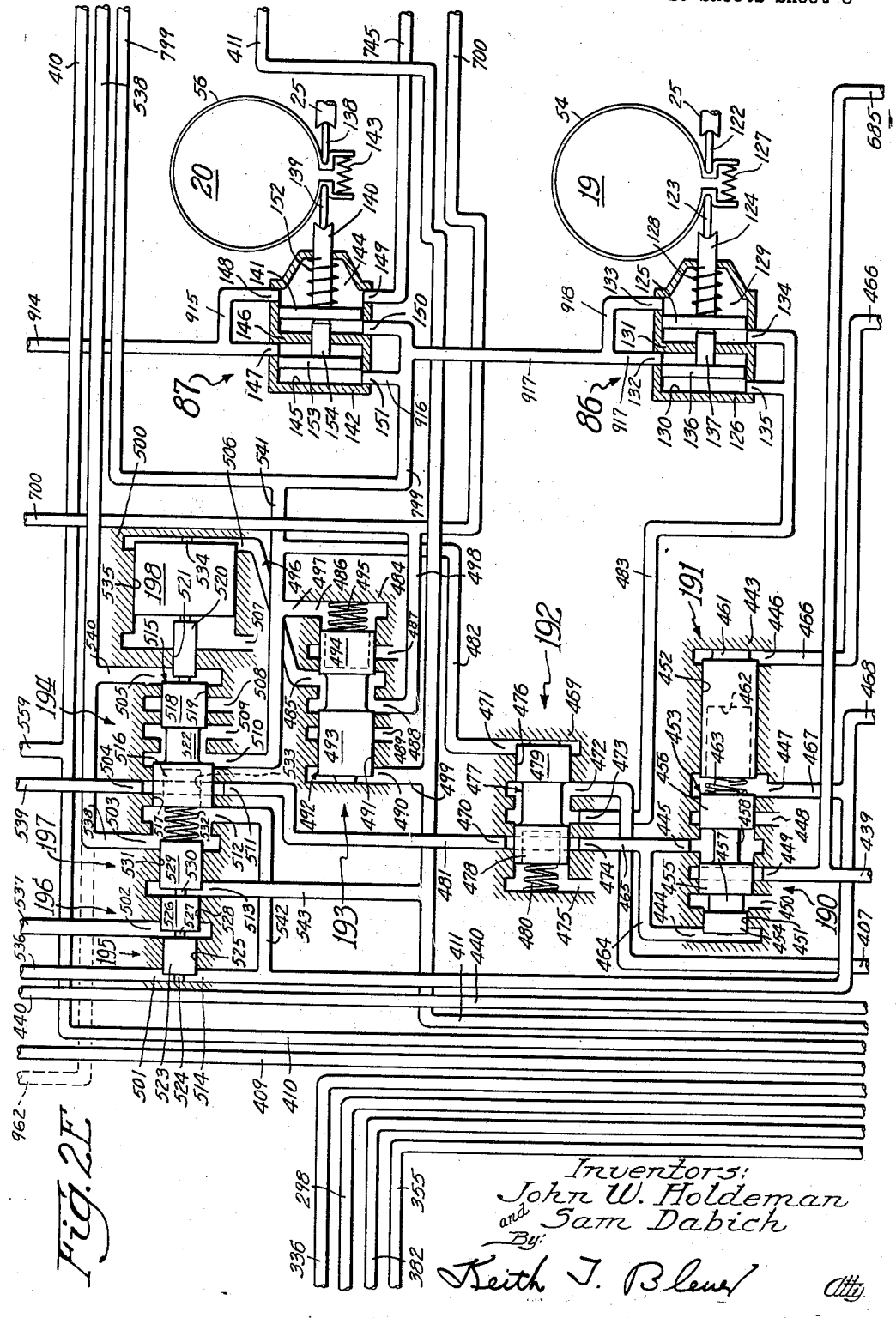

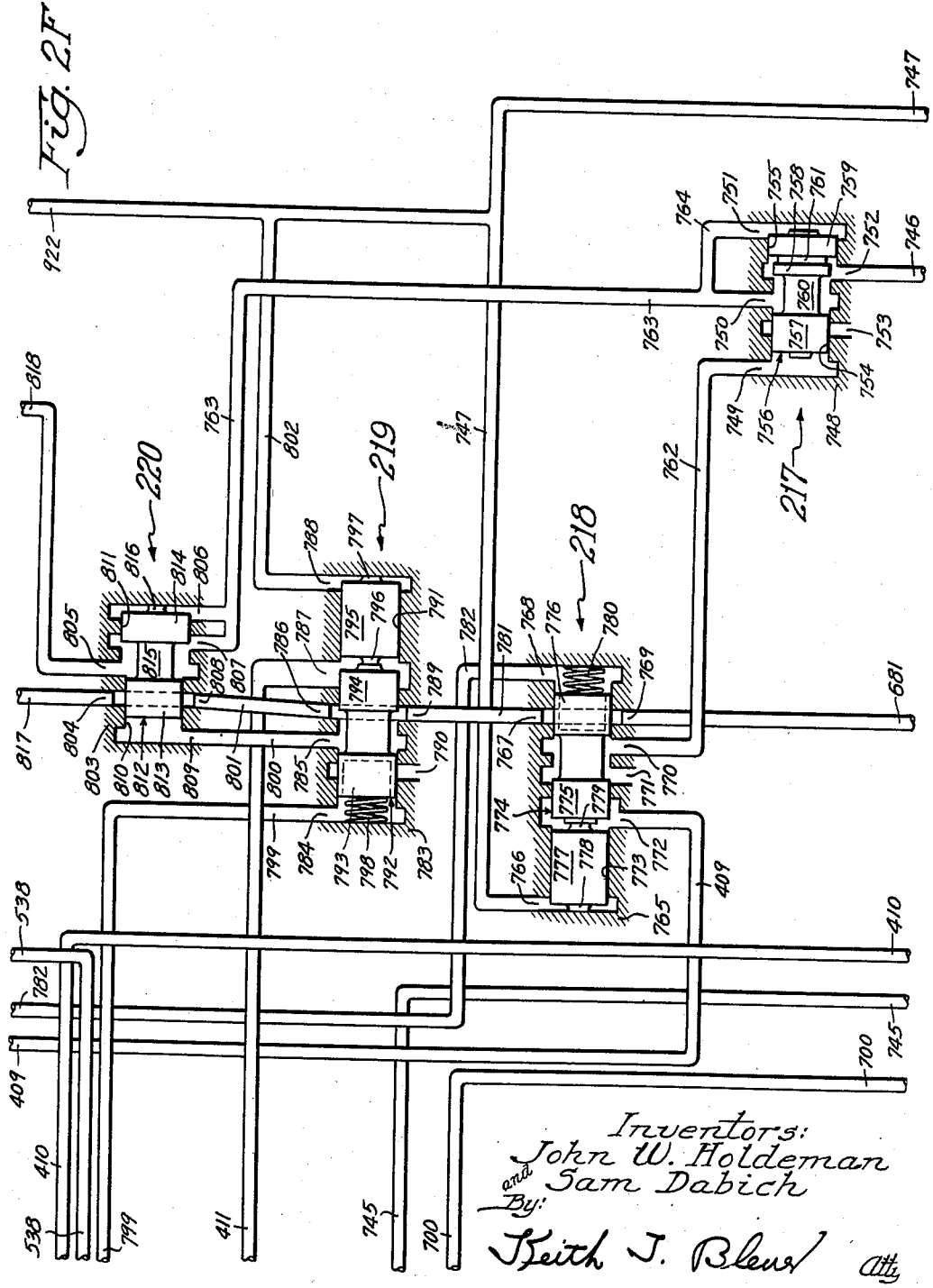

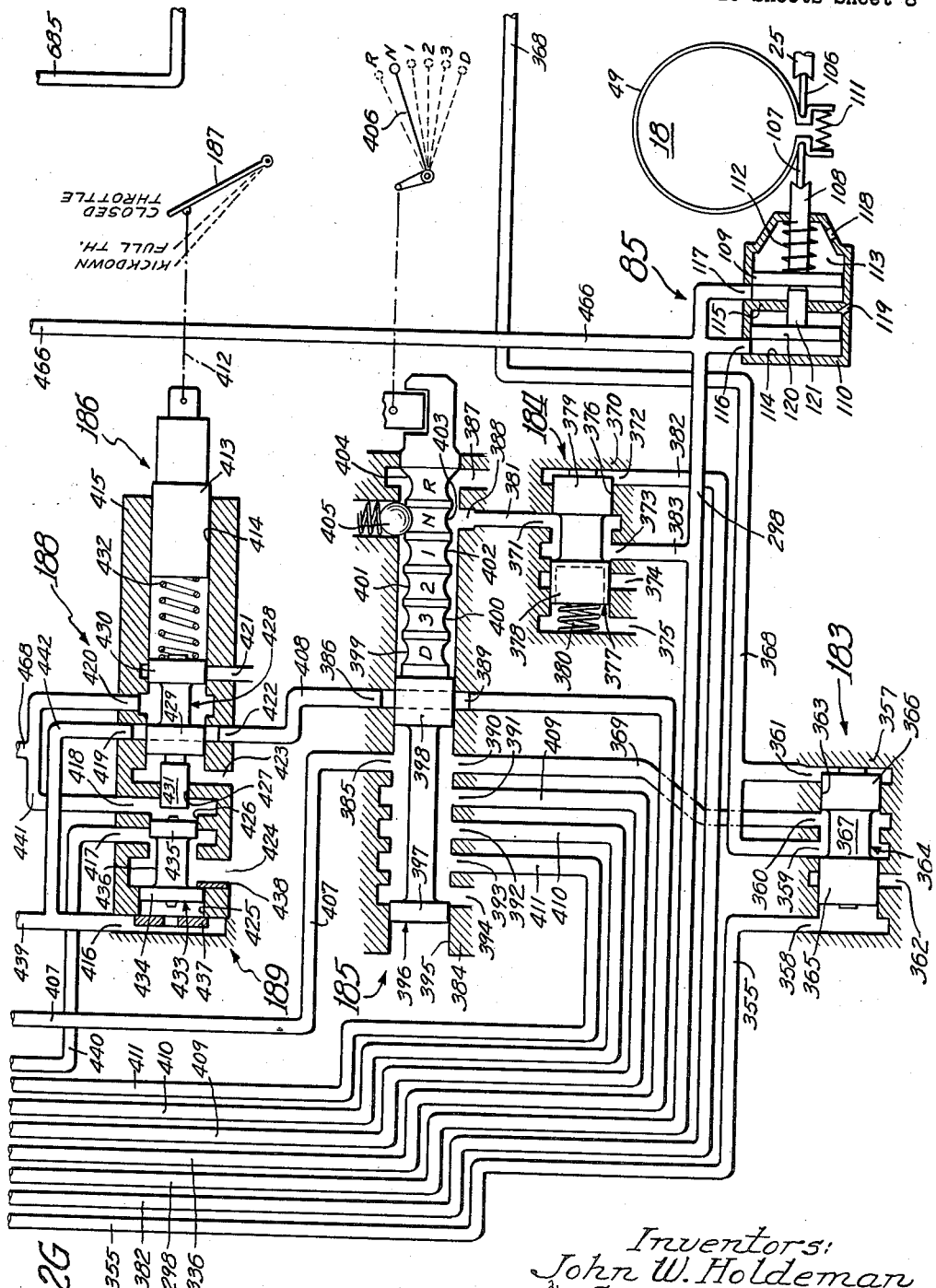

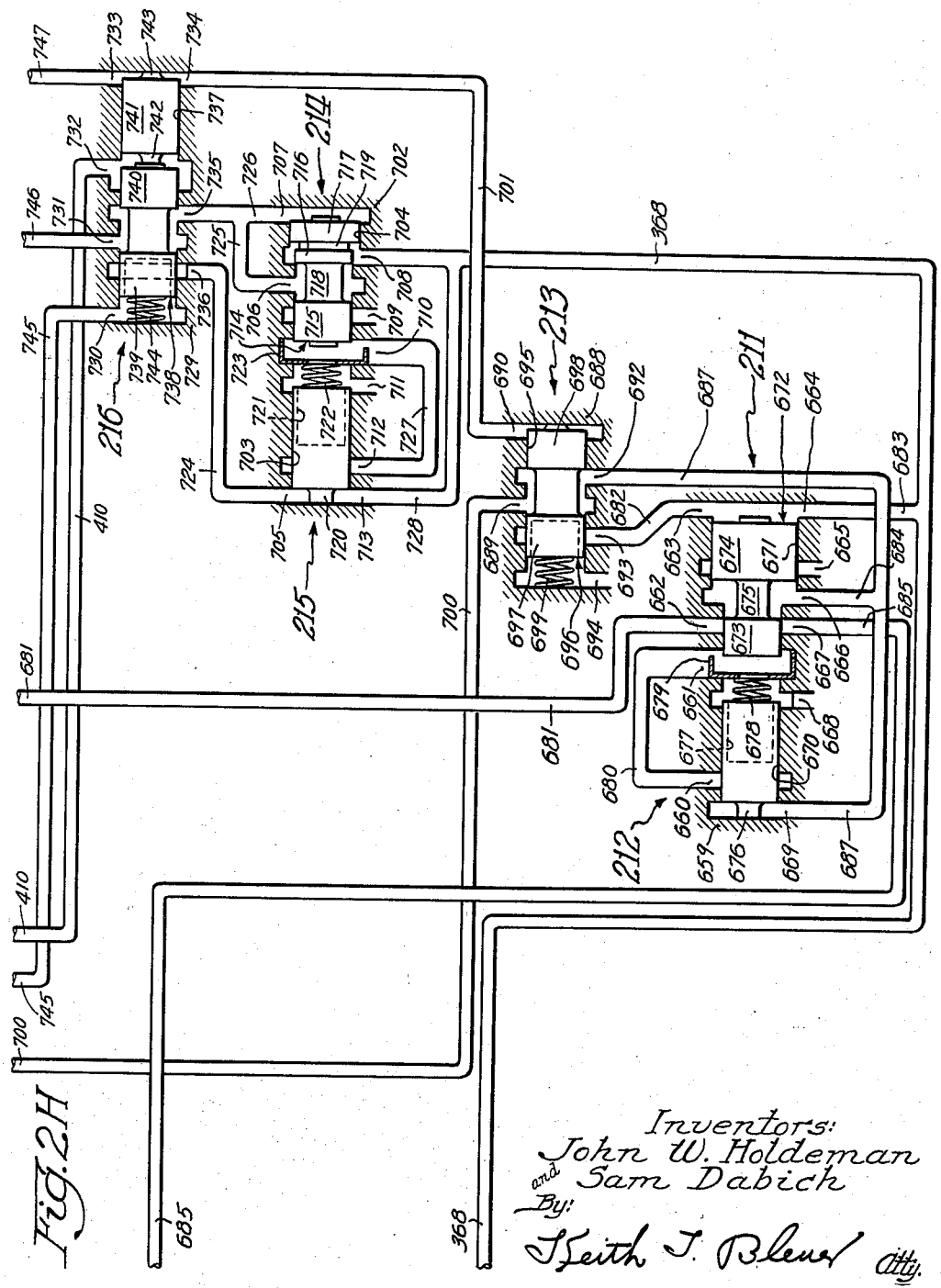

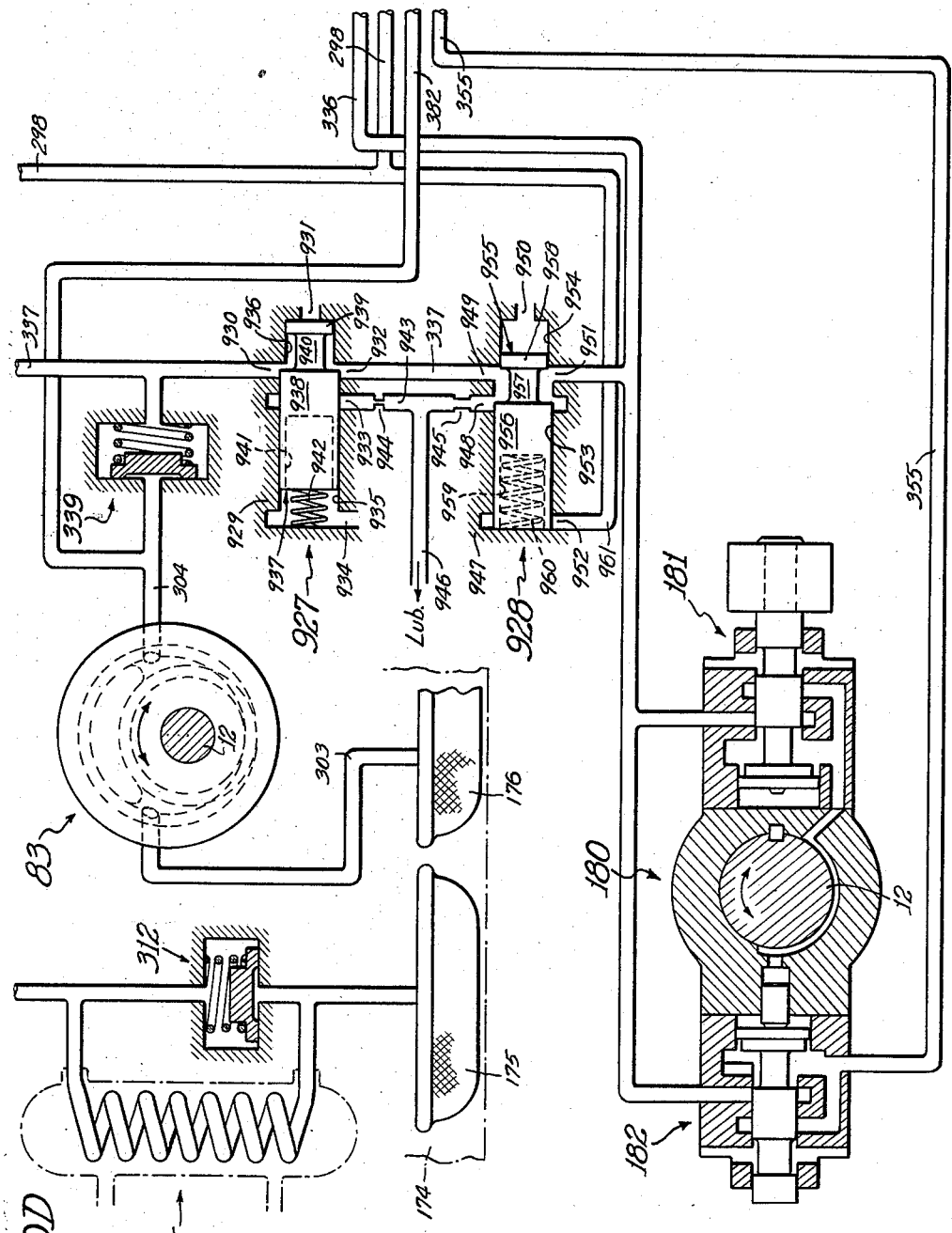

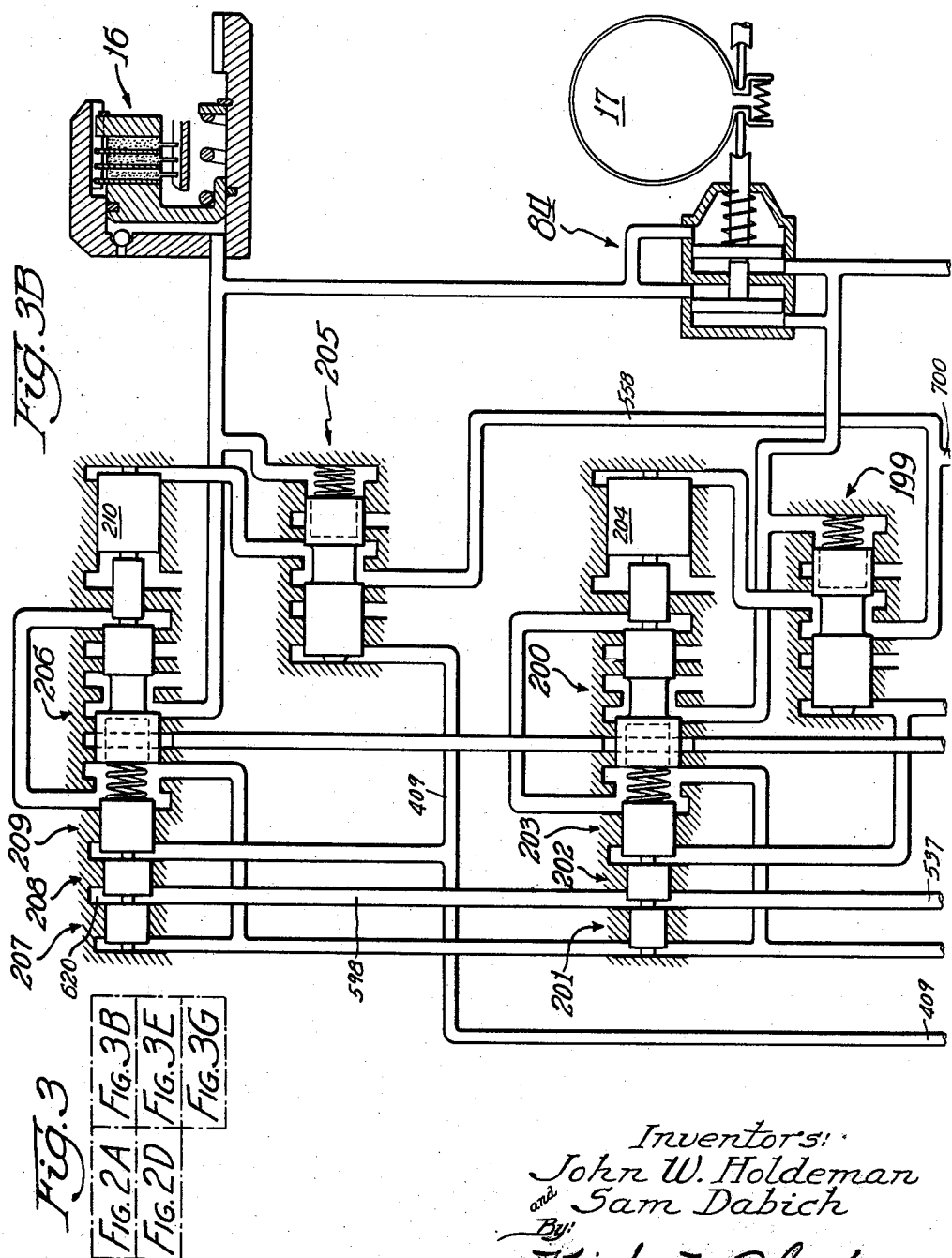

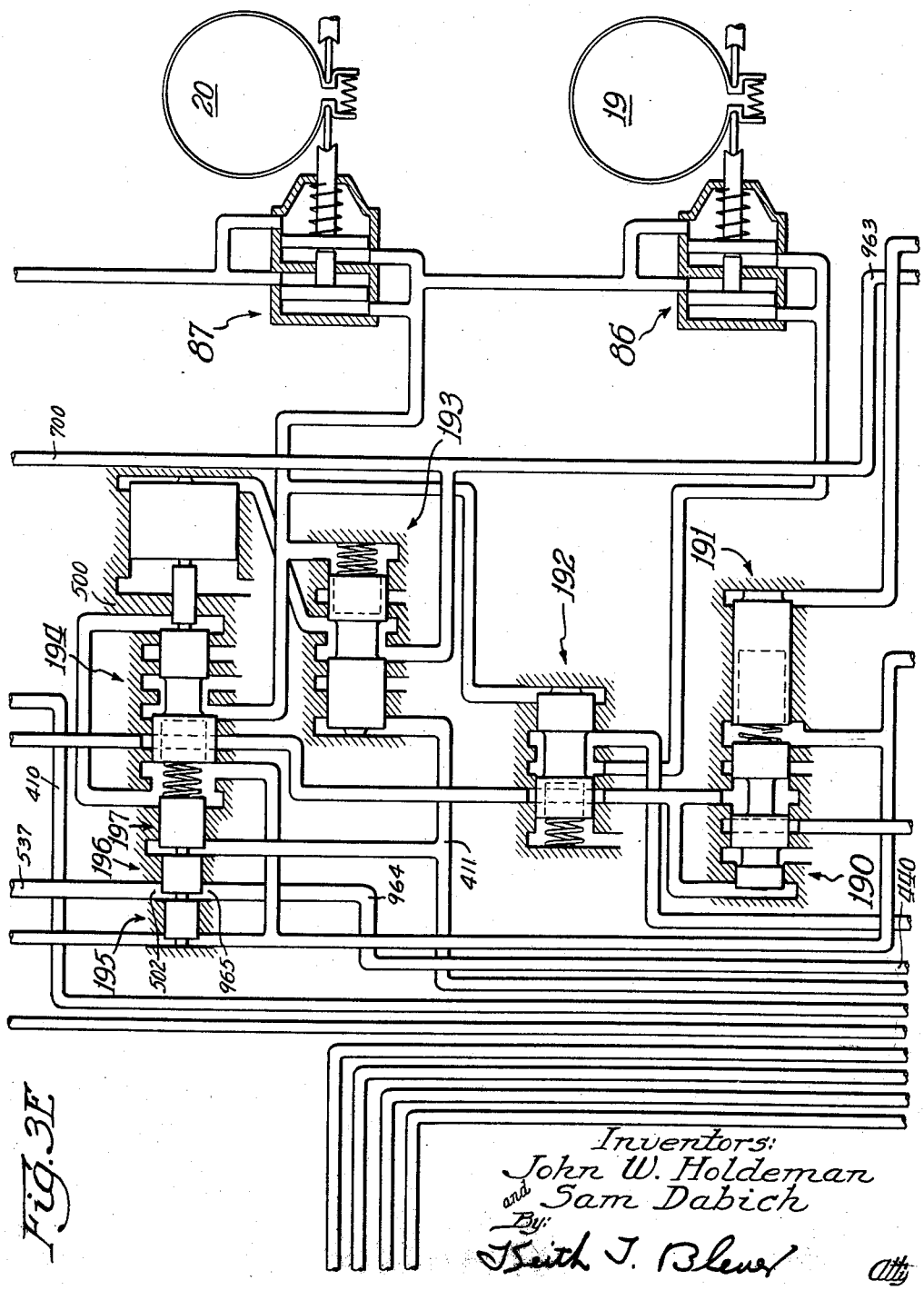

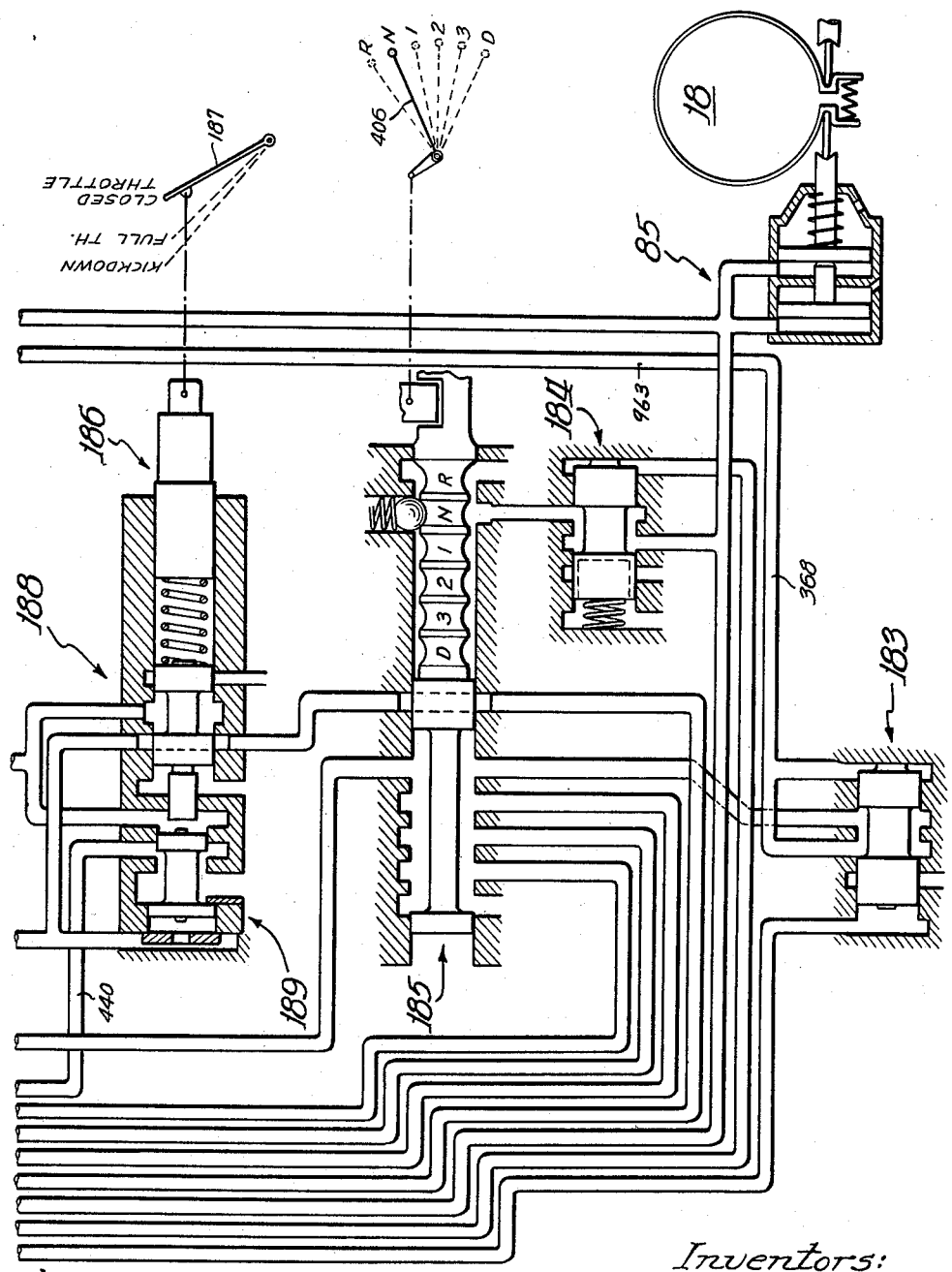

Fig. 4

| TRANS. SELECTOR | | D | D | 3 | 3 | 2 | 2 | 1 | D | D |
|---|---|---|---|---|---|---|---|---|---|---|
| SPLITTER SELEC. | | D | D | D | D | D | D | D | LOW | HIGH |
| THROTTLE POS'N. | | PART TO FULL | K.D. | PART TO FULL | K.D. | PART TO FULL | K.D. | ANY | ANY | ANY |
| 1ST LOW | 6.76:1 | x x | x x | x x | x x | x x | x x | x | x x | |
| 1ST HIGH | 5.00:1 | | x | | x | | x | | x | x x |
| 2ND LOW | 3.91:1 | x | x x | x | x x | x | x x | x x | x x | |
| 2ND HIGH | 2.89:1 | x | | x | | x | | x | | x x |
| 3RD LOW | 2.32:1 | x | x x | x | x x | | | | x x | |
| 3RD HIGH | 1.71:1 | x | | x | | | | | | x x |
| 4TH LOW | 1.35:1 | x | x | | | | | | x | |
| 4TH HIGH | 1.00:1 | x | x | | | | | | | x |

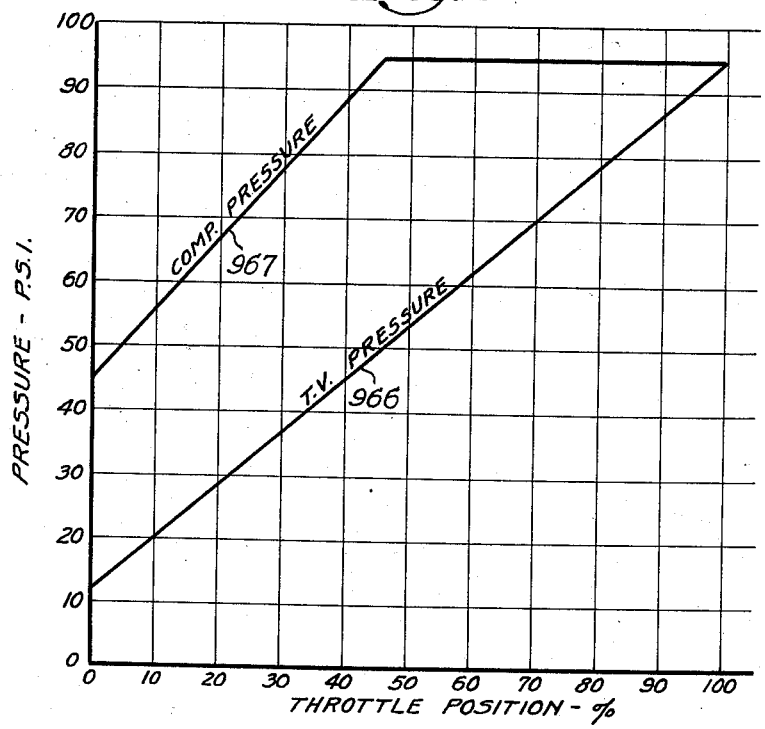

Fig. 5

Inventors:
John W. Holdeman
and Sam Dabich
By: Keith T. Bleuer Atty.

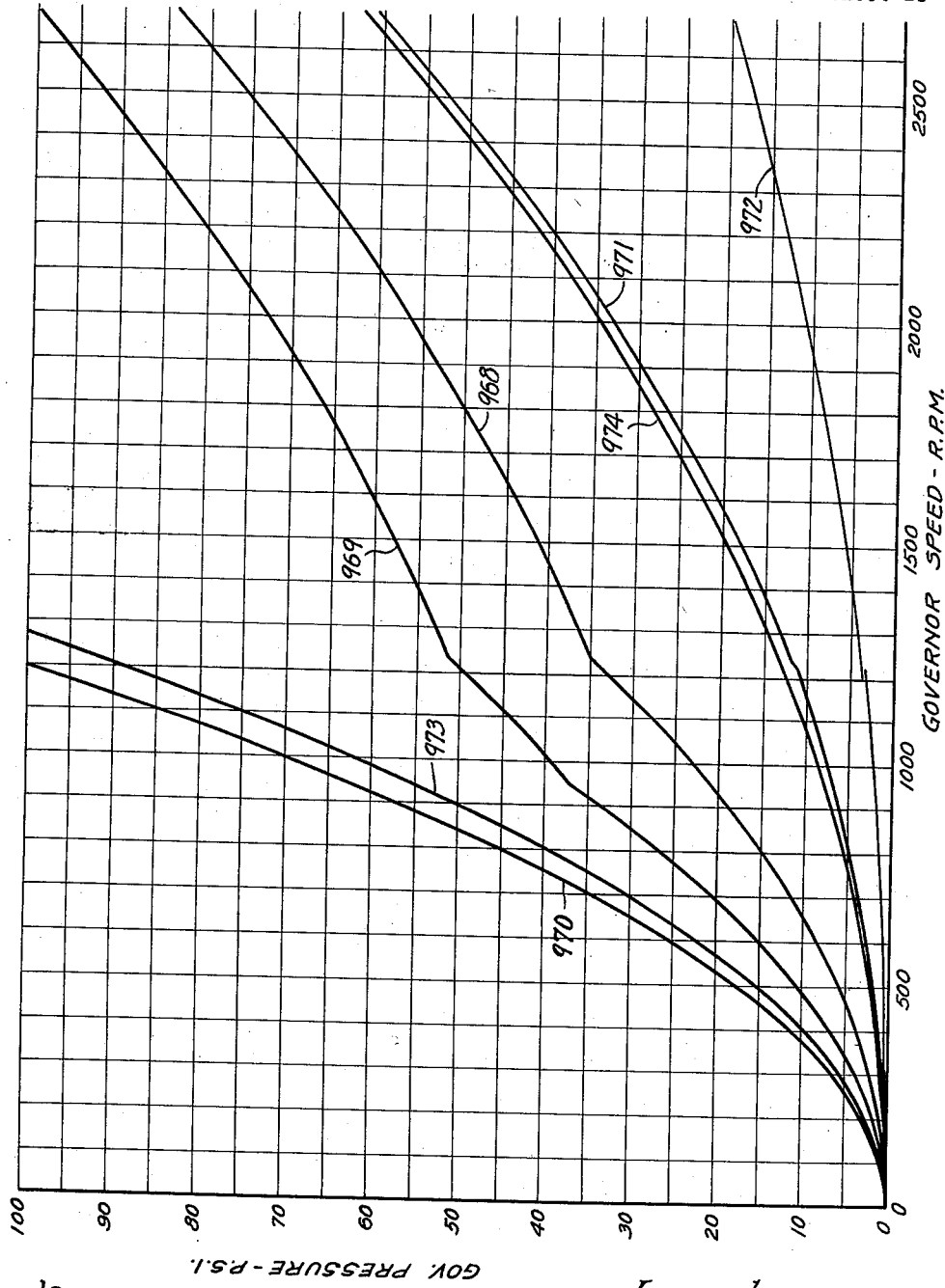

United States Patent Office 2,926,543
Patented Mar. 1, 1960

2,926,543

TRANSMISSION CONTROLS

John W. Holdeman and Sam Dabich, Detroit, Mich., assignors to Borg-Warner Corporation, Chicago, Ill., a corporation of Illinois Application November 17, 1955, Serial No. 547,478

30 Claims. (Cl. 74—472)

Our invention relates to transmissions for automotive vehicles, particularly heavy vehicles such as trucks or the like. More particularly our invention relates to automatic controls for such transmissions.

It is an object of the invention to provide controls of the hydraulic type for transmission gearing units connected in tandem between drive and driven shafts, the controls to be so constructed that ratio changes in the transmission units are coordinated. More particularly, it is an object to so construct the transmission controls that automatic ratio changes from lower to higher speed ratios are made first in a front gearing unit driven by the drive shaft of the transmission mechanism, and subsequently, after the front gearing unit is in its highest predetermined speed ratio, a rear gearing unit driven by the front unit and driving the driven shaft of the transmission is upshifted automatically into its highest speed ratio.

It is also an object to provide such automatic controls which includes a governor varying in speed with the vehicle and controlling the transmission units to cause upshifts in the manner just mentioned.

It is a further object of the invention to so arrange the controls that the governor on decreasing speeds of the vehicle will cause the front gearing unit to downshift automatically and complete its downshifting action into its lowest speed ratio and then subsequently cause the rear unit to automatically downshift to its lowest speed ratio.

It is also an object of the invention to so construct the automatic controls that they include the accelerator of the vehicle which may be moved into an open throttle kickdown position for changing the sequence of shifts made in the front and rear gearing units. It is contemplated that the upshifts shall be made in the same manner as just mentioned, namely, from the lowest to the highest speed ratio first in the front unit and then subsequently from the lowest to the highest speed ratio in the rear gearing unit. It is also contemplated that this accelerator kickdown control shall so affect the automatic controls that on decreasing speeds of the governor with the accelerator being in its kickdown position, the sequence of downshifting operation shall be changed, so that the rear unit shall first be downshifted under the control of the governor to its lowest speed ratio and then subsequently the front unit shall be downshifted from its highest speed ratio to its lowest speed ratio. Preferably, the front unit shall have three or more speed ratios and the rear unit shall have only two speed ratios, and the ratios in the two units are so arranged that when the rear unit is in its lower speed ratio, the resulting overall speed ratios between the driving and the driven shafts lies approximately midway between the resulting overall ratios between the shafts when the rear gearing unit is maintained in its higher speed ratio and the front unit is shifted between its ratios. Thus, the combination of the front and rear units connected in tandem provide a number of useable overall speed ratios equal to twice the number of speed ratios provided by the front unit alone, and shifting between all of these speed ratios may be selectively obtained simply by manipulating the accelerator.

It is an object of the invention to include a manually controlled selector in the automatic controls for the gearing units which is so arranged that the vehicle operator at his option may limit the upshifting action in the front gearing unit to any one of a number of the lower gear ratios provided by the front unit. It is contemplated that subsequently to such upshifting the governor will be effective to upshift the rear unit into its higher speed ratio, and on decreasing vehicle speeds the governor will first completely downshift the front unit and then the rear unit.

It is an object of the invention to provide governor control mechanism in the transmission controls which is effective to cause an upshifting of the rear gearing unit at vehicle speeds which progressively are greater as the selector is set progressively in positions allowing higher speed ratios to obtain in the front unit. In this connection, it is contemplated that the transmission controls shall preferably include regulating valves for providing governor pressures that vary with but are greater and less than the output governor pressure of a hydraulic governor driven in accordance with vehicle speed, and, that depending on the setting of the selector, these various governor pressures are selectively used for controlling an automatic upshift control valve for the rear gearing unit, for thus changing the vehicle speed at which an upshift is made in the rear gearing unit in accordance with the setting of the selector.

It is a further object of the invention to provide hydraulically operated control valves for causing the upshifting in the front gearing unit, all under the control of the hydraulic governor driven by the driven shaft of the transmission, and to provide hydraulic regulating means for providing a governor pressure that varies with the governor pressure from the hydraulic governor but is different therefrom and for selectively utilizing these two different governor pressures on the control valves depending on which speed ratio is effective in the rear gearing unit, so that a ratio change in the front unit is made substantially at the same input or engine speed for either of the speed ratios in the rear gearing unit.

It is an object of the invention to provide a hydraulically operated automatic shift valve having upshifted and downshifted positions for causing each of the drive changes in both front and rear gearing units, these control valves all having a governor pressure applied to them tending to move them into their upshifted positions, and to provide a pilot valve for each of these shift valves which may selectively be moved to block admission of the governor pressure to the respective shift valves. It is contemplated that each of these pilot valves may be moved into its blocking position by fluid pressure.

It is a further object to control the pilot valves for the automatic shift valves of the front gearing unit by means of the selector previously mentioned which preferably constitutes a valve. It is also an object to provide a selector effective only on the rear gearing unit, also preferably constituting a valve which is effective on the pilot valve for the automatic shift valve of the rear gearing unit, by means of which selector valve the rear gearing unit may selectively be maintained in its lower or higher drive ratio without change, or the automatic shift valve of the rear gear unit may be conditioned for operation so as to cause an upshift of the rear gearing unit under hydraulic governor control.

It is contemplated that preferably the automatic shift valves for the front gearing unit and the upshift valve for the rear gearing unit may be so connected with the hydraulic governor that the shift valves for the front gearing unit and then subsequently the shift valve for the rear gearing unit are progressively moved for first causing a complete upshifting action of the front gearing unit to take place to the highest ratio drive selected by the selector for the front gearing unit and then subsequently the rear unit shall be upshifted. It is also an object to provide interlock hydraulic connections between the automatic shift valve for providing the lowest upshift in the front gearing unit and the automatic shift valve for providing an upshift in the rear gearing unit, so that the latter automatic shift valve may not be effective to move from its upshifted position to its downshifted position until said automatic control valve for the front gearing unit has been moved into its downshifted position, whereby the downshifting action in the rear gearing unit occurs after the complete downshifting action in the front gearing unit has occurred.

It is also an object of the invention to provide an interlocking connection between the automatic shift valves for the front gearing unit and that for the rear gearing unit, so that, when the accelerator is moved to its open throttle kickdown position, it cannot be effective on the shift valves for the front gearing unit until the shift valve for the rear gearing unit has completed its movement from its upshifted to its downshifted position. In this connection, it is contemplated that the accelerator shall provide a throttle pressure that increases with engine throttle opening which pressure is applied to the various automatic shift valves tending to move them from their upshifted positions to their downshifted positions; and it is an object to provide an interlock valve, for preventing the application of this throttle pressure to the automatic shift valves for the front unit, under the control of the automatic shift valve for the rear unit blocking said application of the throttle pressure to the shift valves for the front unit until the shift valve for the rear unit has completed its movement to its downshifted position.

It is an object of the invention to provide a transmission mechanism having a plurality of forward speed ratio drives therethrough, each of which is completed by a hydraulically engaged friction engaging device, to engage the friction engaging device for the starting low speed power train with a fixed high hydraulic pressure, and to provide a pressure that is generally lower than this fixed pressure and that is controlled by the accelerator of the vehicle, so as to increase with the engine throttle opening, for engaging the other friction engaging devices for the subsequently completed higher ratio power trains, whereby to obtain a smooth completion of the subsequent power trains.

In connection with the friction engaging device for the starting low speed power train, it is an object to provide a piston with an apply side and a release side, the fixed high pressure being applied to the apply side and the variable pressure being subsequently applied to the release side for disengaging the brake and to provide a selector valve means in connection with the piston for relieving the fixed high pressure from the apply side of the piston and substituting therefore the variable pressure when the latter pressure is also applied to the release side of the piston.

It is also an object of the invention to provide a valve for cutting off the supply of governor pressure to the various automatic shift valves of the transmission mechanism when the selector control valve for the front unit is placed in a neutral or in a reverse drive position.

It is a further object of the invention to provide improved hydraulic means for supplying fluid from the transmission control system to a device requiring such fluid for its operation, such as to a hydraulic torque converter or to a lubrication system in the transmission. It is contemplated that the hydraulic pressure in the transmission control system shall be increased for a reverse drive for assuring continued engagement without slippage of a friction engaging device completing such reverse drive and that this improved fluid supply system shall include a large and a small fluid restriction, the small restriction being opened to the exclusion of the large restriction on such an increase in pressure for reverse drive and the large restriction being alone open for the lower pressures used in the control system for the forward drives.

It is also an object of the invention to provide a cooler for the fluid used in the hydraulic control system and to provide improved mechanism for by-passing fluid around this cooler when the fluid in the control system is relatively cold and viscous.

The invention consists of the novel constructions, arrangements and devices to be hereinafter described and claimed for carrying out the above-stated objects and such other objects as will be apparent from the following description of preferred forms of the invention, illustrated with reference to the accompanying drawings, in which:

Figure 1 is a view partially sectional and partially schematic of a transmission assembly comprising a front geared unit and a splitter connected in tandem therewith especially adapted for automatic operation by means of the hydraulic control system of this invention;

Figure 2 is a diagram showing the manner in which Figures 2A to 2H shall be placed together in order to form a showing of a complete hydraulic control system for the transmission assembly of Figure 1;

Figures 2A to 2H are illustrations of portions of the hydraulic control system which may be placed together as shown in Figure 2 to form an illustration of the complete control system;

Figure 2DD is an illustration of a modified portion of the control system which may be substituted for Figure 2D in the diagram of Figure 2 to illustrate a modified form of the control system;

Figure 3 is a diagram illustrating the manner in which Figures 2A, 2D, 3B, 3E and 3G may be placed together in order to form an illustration showing a complete hydraulic control system for the front gearing unit used without the splitter;

Figures 3B, 3E and 3G illustrate portions of the control system for the front gearing unit used alone;

Figure 4 is a diagram of the shift pattern of the transmission assembly illustrated in Figure 1 when automatically operated by means of the first embodiment of the hydraulic control system shown in Figures 2A to 2H;

Figure 5 is a graph showing curves illustrating the variations of the accelerator conscious pressures in the illustrated embodiments of the hydraulic control systems;

Figure 6 is a graph showing curves illustrating the variation of the governor variable pressures in the illustrated embodiments of the control system.

Like characters of reference designate like parts in the several views.

The hydraulic controls to be described are particularly adapted for use with a four speed transmission of the type described and claimed in the co-pending application of John W. Holdeman, Serial Number 488,534, filed February 16, 1955, or in a four speed transmission of the same general type, provided with auxiliary transmission units or splitters in tandem therewith, thereby enabling eight forward speeds to be obtained.

Referring now to Figure 1 of the drawings, there is illustrated a transmission assembly comprising a four speed gearing unit, generally indicated at A, and an auxiliary gearing unit or splitter, generally indicated at B, connected in tandem with the unit A. The assembly comprises an input shaft 10, a first intermediate drive shaft 11, a second intermediate drive shaft 11a and a driven shaft 12. The shafts are arranged co-axially, and the input shaft 10 is driven by the vehicle engine while the output shaft 12 is arranged, through suitable means, to drive the road wheels of the vehicle. We contemplate that the gearing unit A may be used without the auxiliary unit B, and in this case the shaft 11a constitutes the driven shaft which is connected to drive the road wheels of the vehicle. The unit A includes a hydraulic torque converter, generally indicated at 13, a first double pinion planetary gear set 14, a second double pinion planetary gear set 15, a multiple disc friction clutch 16, and four friction brakes 17, 18, 19 and 20.

The hydraulic torque converter 13 comprises a bladed impeller element 21 connected to be driven by the input shaft 10, a bladed turbine element 22, fixed with respect to the intermediate shaft 11, and a bladed stator element 23. The torque converter is constructed in accordance with well-known practice with the blades of the elements 21, 22 and 23 disposed in a common fluid circuit, so that when the impeller element 21 is driven, the turbine element is driven by means of the fluid which is circulated by rotation of the impeller element, and the stator element 23 functions to change the direction of flow of the fluid, so that the turbine element is driven by a greater torque than is impressed on the impeller 21.

A one-way free wheeling brake 24 of well-known sprag or roller construction is provided between the stator element 23 and the casing 25 of the transmission unit A. The brake 24 is so arranged to prevent rotation of the stator element 23 in a direction which is reverse to that of the drive or input shaft 10.

As is well-known with converters of this type, when the rotation of the turbine element increases to a certain speed, the reaction of the fluid on the stator element reverses, thus tending to rotate the stator element in the forward direcion and the one-way brake releases. Thereafter, the unit 13 functions as a simple fluid coupling driving the turbine element at no increase in torque.

The double pinion planet gear set 14 comprises a sun gear 26, formed on or splined to the intermediate shaft 11, a sun gear 27, a plurality of short planet gears 28, a plurality of long planet gears 29, a planet carrier 30 and a ring gear 31. The sun gear 26 meshes with the planet gears 28 and each of the short planet gears 28 meshes with one of the long planet gears 29. The gears 29 also mesh with the sun gear 27 and the ring gear 31.

The double pinion planet gear set 15 comprises a sun gear 32, splined at 33 to the intermediate shaft 11, a sun gear 34, a plurality of short planet gears 35, a plurality of long planet gears 36, a planet carrier 37 and a ring gear 38. The planet carrier 37 is splined to the shaft 11a which constitutes the output shaft of the unit A. The sun gear 32 meshes with the short planet gears 35, which in turn also mesh with the ring gear 38. The long planet gears 36 mesh with the sun gear 34, and each of the gears 36 also meshes with one of the planet gears 35.

The friction clutch 16 comprises a plurality of clutch plates 39 and a plurality of interleaved friction plates 40, each friction plate being provided with suitable friction facings. The clutch plates 39 are splined to the interior of a hollow drum 41 connected to the sun gear 27. The sun gear 27 and likewise the drum 41 are mounted concentrically to the intermediate shaft 11 for relative rotation therewith, being rotatably supported by a bearing sleeve 42 fixed with respect to the casing 25. The friction discs 40 are splined to the planet carrier 30 of the planet gear set 14. A backing plate 43 is fixed within the drum 41 and an annular piston 44 is slidably disposed within an annular cavity 45 on the other side of the discs 39 and 40. The piston functions to pack the discs 39 and 40 together in frictional engagement between the piston 44 and the backing plate 43 when fluid pressure is supplied to the cavity 45. A spring retainer 46 is fixed to the sun gear 27, and a coil spring 47 is disposed between the piston 44 and retainer 46 for yieldably holding the piston 44 in its clutch disengaging position when fluid pressure is no longer supplied to the cavity 45.

The friction brake 17 comprises a flexible brake band 48 adapted to frictionally engage the outer periphery of the drum 41. The friction brake 18 comprises a flexible brake band 49 adapted to frictionally engage a drum 50 formed on the ring gear 31 of the planet gear set 14; the ring gear 31 also comprising a bearing sleeve portion 51 for supporting the ring gear 31 with respect to the casing 25. A power take-off gear 52, from which power may be derived to operate various auxiliary apparatus, is formed on the end of the sleeve portion 51.

The friction brake 19 comprises a flexible brake band 54 adapted to frictionally engage a drum surface 55, formed on the ring gear 38 of the planet gear set 15. The ring gear 38 is splined to a sleeve extension 53 of the planet carrier 30 of the planet gear set 14.

The friction brake 20 comprises a flexible brake band 56 adapted to frictionally engage a brake drum 57 splined at 58 to the sun gear 34 of the planet gear set 15. The sun gear 34 is mounted concentrically to the intermediate shaft 11a for relative rotation therewith, and a bearing member 59 connected to the casing 25 is interposed therebetween. The friction brakes are adapted to be engaged by fluid pressure operated servo motors as will be hereinafter described.

The splitter B comprises a housing portion 25a, the output shaft 12, a planetary gear set 60, a multiple disc friction clutch 61 and a friction brake 62. As stated before, the output shaft 12 is adapted through suitable means to drive the road wheels of the vehicle.

The planetary gear set 60 comprises a sun gear 63 mounted concentrically to and for relative rotation with respect to the output shaft 12, a plurality of planet gears 64 carried by a planet carrier 65 connected to the output shaft 12, and a ring gear 66 connected by means of a flange 67 to the intermediate shaft 11a. The planet gears 64 mesh with the sun gear 63 and the ring gear 66.

The friction clutch 61 comprises a plurality of clutch plates 68 and a plurality of interleaved friction plates 69, each friction plate being provided with suitable friction facings. The clutch plates 68 are splined to the interior of a hollow drum 70 fixed on an annular part 71 which is splined at 72 to the sun gear 63. Suitable bearing means 73 connected to the housing portion 25a are disposed between the output shaft 12 and the part 71. The friction discs 69 are splined to the planet carrier 65 of the planet gear set 60. A backing plate 74 is fixed within the drum 70, and an annular piston 75 is slidably disposed within an annular cavity 76 formed in the annular part 71 on the other side of the discs 68 and 69. The piston 75 functions to pack the discs 68 and 69 together in frictional engagement between the piston 75 and the backing plate 74 when fluid pressure is supplied to the cavity 76. A spring retainer 77 is fixed to the part 71, and a coil spring 78 is disposed between the piston 75 and the retainer 77 for yieldably holding the piston 75 in its clutch disengaging position when fluid pressure is no longer supplied to the cavity 76.

The friction brake 62 comprises a flexible brake band 79 which is adapted to frictionally engage the outer periphery of the drum 70 by suitable well-known means such as a servo motor which will be hereinafter described.

The housing 25 is provided with a suitable cavity 80 to house a front pump, generally indicated at 81 and adapted to be driven by the drive shaft 10 through the impeller element 21. The housing portion 25a is suitably provided with a cavity 82 to house a rear pump, generally indicated at 83, adapted to be driven by the output shaft 12. As can be seen from the illustration, the rear pump is disposed rearwardly of the splitter B; however, when the splitter B is not provided, the rear pump will be disposed within the housing 25 rearwardly of the planet gear set 15 and the friction brake 20 and will be driven by the shaft 11a constituting in this case the output shaft.

As stated before, the unit A provides four speeds forward drive through the unit, and the splitter B provides two speeds forward drive therethrough. The highest speed drive in the unit A is a direct drive between the shaft 11 and the shaft 11a constituting the output shaft for the unit A, and the other speeds forward drive are progressively lower. The higher speed drive through the unit B is a direct drive between the shaft 11a constituting the input shaft for the unit B and the output shaft 12, and the other drive is a relatively low speed drive. The gearing in the units A and B is so arranged that the units provide eight different overall forward speed ratios between the shafts 11 and 12, four of these ratios being provided when the rear unit has its low speed drive completed and the other four ratios being provided when direct drive is effective in the rear unit. The gearing in the two units A and B is such that when the unit B is in its low speed ratio drive, the resulting overall highest three ratios between the shafts 11 and 12 are substantially midway between the overall ratios provided when the unit B is in its high speed ratio drive. The lowest overall speed ratio with the units A and B both driving in their lowest speed drive, is of coures, below the low gear ratio provided between the shafts 11a and 12 with the unit B in its high speed drive. It is contemplated that the units A and B connected in tandem provide eight overall speed ratios which are well spaced, so that all are useable for driving the vehicle. As an example of the overall speed ratios that may be provided, Figure 4 may be referred to. When the gearing unit B is in its high speed drive, the ratios provided (highest to lowest) are 1.00 to 1, 1.71 to 1, 2.89 to 1, 5.00 to 1, and when the unit B is in its low speed drive the three highest overall ratios (highest to lowest) are 1.35 to 1, 2.32 to 1 and 3.91 to 1 which are substantially midway between the four speed ratios provided solely by the unit A. These speed ratios are given only as examples, and it will be understood that other gear ratios may be selected, if desired.

The various drives through the unit A will now be described with the friction clutch 61 of the splitter B engaged. Engagement of the friction clutch 61 locks together the sun gear and the planet carrier 65, and as is well-known, when two elements of a planet gear set are locked together, the drive therethrough will be direct or one-to-one. Therefore, the drive from the shaft 11a flows through the flange 67, the ring gear 66, the planet gears 64, the planet carrier 65 and to the output shaft 12, with no reduction of speed in the splitter. All speed reduction will be in the unit A, and for the purpose of description, the drives between the shafts 10 and 12 will be identified with the suffix "High," indicating that the unit B is locked up in its direct or high speed drive.

Incidentally, in all speed drives with the unit B being either in its low or high speed drive condition, the input shaft 10 will be driven by the vehicle engine and rotation will be imparted to the intermediate shaft 11 by means of the torque converter 13, which converts torque at times as has been previously described.

First High speed drive is completed by engaging the friction brake 19 which holds the ring gear 38 against rotation, so that the ring gear 38 constitutes a reaction element for the gear set 15. For this drive, the gear set 15 acts as a simple planetary, with the drive being through the sun gear 32 splined to the intermediate shaft 11, the planet gears 35 and the planet carrier 37, to the second intermediate shaft 11a and the drive is transmitted through the locked-up planet gear set 60 to the output shaft 12. The planet carrier 37 and the output shaft 12 will rotate in the forward direction at a speed which is reduced to that of the intermediate shaft 11.

To complete the Second High speed drive, the brake 20 is engaged, and the brake 19 is disengaged. The friction brake 20 holds the sun gear 34 against rotation, so that the sun gear 34 functions as a reaction element for the planet gear set 15. The drive is through the intermediate shaft 11, the sun gear 32, the planet gears 35, the planet gears 36, the planet gear carrier 37, the intermediate shaft 11a, the locked-up planet gear set 60, to the output shaft 12. The planet carrier 37 and the output shaft 12 will rotate in the forward direction at a speed which is reduced from that of the intermediate shaft 11, but is higher than that of the shaft 12 for the First High speed drive.

To complete the Third High speed forward drive, the friction brake 17 is engaged, and the friction brake 20 is disengaged. The friction brake 17 holds the sun gear 27 against rotation, so that the sun gear 27 functions as a reaction element for the planet gear set 14.

The power flows in two paths from the shaft 11, one path being through the sun gear 26, the planet gears 28 and 29, and the planet carrier 30 to the ring gear 38 of the planet gear set 15, and the other path being to the sun gear 32 of the planet gear set 15 directly from the shaft 11. The drive is combined in the planet gear set 15, with the ring gear 38 driving the planet gears 35 and the sun gear 32 also driving these planet gears 35, so that the carrier 37 is driven and drives the intermediate shaft 11a. The planet gear set 14 is so constructed that when the brake 17 holds the sun gear 27 stationary, the carrier 30 is driven at a reduced speed in the forward direction, so that the ring gear 38 rotating at this same reduced speed causes the carrier 37 to be rotating at a speed which is reduced in respect to that of the shaft 11. The power from the shaft 11a flows through the locked-up planet gear set 60 to the output shaft 12, which rotates in the forward direction at a speed reduced from that of the intermediate shaft 11, but higher than that of the shaft 12 for the Second High speed drive.

To complete the Fourth High speed forward drive, the clutch 16 is engaged and the friction brake 17 is disengaged. The clutch 16 locks up the planet gear set 14 by connecting together the sun gear 27 and the planet carrier 30, so that the speed of rotation of the planet gear carrier 30 will be the same as that of the intermediate shaft 11. The ring gear 38 will therefore also rotate at the same speed as the intermediate shaft 11. The sun gear 32 of the planet gear set 15 will also rotate at the same speed as the intermediate shaft 11, being splined thereon. Since the sun gear 32 and the ring gear 38 of planet gear set 15 are rotating at the same speed as the intermediate shaft 11, the planet carrier 37 and the second intermediate shaft 11a will rotate at the same speed. Since the planet gear set 60 in the splitter B is locked-up, the output shaft 12 will rotate at the same speed as the intermediate shaft 11a, and a substantially one-to-one drive is provided through the transmission assembly.

To complete a reverse speed drive, the friction brake 18 is engaged and the other friction engaging devices of the unit A are disengaged. The friction brake 18 holds the ring gear 31 against rotation, so that the ring gear functions as a reaction element for the planet gear set 14. The power flows in two paths, one path being through the sun gear 26, the planet gears 28 and 29, and the planet carrier 30 to the ring gear 38 of the planet set 15, and the other path being to the sun gear 32 of the gear set 15 directly from the shaft 11. The drive is combined in the planet gear set 15, with the ring gear 38 driving the planet gears 35 and the sun gear 32 also driving the planet gears 35, so that the carrier 37 is driven and drives the shaft 11a. The planet gear set 14 is so constructed that when the brake 18 holds the ring gear 31 stationary, the carrier 30 is driven in a reverse direction to that of the shaft 11 and at a reduced speed to that of the shaft 11, which reduced speed is higher than the speed of the carrier 30 in the Third High speed forward drive, so that the ring gear 38 will rotate at this same reversed speed. The sun gear 32 will rotate in the forward direction, being splined to the shaft 11.

The carrier 37 due to this differential of rotation will be rotated in a reverse direction and at a speed which is reduced relative to that of the shaft 11. The power from the shaft 11a flows through the locked-up planet gear set 60 to the output shaft 12, which therefore will rotate in the same reverse direction at the same speed.

The splitter B, conditioned for its low speed drive, provides when the unit A is shifted between its various forward speed ratio drives, three overall relatively high speed drives which are intermediate between the First High, Second High, Third High and Fourth High speed drives just described. A very low speed ratio drive is provided by the splitter B when it is in its low speed drive condition and the unit A is also in its first speed drive condition. For the purpose of description, and having particular reference to the table of Figure 4, the various drives through the transmission assembly with the unit B being in its low speed ratio drive condition will be referred to First Low, Second Low, Third Low and Fourth Low.

To condition the splitter B for the low speed drives, the clutch 61 is disengaged and the brake 62 is engaged. The brake 62 holds the sun gear 63 against rotation, so that the sun gear 63 functions as a reaction element for the planet gear set 60 and causes a reduction of speed between the shaft 11a and the shaft 12. The power flow through the unit A for each of the Low speed drives is the same as described with respect to the corresponding High speed drive, and the power flow through the splitter B is through the shaft 11a, the flange 67 to the ring gear 66, the planet gears and the planet carrier 65 to the output shaft 12.

The transmission assembly may be put into its neutral condition by disengaging all of the friction brakes and clutches. The power trains through both of the units A and B are thereby broken. The assembly may also be maintained in neutral condition by disengaging all of the friction brakes and clutches in either one of the units A and B.

When it is desirable to get a power take-off drive by using the power take-off gear 52, the shaft 11a must constitute a reaction member for the transmission unit A. Therefore, the splitter B must not be in neutral if the vehicle is stationary. Of course, the splitter B will be in a drive when the vehicle is driving.

The hydraulic system for engaging and disengaging the various friction brakes and clutches in the units A and B for the purpose of shifting the transmission assembly between its various speed ratio drives will now be described with particular reference being made to Figures 2A to 2H which are placed together as indicated in Figure 2.

Hydraulic servo motors 84, 85, 86, 87 and 88 are provided for engaging the friction brakes 17, 18, 19, 20 and 62, respectively.

The friction brake 17, when engaged, provides the third speed drive through the unit A and comprises the brake band 48, fixed at one end, with respect to the transmission housing 25 by means of a strut 89, and fixed at the other end by means of a strut 90 to the stem 91 of a piston 92 received in a servo housing 93. A coil spring 94 is disposed within the housing surrounding the stem 91 and acts against the piston 92 to resiliently urge the piston to its brake disengaging position. The servo housing 93 is divided into two chambers 95 and 96, the piston 92 and the spring 94 being disposed in the chamber 95. A second piston 97 is disposed in the chamber 96 and is provided with a stem portion 98 passing through an aperture in a dividing wall 99 between the chambers 95 and 96, and butts against the piston 92, so that the pistons will move in unison. The servo housing 93 is provided with ports 100, 101, 102, 103 and 104, the ports 100 and 104 communicating with the chamber 96 and the ports 101, 102 and 103 communicating with the chamber 95. A coil spring 105 is disposed between the ends of the brake band 48 to assure disengagement of the band 48 with respect to the brake drum 41.

The friction brake 18, when engaged, provides the reverse speed drive through the unit A, and comprises the brake band 49, fixed at one end with respect to the transmission housing 25 by means of a strut 106 and fixed at the other end by means of a strut 107 to the stem 108 of a piston 109 received in a servo housing 110. A spring 111 is provided between the ends of the brake band 49 to assure disengagement. A coil spring 112 is disposed around the stem 108 and within the housing 110 to resiliently urge the piston 109 to its brake disengaging position. The servo housing 110 is divided into two chambers 113 and 114 by means of a common wall 115 and is provided with ports 116, 117, 118 and 119. The piston 109 and the spring 112 are received in the chamber 113, and a piston 120 having a stem portion 121 passing through an aperture in the wall 115 and butting against the piston 109 is received in the chamber 114. Because of this construction, the pistons 109 and 120 will move in unison. The ports 116 and 119 communicate with the chamber 114, and the ports 117 and 118 communicate with the chamber 113.

The friction brake 19, when engaged, provides the first speed drive through the unit A and comprises the brake ban 54, fixed at one end with respect to the housing 25 by means of a strut 122 and fixed at the other end by means of a strut 123 to a stem portion 124 of a piston 125 received in a servo housing 126. A coil spring 127 is disposed between the ends of the brake band 54 to assure disengagement. A coil spring 128 surrounds the stem portion 124 and is disposed within the housing 126 to resiliently urge the piston 125 to its brake disengaging position. The servo housing 126 is divided into two cavities 129 and 130 by means of a wall 131 and is provided with ports 132, 133, 134 and 135. The piston 125 and the spring 128 are received in the chamber 129, and a piston 136, having a stem portion 137 passing through an aperture in the wall 131 and butting against the piston 125, is received in the chamber 130. The ports 132 and 135 communicate with the chamber 130 and the ports 133 and 134 communicate with the chamber 129.

The friction brake 20, when engaged, provides the second speed drive through the unit A and comprises the brake band 56 fixed at one end with respect to the housing 25 by means of a strut 138 and fixed by means of a strut 139 at its other end to a stem portion 140 of a piston 141 received in a servo housing 142. A spring 143 is disposed between the ends of the brake band 56 to assure disengagement. The housing 142 is provided with two chambers 144 and 145 separated by a common wall 146, and ports 147, 148, 149, 150 and 151. The piston 141 is received in the chamber 144 and a spring 152 surrounds the stem portion 140 and is disposed within the chamber 144 to resiliently urge the piston 141 to its brake disengaging position. A second piston 153 is received in the chamber 145 and is provided with a stem portion 154 passing through an aperture in the wall 146 and butts against the piston 141, so that the pistons 141 and 153 move in unison. The ports 147 and 151 communicate with the chamber 145, and the ports 148, 149 and 150 communicate with the chamber 144.

The friction brake 62 when engaged, completes the low speed drive ratio through the splitter B and comprises the brake band 79, fixed at one end with respect to the splitter housing 25a by means of a strut 155 and fixed by a strut 156 at the other end to a stem portion 157 of a piston 158 received in a servo housing 159. A spring 160 is disposed between the ends of the brake band to assure disengagement. A spring 161 surrounds the stem portion 157 and resiliently urges the piston 158 to its brake disengaging position. The housing 159 is divided into two chambers 162 and 163 by means of a common wall 164 and is provided with ports 165, 166, 167, 168, 169 and 170. The piston 158 and the spring 161 are received in the chamber 162 and a second piston 171 having a stem portion 172 passing through an aperture in the wall 164 and butting against the piston 158 is received in the chamber 163, so that the pistons 158 and 171 move in unison. The ports 165, 168, 169 and 170 communicate with the chamber 163, and the ports 166 and 167 communicate with the chamber 162.

The friction clutches 16 and 61 are provided with cavities 45 and 76, respectively, for receiving fluid pressure to move the pistons 44 and 75, respectively, to clutch engaging position. Suitable check valves 173 are provided in the walls of the cavities 45 and 76 to prevent the centrifugal build up of fluid pressure in the cavities and relieve residual fluid in the cavities when fluid is no longer supplied to the respective cavities for engaging the clutches. The springs 47 and 78 urge the pistons 44 and 75, respectively, to their clutch disengaging positions.

The connections of the ports and the flow of fluid pressure to and from the brake servos and the clutch cavities will be explained in the descriptions of the hydraulic circuits and the operation thereof to provide the various drives through the transmission assembly.

Briefly, the hydraulic control system comprises a sump 174 constituting a source of fluid, such as oil, oil screens 175 and 176, the front pump 81 and the rear pump 83 for supplying fluid under pressure to the system and having their inlets filtered by means of the screens 175 and 176, converter feed valves 177 and 178, a pressure regulating valve 179 associated with the front pump 81, a centrifugal governor 180, a primary governor valve 181, a secondary governor valve 182, a neutral valve 183, a reverse inhibitor valve 184, a manually operated transmission selector valve 185 having positions D, 3, 2, 1, N and R corresponding to drive or high speed, third speed, second speed, first speed, neutral and reverse, respectively, of the front unit A, a throttle plunger 186 adapted to be moved by means of an accelerator or foot throttle pedal 187, a throttle valve 188, a kickdown valve 189, a compensating valve 190, a plunger 191 for the compensating valve, a low gear pressure control valve 192, a 1–2 pilot or shuttle valve 193, a 1–2 shift valve 194, a 2–1 downshift plug 195, a 2–1 kickdown plug 196, a 2–1 downshift inhibitor plug 197, a 1–2 governor plug 198, a 2–3 pilot or shuttle valve 199, a 2–3 shift valve 200, a 3–2 downshift plug 201, a 3–2 kickdown plug 202, a 3–2 downshift inhibitor plug 203, a 2–3 governor plug 204, a 3–4 pilot or shuttle valve 205, a 3–4 shift valve 206, a 4–3 downshift plug 207, a 4–3 kickdown plug 208, a 4–3 downshift inhibitor plug 209 and a 3–4 governor plug 210. Also included is a transmission governor pressure low-high compensation valve 211, a transmission governor pressure low-high compensation regulator plug 212, a transmission governor pressure control valve 213, a third speed governor pressure valve 214, a third speed governor pressure relgulating pug 215, a third speed governor pressure control valve 216, a fourth speed governor pressure valve 217, a fourth speed governor pressure control valve 218, a first speed governor pressure control valve 219, a first speed governor pressure valve 220, a manually operated splitter selector valve 221 having positions N, L, D and H corresponding to neutral, low, drive and high, respectively, a splitter pilot or shuttle valve 222, a splitter shift valve 223, a splitter downshift plug 224, a splitter kickdown plug 225, a splitter downshift inhibitor plug 226, a splitter governor plug 227 and a transmission kickdown inhibitor valve 228.

The converter feed valve 177 comprises a casing portion 229 having ports 230, 231, 232 and 233, the ports 230, 231 and 232 opening into a cylindrical cavity 234 and the port 233 opening into a communicating cylindrical cavity 235 of a smaller diameter. A piston 236 comprising a land 237 of a diameter substantially the same as the diameter of the cavity 234 and a land 238 of a diameter substantially the same as the diameter of the cavity 235, is slidably received in the cavities. An annular groove 239 is provided between the lands 237 and 238. The piston 236 is provided with an internal bore receiving a coil spring 240, the opposite end of which bears against the end wall of the cavity 234. The ports 230 and 233 are vented to the sump 174, the port 231 is connected to a conduit 241 having a pair of spaced restricted portions 242 and 243 therein, and the port 232 is connected to a conduit 244. The conduit 241 is connected to a conduit 245, to supply fluid under pressure to the torque converter 13, the joining of the conduits 241 and 245 being intermediate the restricted portions of the conduit 241. The restriction 242 is larger in diameter than the restriction 243 for a purpose to be desscribed.

The converter feed valve 178 comprises a casing portion 246 provided with ports 247, 248, 249, 250 and 251. The ports 247, 248, 249 and 250 open into a cylindrical cavity 252 and the port 251 opens into a communicating cylindrical cavity 253 of a smaller diameter. Slidably disposed within the cavities 252 and 253 is a piston 254 comprising a land 255 of a diameter substantially equal to the diameter of the cavity 252 and a land 256 of a diameter substantially equal to the diameter of the cavity 253. An annular groove 257 is provided between the lands 255 and 256. The piston 254 is provided with an internal bore in which a spring 258 is disposed and which bears against the end wall of the cavity 252. The port 247 is connected to the conduit 244; the port 248 is connected to the conduit 241; the port 249 is connected to a conduit 259; the port 250 is connected to a conduit 260; and the port 251 is vented to the sump 174.

The front pump 81 comprises a pump casing 261 having a substantially rectangular cavity 262 therein. A casing 263, also substantially rectangular in shape, is slidably disposed in the cavity 262. The casing 263 has a cylindrical cavity 264 therein, and a cylindrical rotor 265 is rotatably disposed in the cavity 264. The rotor 265 carries a plurality of vanes 266 slidably disposed in slots in the periphery of the rotor which contact the surface of the cylindrical cavity 264 on the ends of the vanes. The rotor 265 is driven from the drive shaft 10 of the transmission through the impeller 21 of the torque converter 13. A compression spring 267 is disposed between the lower end of the casing 263 and the bottom of a pocket 268 formed in the casing 261.

The casing 261 has an inlet chamber 269 in communication with the vanes 266 located on the same side of the casing as the chamber 269, and the casing 261 has an outlet chamber 270 in communication with the vanes 266 on the opposite side. An inlet conduit 271 is connected to the chamber 269, and outlet pressure supply conduits 260 and 272 are connected to the chamber 270. The cavity 262 has a conduit 273 connected to it at its upper end and has a conduit 274 connected to it at its lower end.

The pressure regulator valve 179 functions in conjunction with the pump 81 for causing the regulation of the outlet pressure of the pump 81 in the chamber 270 to predetermined values. The valve 179 comprises a casing portion 275 having ports 276, 277, 278, 279, 280, 281, 282 and 283, all opening into a cylindrical cavity 284 in the casing portion 275. A piston 285 is slidably disposed in the cavity 284 and is provided with an internal cavity 286 in communication with ports 287 extending through the valve piston. An annular groove 288 is provided about the piston 285.

A plug 289 is provided in the upper end of the cavity 284 and is provided with ports 290 and 291 and connected cylindrical cavities 292 and 293. The cavity 292 is in communication with the ports 290 and the cavities 292 and 293 are in communication with the ports 291. The cavity 292 receives a plug member 294, and the cavity 293 receives a piston 295 having a stem 296 adapted to bear on the piston 285. A compression spring 297 extends between the plug 289 and the piston 285.

The port 276 is connected to a conduit 298; the ports 277, 278 and 283 are vented to the sump 174; the port 279 is connected to the conduit 272; the port 280 is connected to the conduit 274; the port 281 is connected to the conduit 273; and the port 282 is connected to the conduit 259.

The rear pump 83 may be of any suitable well-known construction, and in the illustrated embodiment of the controls, the pump is indicated as comprising an inner gear 299 in mesh with an eccentrically disposed outer gear 300 rotatable in a pump casing 301, the inner gear being connected to be driven by the shaft 12 of the transmission by any suitable means. The casing 301 is provided with a crescent-shaped casing portion 302 between the gears 299 and 300. The gears 299 and 300 carry fluid between their teeth and across the inner and outer surfaces of the casing portion 302 to provide pumping action. The pump draws fluid through an inlet conduit 303 and the screen 176 and discharges the fluid into an outlet conduit 304 when the shaft 12 is rotating in the forward direction.

The inlet conduit 271 for the front pump 81 is connected with an oil cooler 305, which comprises a water jacket 306 having a water inlet port 307 and a water outlet port 308. A cooling coil 309 is disposed in the water jacket 306 and is connected with the conduit 271 by means of conduits 310 and 311.

A check valve 312 is disposed in the conduit 271 between the conduits 310 and 311 for the purpose of allowing a by-pass of the fluid, if the oil flows unduly sluggishly through the cooler 305. The check valve 312 comprises a valve member 313 resiliently disposed on a seat 314 by means of a compression spring 315.

The centrifugal governor 180 comprises a housing member 316 which is keyed or otherwise secured to the output shaft 12 for concurrent rotation and which is provided with a passage 317, a cylindrical cavity 318 and a port 319 communicating with the passage and the cavity. The passage 317 extends from the port 319 to the opposite side of the housing member 316, as shown. A plug member 320 is slidably disposed within the cavity 318.

The primary governor valve 181 comprises a casing 321 suitably connected with the governor housing member 316 and provided with ports 322, 323, 324 and 325. The ports 322, 323 and 324 open into a cylindrical cavity 326, and the port 325 opens into a communicating cylindrical cavity 327 of a larger diameter. A piston 328 is slidably disposed within the cavities and is provided with a land 329 of a diameter substantially equal to the diameter of the cavity 327 and lands 330 and 331 of a diameter substantially equal to the diameter of the cavity 326. Annular grooves 332 and 333 are provided in the piston 328 between the lands, as illustrated. A weight 334 is connected to piston 328 adjacent the land 331 and is disposed outside the cavity 326. The port 322 is connected to a conduit 335, which is connected to a conduit 336. The conduit 336 is connected to the conduit 272 by means of a conduit 337, and the conduit 337 is connected to the conduit 304. The port 323 is vented to the sump 174; the port 324 is connected to a passage 338 formed in the casing 321; and the port 325 is also connected to the passage 338. The passage 338 communicates with the passage 317 formed in the governor housing 316.

A check valve 339 having the same construction as the check valve 312 is disposed in the conduit 304 between the conduits 337 and 382. The check valve 339 comprises a valve member 340 adapted to rest on a seat 341 and resiliently urged into seating position by means of a compression spring 342.

The secondary governor valve 182 comprises a casing 343 provided with ports 344, 345, 346 and 347. The casing 343 is similar with the casing 321 of the primary governor valve attached to the governor housing member 316. The ports 344, 345 and 347 open into a cylindrical cavity 348, and the port 346 opens into a cylindrical cavity 349 of a larger diameter. The cavity 349 communicates with the cavity 318 in the governor housing member 316. A piston 350 is slidably disposed within the cavities 348 and 349. The piston 350 is provided with a land 351 of a diameter substantially equal to the diameter of the cavity 348, a land 352 substantially equal in diameter to the diameter of the cavity 349, a land 353 and a groove 354.

The plug 320 butts against the piston 350, as illustrated. The ports 344 and the end of the cavity 348 are vented to the sump 174; the port 345 is connected to the conduit 336; the port 346 is connected to a conduit 355; and the port 347 is connected to the conduit 355 by means of a passage 356 formed in the casing 343.

The neutral valve 183 comprises a casing portion 357 having ports 358, 359, 360, 361 and 362 all opening into a cylindrical cavity 363 in the casing portion 357. A piston 364 is slidably disposed in the cavity 363 and is provided with lands 365 and 366 spaced by a groove 367. The port 358 is connected with the conduit 355; the port 359 is connected to the conduit 368; the port 360 is connected to the conduit 369; the port 361 is also connected to the conduit 368 along with the port 359; and the port 362 is a bleed port vented to the sump 174.

The reverse inhibitor valve 184 comprises a casing portion 370 having ports 371, 372, 373, 374 and 375 all opening into a cylindrical cavity 376. A piston member 377 is slidably disposed within the cavity 376 and is provided with spaced lands 378 and 379. The piston member 377 is provided with an open bore in one end receiving a compression spring 380 which bears against the end wall of the cavity 376. The port 371 is connected to a conduit 381; the port 372 is connected to a conduit 382, which is connected to the conduit 304 between the pump 83 and the check valve 339; the port 373 is connected to a conduit 383, which is connected to the conduit 298; and the ports 374 and 375 are vented to the sump 174.

The manually operated transmission selector valve 185 comprises a casing portion 384 provided with ports 385, 386, 387, 388, 389, 390, 391, 392, 393 and 394, all opening into a cylindrical cavity 395 in which a piston 396 is slidably disposed. The piston 396 is provided with spaced lands 397 and 398 and annular indentations 399, 400, 401, 402, 403 and 404. A spring pressed detent ball 405 is adapted to fit in the indentations 399, 400, 401, 402, 403 and 404 for yieldably holding the piston 396 in its "D," "3," "2," "1," "N" and "R" positions, which correspond to the drive, third, second, first, neutral and reverse drive conditions, respectively, of the transmission unit A. The valve piston 396 may be moved under manual control by any suitable means, such as by a selector lever 406 disposed on the steering column of the vehicle.

The port 385 is connected to a conduit 407; the port 386 is connected to a conduit 408; the ports 387 and 394 are vented to the sump 174; the port 388 is connected to the conduit 381; the port 389 is connected to the conduit 336; the port 390 is connected to the conduit 369; the port 391 is connected to a conduit 409; and port 392 is connected to a conduit 410; and the port 393 is connected to a conduit 411. The ports 386 and 389 are connected together regardless of the position of the piston 396.

The throttle plunger 186 is connected to the foot throttle pedal 187 by means of suitable linkage, generally indicated at 412, and the plunger comprises a cylindrical portion 413 slidably disposed within a cavity 414 formed in a casing portion 415 which also houses the throttle valve 188 and the kickdown valve 189, and the casing portion 415 is provided with ports 416, 417, 418, 419, 420, 421, 422, 423 and 424. Communicating cavities 425, 426 and 427 are also provided in the casing portion 415, and the cavities 425, 414, 426 and 427 are of decreasing diameters. The ports 416 and 424 open into the cavity 425; the ports 417 and 418 open into the cavity 426; and the ports 419, 420, 421, 422 and 423 open into the cavity 414.

The throttle valve 188 comprises a piston 428 slidably disposed within the cylindrical cavities 414 and 427 and is provided with spaced lands 429 and 430 slidable within the cavity 414 and a reduced cylindrical portion 431 slidable within the cavity 427. A coil spring 432 is disposed within the cavity 414 between the land 430 of the piston 428 and the throttle plunger cylindrical portion 413, as illustrated.

The kickdown valve 189 comprises a piston 433 having a land 434 slidable within the cavity 425, a land 435 slidable within the cavity 426, and an annular groove 436 between the lands 434 and 435. Retainer members 437 and 438 are disposed within the cavity 425 to limit the sliding movement of the piston 433.

The port 416 is connected to a conduit 439; the port 417 is connected to a conduit 440; the ports 418 and 420 are connected together by means of a conduit 441; the port 419 is connected to a conduit 442 which is connected to the conduit 439; the ports 421, 423 and 424 are vented to the sump 174; and the port 422 is connected to the conduit 408. The ports 419 and 422 are connected and remain connected regardless of the position of the throttle valve piston 429.

The compensating valve 190 and the plunger 191 for the compensating valve is housed in a casing portion 443 having ports 444, 445, 446, 447, 448, 449 and 450. The ports 444 and 450 open into a cylindrical cavity 451 and the ports 445, 446, 447, 448 and 449 open into a connecting concentric cavity 452 of a larger diameter.

The compensating valve 190 comprises a piston 453, slidably disposed within the cavities 451 and 452, provided with a land 454 of a diameter substantially equal to the diameter of the cavity 451 and lands 455 and 456 of a diameter substantially equal to the diameter of the cavity 452. Annular grooves 457 and 458 are provided, as illustrated.

The plunger 191 for the compensating valve is provided with a reduced diameter tip portion 461 to space it from the end of the cavity 452. The plunger 191 is provided with a cavity 462 to receive a coil spring 463 disposed between the plunger 191 and land 456 of the piston 453 of the compensating valve 190.

The port 444 is connected to a conduit 464; the port 445 is connected to a conduit 465, to which the conduit 464 is connected; the port 446 is connected to a conduit 466, which is connected to the conduit 298; the port 447 is connected to a conduit 467, which is connected to a conduit 468; the conduit 468 is connected to the conduit 441; the ports 448 and 450 are vented to the sump 174; and the port 449 is connected to the conduit 439.

The low gear pressure control valve 192 comprises a casing portion 469 having ports 470, 471, 472, 473, 474 and 475, all opening into a cylindrical cavity 476. A piston 477 is slidably disposed within the cavity 476 and is provided with spaced lands 478 and 479. The piston 477 is provided with an open bore in one end receiving a compression spring 480 bearing against the end wall of the cavity 476. The port 470 is connected to a conduit 481; the port 471 is connected to a conduit 482; the port 472 is connected to the conduit 407; the port 473 is connected to a conduit 483; the port 474 is connected to the conduit 465; and the port 475 is vented to the sump 174. The ports 470 and 474 are permanently connected regardless of the position of the piston 477.

The 1-2 pilot valve 193 comprises a casing portion 484 having ports 485, 486, 487, 488, 489 and 490, all opening into a cylindrical cavity 491. A piston 492 is slidably disposed within the cavity 491 and is provided with spaced lands 493 and 494. The piston 492 is provided with an open bore on one end to receive a coiled compression spring 495 bearing against the end wall of the cavity 491. The port 485 is connected to a conduit 496; the port 486 is connected to a conduit 497; the ports 487 and 489 are vented to the sump 174; the port 488 is connected to a conduit 498; and the port 490 is connected to a conduit 499, which is connected to the conduit 411.

The 1-2 shift valve 194, the 2-1 downshift plug 195, the 2-1 kickdown plug 196, the 2-1 downshift inhibitor plug 197 and the 1-2 governor plug 198, are disposed within concentric connecting cavities, to be described, in a casing portion 500 having ports 501, 502, 503, 504, 505, 506, 507, 508, 509, 510, 511, 512, 513 and 514.

The 1-2 shift valve 194 comprises a piston 515 having a land 516 slidable within a cavity 517, a land 518 slidable within a cavity 519 of a smaller diameter and a reduced portion 520 slidable within a cavity 521 of still smaller diameter. An annular groove 522 is disposed between the lands 516 and 518.

The 2-1 downshift plug 195 comprises a piston portion 523 provided with a reduced diameter tip portion 524 and slidable in a cavity 525. The 2-1 kickdown plug 196 comprises a piston portion 526 provided with a reduced diameter tip portion 527 and slidable within a cavity 528. The 2-1 downshift inhibitor plug 197 comprises a piston portion 529 provided with a reduced diameter tip portion 530 and slidable within a cavity 531. A coiled compression spring 532 is disposed between the plug 197 and the piston 515 and is received in a recess 533 in the 1-2 shift valve piston 515. The 1-2 governor plug 198 comprises a cylindrical portion provided with a reduced diameter tip portion 534 slidably received in a cylindrical cavity 535. The cavities in which the elements are disposed communicate and are concentric, and the cavities 525, 528, 531 and 517 progressively increase in diameter; the cavities 519 and 521 progressively decrease in diameter; and the cavity 535 is of a relatively large diameter.

The port 501 is connected to a conduit 536; the port 502 is connected to a conduit 537; the port 503 is connected to a conduit 538; the port 504 is connected to a conduit 539; the port 505 is connected to a conduit 540, which is connected to the conduit 538; the port 506 is connected to the conduit 496; the ports 507, 508 and 509 are vented to the sump 174; the port 510 is connected to a conduit 541 to which are connected the conduits 497 and 482; the port 511 is connected to the conduit 481; the port 512 is connected to a conduit 542, which is connected to the conduit 468; the port 513 is connected to a conduit 543, which is connected to the conduit 411; and the port 514 is connected to the conduit 468. The ports 501 and 514 are permanently connected at all times because of the reduced tip portion 524 of the plug 195; the ports 504 and 511 are permanently connected regardless of the position of the piston 515.

The 2-3 pilot valve 199 comprises a casing portion 544 having ports 545, 546, 547, 548, 549, and 550, all opening into a cylindrical cavity 551. A piston 552 is slidably disposed within the cavity 551 and is provided with spaced lands 553 and 554 and is provided with an open bore on an end thereof receiving a coil spring 555 bearing against the end wall of the cavity 551. The port 545 is connected to a conduit 556; the port 546 is connected to a conduit 557; the ports 547 and 549 are vented to the sump 174; the port 548 is connected to a conduit 558; and the port 559 is connected to a conduit 559, which is connected to the conduit 410.

The 2-3 shift valve 200, the 3-2 downshift plug 201, the 3-2 kickdown plug 202, the 3-2 downshift inhibitor plug 203, and the 2-3 governor plug 204 are contained within a casing portion 560 having a plurality of interconnected concentric cylindrical cavities, to be described. The casing portion 560 is provided with ports 561, 562, 563, 564, 565, 566, 567, 568, 569, 570, 571, 572, 573, 574 and 575.

The 2-3 shift valve 200 comprises a piston 576 having a land 577 slidably received in a cylindrical cavity 578, a land 579 slidably received in a smaller cylindrical cavity 580, and a reduced cylindrical portion 581 slidably received in a still smaller cylindrical cavity 582. An annular groove 583 is disposed between the lands 577 and 579.

The 3-2 downshift plug 201 comprises a piston portion 584 provided with a reduced diameter tip portion ably received in a cylindrical cavity 888. The piston 872 is provided with a bore 889 and receives a coiled compression spring 890 bearing against the plug 226. The splitter governor plug 227 comprises a cylindrical member having a reduced diameter tip portion 891 slidably received in a cavity 892. The relative sizes of the cavities may be seen from an inspection of the drawing.

The port 859 is connected to a conduit 893, which is connected to the conduit 440; the ports 860 and 862 are connected by means of a conduit 894; the port 861 is connected to a conduit 895; the port 863 is connected to the conduit 856; the ports 864 and 865 are vented to the sump 174; the port 866 is connected to a conduit 896, to which the conduit 836 is connected; the port 867 is connected to a conduit 897, which is connected to the chamber 76 of the clutch 61 and to which conduit 897 the conduit 875 is connected; the port 868 is connected to the conduit 838; the port 869 is connected to a conduit 898, which is connected to the conduit 597; the port 870 is connected to the conduit 855; and the port 871 is connected to the conduit 538.

The transmission kickdown inhibitor valve 228 comprises a casing portion 899 having ports 900, 901, 902, 903 and 904, all opening into a cylindrical cavity 905. A piston 906 is slidably disposed within the cavity 905 and is provided with spaced lands 907 and 908 and an internal bore 909 to receive a coil spring 910 abutting against the adjacent end wall of the cavity 905.

The port 900 is connected to the conduit 654; the port 901 is connected to the conduit 895; the port 902 is connected to the conduit 440; the port 903 is vented to the sump 174; and the port 904 is connected to the conduit 896.

Various connections between the valves and the pistons for the transmission clutches and brakes will now be described. The conduit 656 is connected to the chamber 45 of the friction clutch 16, and a conduit 911 is connected to the conduit 656 and to the port 100 of the brake servo 84. A conduit 912 joins the conduit 911 and the port 101 of the brake servo 84. The conduit 601 is connected by means of conduits 913 and 914 to the ports 104 and 103, respectively, of the brake servo 84. The conduit 914 is connected to the port 147 of the brake servo 87, and a conduit 915 connects the conduit 914 and the port 148 of the brake servo 87. The port 150 of the brake servo 87 is connected to the conduit 799, and a conduit 916 connects the port 151 and the conduit 799. A conduit 917 is connected to the conduit 799 and to the port 132 of the brake servo 86, and a conduit 918 connects the conduit 917 and the port 133. The conduits 298 and 466 are connected together and to the ports 116 and 117 of the brake servo 85. A conduit 919 is connected to the conduit 897 and to the port 165 of the brake servo 88, and a conduit 920 connects the conduit 919 and the port 166. A conduit 921 connects the ports 167 and 169, and a conduit 922 connects the port 168 of the brake servo 88 and the conduit 747. The conduit 922 is connected to the conduit 802.

Lubrication of the transmission assembly is effected through the hollow shaft 11. The fluid for this lubrication is provided by the fluid discharge of the torque converter through a conduit 923 provided with a check valve 924 of suitable construction and for purposes of illustration is shown as comprising a spring pressed ball 925 resting on a seat 926, so that the fluid flowing through the check valve 924 flows through the hollow shaft 11 for lubricating the transmission assembly.

It is contemplated that in lieu of this lubrication means for the transmission assembly, lubrication means, such as valves may be provided, and lubricating fluid may be withdrawn from anywhere in the line and regulated for this purpose. For this modification, attention is directed to Figure 2DD, which in order to make a complete hydraulic system should be substituted for Figure 2D, and when Figure 2DD is substituted for Figure 2D, the conduit 923 and check valve 924 are allowed to freely discharge into the sump 174.

Referring to Figure 2DD, the lubrication valve 927 comprises a casing portion 929 having ports 930, 931, 932, 933 and 934, opening into communicating concentric cylindrical cavities 935 and 936 of different diameters, the cavity 935 having the larger diameter. Slidably disposed within the cavities 935 and 936 is a piston 937 having a land 938 of a diameter substantially equal to the diameter of the cavity 935 and a land 939 of a diameter substantially equal to the diameter of the cavity 936; these lands being separated by an annular groove 940. The piston 937 is provided with an internal bore 941 to receive a coil spring 942 bearing against the adjacent end wall of the cavity 935.

The ports 930 and 932 are connected to the conduit 337; the ports 931 and 934 are vented to the sump 174; and the port 933 is connected to a conduit 943 having spaced restrictions 944 and 945 therein; the restriction 945 being of greater diameter than the restriction 944. The conduit 943 is connected to a conduit 946 leading to the hollow shaft 11 and the lubricating passages of the transmission.

The lubricating valve 928 comprises a casing portion 947 having ports 948, 949, 950, 951 and 952, communicating with communicating concentric cylindrical cavities 953 and 954 of different diameters, the cavity 953 being of the larger diameter. A piston 955 is slidable within the cavities and is provided with a land 956 of a diameter substantially equal to the diameter of the cavity 953, an annular groove 957, and a land 958 of a diameter substantially equal to the diameter of the cavity 954. The piston 955 is provided with an internal bore 959 receiving a coil spring 960 bearing aganist the adjacent end wall of the cavity 953.

The port 948 is connected to the conduit 943; the ports 949 and 951 are connected to the conduit 337; the port 950 is vented to the sump 174; the port 952 is connected to a conduit 961 which is connected to the conduit 298. It must be particularly noted that the flow of fluid in the conduit 337 from the pumps 81 and 83 is never blocked by the pistons 937 and 955, regardless of their positions.

A further modification of the control system is illustrated in dotted lines in Figures 2A, 2B and 2E and comprises a conduit 962 connected at one end to a port 283 of the pressure regulator valve 179 and at the other end to the conduit 538 adjacent the 1–2 shift valve 194.

Reference is now made to Figure 3, showing the arrangement of Figures 2A, 2D, 3B, 3E and 3G, in order to illustrate a second embodiment of the invention which constitutes a complete hydraulic control system for the four speed unit A used alone without the splitter B.

As will hereinafter appear from the description of operation of the units A and B used in tandem, the hydraulic parts shown in Figures 2C, 2F and 2H are associated with the splitter B, and, therefore, when the splitter B is not used, all of the parts shown in Figures 2C, 2F and 2H are dispensed with. All of the hydraulic control parts shown in Figures 2A, 2D, 2B, 2E and 2G are used; however, the conduits connecting the Figures 2B, 2E and 2G with the Figures 2C, 2F and 2H are, of course, not needed, and various other modified connections are made between the hydraulic parts of Figures 2B, 2E and 2G, all of these modified connections being shown for the sake of simplicity in the three new Figures 3B, 3E and 3G substituted for Figures 2B, 2E and 2G and used in connection with Figures 2A and 2D for showing the modification of the invention utilizing only the main transmission unit A.

Figures 3B, 3E and 3G are identical with Figures 2B, 2E and 2G with the following exceptions:

(1) The conduit 368 and the portion of the conduit 700 leading to Figure 2F are dispensed with, and a conduit 963 is substituted for connecting the port 359 of the neutral valve 183 with the remaining portion of the conduit 700.

(2) The branch conduit 685 is omitted.

(3) The portion of the conduit 411 from its point of connection with the conduit 499 and leading to the Figure 2F is dispensed with.

(4) The conduit 745 is dispensed with, and the port 149 of the servo motor 87 is closed.

(5) The portion of the conduit 799 from its juncture with the conduit 541 and leading to Figure 2F is dispensed with.

(6) The portion of the conduit 538 leading from its juncture with the conduit 540 to Figure 2F is dispensed with.

(7) The portion of the conduit 410 from its juncture with the conduit 559 to Figure 2F is dispensed with.

(8) The conduit 782 is dispensed with, and the port 102 in the servo motor 84 is closed.

(9) The conduit 839 is omitted.

(10) The conduit 898 is omitted.

(11) A portion of the conduit 440 beyond the kickdown valve 189 leading to the kickdown inhibitor valve 228 is omitted, and a branch conduit 964 is substituted leading from the conduit 440 to the port 955 in the casing portion 500 of the 1-2 shift valve 194. The port 965 is opposite the port 502 and is in permanent communication with the cavity 528 in the casing portion 500.

(12) The portion of the conduit 409 between its juncture with the conduit 618 and leading to Figure 2C is omitted.

(13) The conduit 654 is omitted, and the port 620 is closed.

Attention is directed to Figure 4 showing the shift pattern of the transmission assembly when automatically operated by means of the heretofore described first embodiment of the control system circuit. As will be noted, the transmission selector valve 185 is provided with positions identified as "D," "3," "2," "1," "N," and "R," corresponding to drive or high speed drive, third speed drive, second speed drive, first speed drive, neutral and reverse, respectively, and the splitter selector valve 221 is provided with positions "N," "L," "D" and "H" corresponding to neutral, low speed drive, automatic drive and high speed drive, respectively. As heretofore mentioned, the First Low, Second Low, Third Low and Fourth Low speed drives are provided when the splitter B is in low speed drive ratio, and the First High, Second High, Third High and Fourth High speed drives are provided when the splitter B remains in high speed drive ratio, such terminology being employed in the following description.

With the transmission selector valve 185 in the drive position, the splitter selector valve 221 in the drive position and the accelerator 187 in its part or fully open throttle position, the transmission assembly will start in First Low speed drive and automatically, as the vehicle speed increases, upshift to Second Low speed drive, then to Third Low speed drive, then to Fourth Low speed drive and finally to Fourth High speed drive. On decreasing vehicle speeds, the transmission assembly will automatically downshift from Fourth High speed drive to Third High speed drive, then to Second High speed drive, then to First High speed high drive and finally to First Low speed drive.

With the selector valves 185 and 221 in the same positions and the accelerator 187 in its full throttle kickdown position which is a position beyond fully opened throttle position and beyond the throttle operating range of the accelerator, the transmission assembly will start in First Low speed drive and upon increasing vehicle speeds, will automatically upshift to Second Low speed drive, then to Third Low speed drive, then to Fourth Low speed drive and finally to Fourth High speed drive. On decreasing vehicle speeds, the transmission assembly will automatically downshift from Fourth High speed drive to Fourth Low speed drive, then to Third Low speed drive, then to Second Low speed drive and finally to First Low speed drive.

With the transmission selector valve 185 in its third speed drive position, the splitter selector valve 221 in its drive position and the accelerator 187 in its part or fully opened throttle position, the transmission assembly will start in First Low speed drive and on increasing vehicle speeds will automatically upshift to Second Low speed drive, then to Third Low speed drive and finally to Third High speed drive. On decreasing vehicle speeds, the transmission assembly will automatically downshift from Third High speed drive to Second High speed drive, then to First High speed drive and finally to First Low speed drive.

With the transmission selector valve 185 and the splitter selector valve 221 in the same positions and the accelerator 187 in its full throttle kickdown position, the transmission will start in First Low speed drive and automatically upshift to Second Low speed drive, to Third Low speed drive and finally to Third High speed drive, and will downshift from Third High speed drive to Third Low speed drive, to Second Low speed drive and finally to First Low speed drive.

With the transmission selector valve 185 in its second speed drive position, the splitter selector valve 221 in its drive position and the accelerator 187 in its part or full throttle position, the transmission will start in First Low speed drive and upshift to Second Low speed drive, and finally to Second High speed drive, and will downshift from Second High speed drive to First High speed drive and finally to First Low speed drive.

With the transmission selector valve 185 and the splitter selector valve 221 in the same positions and the accelerator 187 in its kickdown position, the transmission will start in First Low speed drive and upshift to Second Low speed drive and finally to Second High speed drive, and will downshift from Second High speed drive to Second Low speed drive and finally to First Low speed drive.

With the transmission selector valve 185 in its first speed drive position, the splitter selector valve 221 in its drive position, and the accelerator 187 in any position, the transmission will start in First Low speed drive and upshift to First High speed drive, and will downshift from First High speed drive to First Low speed drive.

With the transmission selector valve 185 in its drive position, the splitter selector valve 221 in its low position, and the accelerator 187 in any position, the transmission will start in First Low speed drive and upshift to Second Low speed drive, to Third Low speed drive, and to Fourth Low speed drive, and will downshift from Fourth Low speed drive to Third Low speed drive, to Second Low speed drive and to First Low speed drive.

With the transmission selector valve 185 in its drive position, the splitter selector valve 221 in its high position and the accelerator 187 in any position, the transmission will start in First High speed drive and upshift to Second High speed drive, to Third High speed drive and to Fourth High speed drive, and will downshift from Fourth High speed drive to Third High speed drive, to Second High speed drive and to First High speed drive.

When the selector valve 185 is set in any of its other forward drive positions, such as in its third position or in its second position, shifts will automatically take place in the transmission unit A from low speed drive to the third speed drive or to the second speed drive, respectively. Assuming the splitter selector valve 221 is either in its high position or its low position, the splitter will remain in either high speed drive or low speed drive.

The various pressures that exist in the hydraulic control system are: line pressure, throttle pressure, compensating pressure, a basic governor pressure and four other regulated governor pressures. The line pressure ably received in a cylindrical cavity 888. The piston 872 is provided with a bore 889 and receives a coiled compression spring 890 bearing against the plug 226. The splitter governor plug 227 comprises a cylindrical member having a reduced diameter tip portion 891 slidably received in a cavity 892. The relative sizes of the cavities may be seen from an inspection of the drawing.

The port 859 is connected to a conduit 893, which is connected to the conduit 440; the ports 860 and 862 are connected by means of a conduit 894; the port 861 is connected to a conduit 895; the port 863 is connected to the conduit 856; the ports 864 and 865 are vented to the sump 174; the port 866 is connected to a conduit 896, to which the conduit 836 is connected; the port 867 is connected to a conduit 897, which is connected to the chamber 76 of the clutch 61 and to which conduit 897 the conduit 875 is connected; the port 868 is connected to the conduit 838; the port 869 is connected to a conduit 898, which is connected to the conduit 597; the port 870 is connected to the conduit 855; and the port 871 is connected to the conduit 538.

The transmission kickdown inhibitor valve 228 comprises a casing portion 899 having ports 900, 901, 902, 903 and 904, all opening into a cylindrical cavity 905. A piston 906 is slidably disposed within the cavity 905 and is provided with spaced lands 907 and 908 and an internal bore 909 to receive a coil spring 910 abutting against the adjacent end wall of the cavity 905.

The port 900 is connected to the conduit 654; the port 901 is connected to the conduit 895; the port 902 is connected to the conduit 440; the port 903 is vented to the sump 174; and the port 904 is connected to the conduit 896.

Various connections between the valves and the pistons for the transmission clutches and brakes will now be described. The conduit 656 is connected to the chamber 45 of the friction clutch 16, and a conduit 911 is connected to the conduit 656 and to the port 100 of the brake servo 84. A conduit 912 joins the conduit 911 and the port 101 of the brake servo 84. The conduit 601 is connected by means of conduits 913 and 914 to the ports 104 and 103, respectively, of the brake servo 84. The conduit 914 is connected to the port 147 of the brake servo 87, and a conduit 915 connects the conduit 914 and the port 148 of the brake servo 87. The port 150 of the brake servo 87 is connected to the conduit 799, and a conduit 916 connects the port 151 and the conduit 799. A conduit 917 is connected to the conduit 799 and to the port 132 of the brake servo 86, and a conduit 918 connects the conduit 917 and the port 133. The conduits 298 and 466 are connected together and to the ports 116 and 117 of the brake servo 85. A conduit 919 is connected to the conduit 897 and to the port 165 of the brake servo 88, and a conduit 920 connects the conduit 919 and the port 166. A conduit 921 connects the ports 167 and 169, and a conduit 922 connects the port 168 of the brake servo 88 and the conduit 747. The conduit 922 is connected to the conduit 802.

Lubrication of the transmission assembly is effected through the hollow shaft 11. The fluid for this lubrication is provided by the fluid discharge of the torque converter through a conduit 923 provided with a check valve 924 of suitable construction and for purposes of illustration is shown as comprising a spring pressed ball 925 resting on a seat 926, so that the fluid flowing through the check valve 924 flows through the hollow shaft 11 for lubricating the transmission assembly.

It is contemplated that in lieu of this lubrication means for the transmission assembly, lubrication means, such as valves may be provided, and lubricating fluid may be withdrawn from anywhere in the line and regulated for this purpose. For this modification, attention is directed to Figure 2DD, which in order to make a complete hydraulic system should be substituted for Figure 2D, and when Figure 2DD is substituted for Figure 2D, the conduit 923 and check valve 924 are allowed to freely discharge into the sump 174.

Referring to Figure 2DD, the lubrication valve 927 comprises a casing portion 929 having ports 930, 931, 932, 933 and 934, opening into communicating concentric cylindrical cavities 935 and 936 of different diameters, the cavity 935 having the larger diameter. Slidably disposed within the cavities 935 and 936 is a piston 937 having a land 938 of a diameter substantially equal to the diameter of the cavity 935 and a land 939 of a diameter substantially equal to the diameter of the cavity 936; these lands being separated by an annular groove 940. The piston 937 is provided with an internal bore 941 to receive a coil spring 942 bearing against the adjacent end wall of the cavity 935.

The ports 930 and 932 are connected to the conduit 337; the ports 931 and 934 are vented to the sump 174; and the port 933 is connected to a conduit 943 having spaced restrictions 944 and 945 therein; the restriction 945 being of greater diameter than the restriction 944. The conduit 943 is connected to a conduit 946 leading to the hollow shaft 11 and the lubricating passages of the transmission.

The lubricating valve 928 comprises a casing portion 947 having ports 948, 949, 950, 951 and 952, communicating with communicating concentric cylindrical cavities 953 and 954 of different diameters, the cavity 953 being of the larger diameter. A piston 955 is slidable within the cavities and is provided with a land 956 of a diameter substantially equal to the diameter of the cavity 953, an annular groove 957, and a land 958 of a diameter substantially equal to the diameter of the cavity 954. The piston 955 is provided with an internal bore 959 receiving a coil spring 960 bearing against the adjacent end wall of the cavity 953.

The port 948 is connected to the conduit 943; the ports 949 and 951 are connected to the conduit 337; the port 950 is vented to the sump 174; the port 952 is connected to a conduit 961 which is connected to the conduit 298. It must be particularly noted that the flow of fluid in the conduit 337 from the pumps 81 and 83 is never blocked by the pistons 937 and 955, regardless of their positions.

A further modification of the control system is illustrated in dotted lines in Figures 2A, 2B and 2E and comprises a conduit 962 connected at one end to a port 283 of the pressure regulator valve 179 and at the other end to the conduit 538 adjacent the 1–2 shift valve 194.

Reference is now made to Figure 3, showing the arrangement of Figures 2A, 2D, 3B, 3E and 3G, in order to illustrate a second embodiment of the invention which constitutes a complete hydraulic control system for the four speed unit A used alone without the splitter B.

As will hereinafter appear from the description of operation of the units A and B used in tandem, the hydraulic parts shown in Figures 2C, 2F and 2H are associated with the splitter B, and, therefore, when the splitter B is not used, all of the parts shown in Figures 2C, 2F and 2H are dispensed with. All of the hydraulic control parts shown in Figures 2A, 2D, 2B, 2E and 2G are used; however, the conduits connecting the Figures 2B, 2E and 2G with the Figures 2C, 2F and 2H are, of course, not needed, and various other modified connections are made between the hydraulic parts of Figures 2B, 2E and 2G, all of these modified connections being shown for the sake of simplicity in the three new Figures 3B, 3E and 3G substituted for Figures 2B, 2E and 2G and used in connection with Figures 2A and 2D for showing the modification of the invention utilizing only the main transmission unit A.

Figures 3B, 3E and 3G are identical with Figures 2B, 2E and 2G with the following exceptions:

(1) The conduit 368 and the portion of the conduit 700 leading to Figure 2F are dispensed with, and a conduit 963 is substituted for connecting the port 359 of the neutral valve 183 with the remaining portion of the conduit 700.

(2) The branch conduit 685 is omitted.

(3) The portion of the conduit 411 from its point of connection with the conduit 499 and leading to the Figure 2F is dispensed with.

(4) The conduit 745 is dispensed with, and the port 149 of the servo motor 87 is closed.

(5) The portion of the conduit 799 from its juncture with the conduit 541 and leading to Figure 2F is dispensed with.

(6) The portion of the conduit 538 leading from its juncture with the conduit 540 to Figure 2F is dispensed with.

(7) The portion of the conduit 410 from its juncture with the conduit 559 to Figure 2F is dispensed with.

(8) The conduit 782 is dispensed with, and the port 102 in the servo motor 84 is closed.

(9) The conduit 839 is omitted.

(10) The conduit 898 is omitted.

(11) A portion of the conduit 440 beyond the kickdown valve 189 leading to the kickdown inhibitor valve 228 is omitted, and a branch conduit 964 is substituted leading from the conduit 440 to the port 965 in the casing portion 500 of the 1-2 shift valve 194. The port 965 is opposite the port 502 and is in permanent communication with the cavity 528 in the casing portion 500.

(12) The portion of the conduit 409 between its juncture with the conduit 618 and leading to Figure 2C is omitted.

(13) The conduit 654 is omitted, and the port 620 is closed.

Attention is directed to Figure 4 showing the shift pattern of the transmission assembly when automatically operated by means of the heretofore described first embodiment of the control system circuit. As will be noted, the transmission selector valve 185 is provided with positions identified as "D," "3," "2," "1," "N," and "R," corresponding to drive or high speed drive, third speed drive, second speed drive, first speed drive, neutral and reverse, respectively, and the splitter selector valve 221 is provided with positions "N," "L," "D" and "H" corresponding to neutral, low speed drive, automatic drive and high speed drive, respectively. As heretofore mentioned, the First Low, Second Low, Third Low and Fourth Low speed drives are provided when the splitter B is in low speed drive ratio, and the First High, Second High, Third High and Fourth High speed drives are provided when the splitter B remains in high speed drive ratio, such terminology being employed in the following description.

With the transmission selector valve 185 in the drive position, the splitter selector valve 221 in the drive position and the accelerator 187 in its part or fully open throttle position, the transmission assembly will start in First Low speed drive and automatically, as the vehicle speed increases, upshift to Second Low speed drive, then to Third Low speed drive, then to Fourth Low speed drive and finally to Fourth High speed drive. On decreasing vehicle speeds, the transmission assembly will automatically downshift from Fourth High speed drive to Third High speed drive, then to Second High speed drive, then to First High speed high drive and finally to First Low speed drive.

With the selector valves 185 and 221 in the same positions and the accelerator 187 in its full throttle kickdown position which is a position beyond fully opened throttle position and beyond the throttle operating range of the accelerator, the transmission assembly will start in First Low speed drive and upon increasing vehicle speeds, will automatically upshift to Second Low speed drive, then to Third Low speed drive, then to Fourth Low speed drive and finally to Fourth High speed drive. On decreasing vehicle speeds, the transmission assembly will automatically downshift from Fourth High speed drive to Fourth Low speed drive, then to Third Low speed drive, then to Second Low speed drive and finally to First Low speed drive.

With the transmission selector valve 185 in its third speed drive position, the splitter selector valve 221 in its drive position and the accelerator 187 in its part or fully opened throttle position, the transmission assembly will start in First Low speed drive and on increasing vehicle speeds will automatically upshift to Second Low speed drive, then to Third Low speed drive and finally to Third High speed drive. On decreasing vehicle speeds, the transmission assembly will automatically downshift from Third High speed drive to Second High speed drive, then to First High speed drive and finally to First Low speed drive.

With the transmission selector valve 185 and the splitter selector valve 221 in the same positions and the accelerator 187 in its full throttle kickdown position, the transmission will start in First Low speed drive and automatically upshift to Second Low speed drive, to Third Low speed drive and finally to Third High speed drive, and will downshift from Third High speed drive to Third Low speed drive, to Second Low speed drive and finally to First Low speed drive.

With the transmission selector valve 185 in its second speed drive position, the splitter selector valve 221 in its drive position and the accelerator 187 in its part or full throttle position, the transmission will start in First Low speed drive and upshift to Second Low speed drive, and finally to Second High speed drive, and will downshift from Second High speed drive to First High speed drive and finally to First Low speed drive.

With the transmission selector valve 185 and the splitter selector valve 221 in the same positions and the accelerator 187 in its kickdown position, the transmission will start in First Low speed drive and upshift to Second Low speed drive and finally to Second High speed drive, and will downshift from Second High speed drive to Second Low speed drive and finally to First Low speed drive.

With the transmission selector valve 185 in its first speed drive position, the splitter selector valve 221 in its drive position, and the accelerator 187 in any position, the transmission will start in First Low speed drive and upshift to First High speed drive, and will downshift from First High speed drive to First Low speed drive.

With the transmission selector valve 185 in its drive position, the splitter selector valve 221 in its low position, and the accelerator 187 in any position, the transmission will start in First Low speed drive and upshift to Second Low speed drive, to Third Low speed drive, and to Fourth Low speed drive, and will downshift from Fourth Low speed drive to Third Low speed drive, to Second Low speed drive and to First Low speed drive.

With the transmission selector valve 185 in its drive position, the splitter selector valve 221 in its high position and the accelerator 187 in any position, the transmission will start in First High speed drive and upshift to Second High speed drive, to Third High speed drive and to Fourth High speed drive, and will downshift from Fourth High speed drive to Third High speed drive, to Second High speed drive and to First High speed drive.

When the selector valve 185 is set in any of its other forward drive positions, such as in its third position or in its second position, shifts will automatically take place in the transmission unit A from low speed drive to the third speed drive or to the second speed drive, respectively. Assuming the splitter selector valve 221 is either in its high position or its low position, the splitter will remain in either high speed drive or low speed drive.

The various pressures that exist in the hydraulic control system are: line pressure, throttle pressure, compensating pressure, a basic governor pressure and four other regulated governor pressures. The line pressure remains substantially constant for forward drives and may be of the order of 95 p.s.i. For reverse drive it is boosted and may be of the order of 200 p.s.i. and it also may be boosted for the low speed forward drive in the unit A to a value such as 135 p.s.i. The throttle pressure which may be hereinafter referred to as TV pressure varies with the throttle opening movement given the accelerator and in a certain embodiment may vary form 12 p.s.i. to 95 p.s.i. The compensating pressure also varies with accelerator movement and with increased engine throttle openings may vary from 45 p.s.i. to 95 p.s.i. The basic governor pressure is provided by the hydraulic governor valves 181 and 182 and varies with the speed of the driven shaft of the transmission and may vary from 0 to 95 p.s.i. The regulated governor pressures also vary with the speed of the driven shaft of the transmission and increase faster or more slowly than the basic governor pressure.

Figure 5 shows the curves 966 and 967 for the TV and compensating pressures, respectively. Figure 6 shows the curves for the basic governor pressure 968 and the various regulated governor pressures 969, 970, 971 and 972, all of which vary with the speed of the driven shaft of the transmission. Figure 6 also shows a so-called primary governor pressure 973 which is the pressure output of the governor valve 181 and a secondary governor pressure 974 which would be the output of the governor 182 but for the influence of the primary governor pressure thereon.

Attention is directed to Figures 2A to 2H. Assuming that the vehicle engine is operating and the accelerator 187 is in its closed throttle position, as shown, the front pump 81 will be operating, due to the rotation of the drive shaft 10, and will supply fluid under pressure, hereinafter referred to as line pressure, to the control system and particularly to the conduits 260 and 272.

Fluid under pressure from the pump 81 will flow to the conduit 260 and to the converter feed valve 178. With the engine idling at a low speed or where there is insufficient pressure in the system from the pump 81 to feed the valves in the control system, the spring 258 will hold the piston 254 to the left, thereby blocking the port 248 by means of the land 255 and preventing a flow of line pressure to the torque converter 13. When the pressure in the conduit 260 reaches its normal value of 95 p.s.i., the fluid acts on the facing sides of the lands 255 and 256 and since the land 255 is larger in diameter than the land 256, the piston 254 moves to the right against the force of the spring 258, thereby allowing a flow of fluid from the conduit 260, through the port 250, the groove 257, the port 248, the conduit 241 and the restriction 242 into the conduit 245. Because of the restriction 242 in the conduit 241, there is a drop in pressure to the torque converter. Flow of fluid is also through the port 247 to the conduit 244, through the port 232 and into the cavity 235 of the converter feed valve 177. However, the piston 236 of the valve 177 does not move to the right against the spring 240, since the spring exerts too much force. The feed valve 177 operates when the transmission is conditioned for reverse speed drive as hereinafter described. Fluid under pressure flows through the conduit 245, the converter 13, the conduit 923 and check valve 924 to the transmission parts to be lubricated.

Line pressure will also flow from the pump 81 to the conduit 272, the conduit 337, the conduit 336. From the latter it will flow to the conduit 335 and the port 389 of the selector valve 185. It flows around the land 398 to the port 386 and the conduit 408, to the port 422 of the throttle valve 188, from the port 419 of the throttle valve to the conduit 442, to the conduit 439 and thereby to the port 416 of the kickdown valve 189 and the port 449 of the compensating valve 190. Line pressure from the conduit 439 will also flow into the conduit 685 to the port 667 of the transmission governor pressure low-high compensation valve 211, from the port 662 to the conduit 681, to the port 769 of the fourth speed governor pressure control valve 218, from the port 767 to the conduit 781, to the port 789 of the first speed governor pressure control valve 219 and around the valve 219 to the ports 785 and 786. From the port 785, pressure flows into the conduit 800 to the port 809 and into the cavity 810 of the first speed governor pressure valve 220. Fluid pressure from the port 786 flows into the conduit 801, to the port 808 of the first speed governor pressure valve 220, from the port 804 to the conduit 817, to the port 824 of the splitter selector valve 221, around the valve 221, to the port 823, to the conduit 840, to the port 848 and 842 of the splitter pilot valve 222, to the conduit 855, to the port 870 of the splitter downshift inhibitor plug 226 and into the cavity 888.

The fluid pressure in the conduits 335 and 336 to the ports 322 and 345 of the primary and secondary governor valves 181 and 182, respectively, is blocked because of the positions of the pistons 328 and 350, respectively, which are in their positions as shown. The primary and secondary governor valves 181 and 182, respectively, are inoperative, at this time, since the output shaft 12 is not rotating.

The line pressure supplied to the conduit 272 flows to the port 279 of the pressure regulator valve 179 and into the cavity 286 in the piston 285. Initially, the piston 285 is in a lowermost position wherein the ports 287 and 280 are connected, so that fluid flows from the cavity 286, through the ports 287 and 280, into the conduit 274 and into the chamber 262 below the casing 263. The casing 263 will therefore be retained in its illustrated position wherein the pump is in its eccentric position to supply the required pressure in the line. When the demand of line pressure is reached, the piston 285 will be moved up against the spring 297, so that the port 287 will connect with the port 281 and fluid will then flow from the port 287, into the port 281, into the conduit 273 and into the top of the chamber 262 above the casing 263. The spring 267 below the casing 263 is very light and is used only to position the casing 263 in its full eccentric position for starting purposes. The valve piston 285, after the predetermined line pressure is reached in the conduit 272, vibrates across the ports 280 and 281 and maintains reduced pressures in the top and bottom of the chamber 262, against the top and bottom of the casing 263, respectively, and, these pressures are maintained by the valve piston 285, so that the eccentricity of the pump is controlled to maintain the line pressure to the predetermined desired value (in this case 95 p.s.i.) within the limits of the pump capacity. It should be noted that during normal operation of the pump, the fluid supplied to the chamber 262 at the top of the casing 263 is never line pressure since the pressure bleeds across the ports 287 and 281.

The fluid supply to the inlet chamber 269 of the pump 81 is through the conduit 271, the conduit 310, the coil 309 of the oil cooler 305, the conduit 311, and the conduit 271 from the sump 174. The fluid is filtered by means of the screen 175 to remove any foreign particles therein. If the fluid moves in the cooler 305 too sluggishly, the check valve 312 will open to allow a flow of fluid directly through the conduit 271 to the pump inlet chamber 269.

On movement of the accelerator 187 toward open throttle position, throttle or TV pressure is produced by a metering of line pressure between the land 429 of the piston 428 of the throttle valve 188 and the port 422 and flows to the port 420. Flow from the port 420 is to the conduit 441, to the port 418 and into the cavity 426 between the throttle valve piston 428 and the piston 433 of the kickdown valve 189. As the accelerator is moved toward its open throttle position, it provides a force on the valve piston 428 by means of the member 413 and the spring 432, tending to move the piston 428 to the left so as to move the land 429 to open the port 422 with respect to the port 420. The throttle pressure applied on the other end of the piston 428 through the port 418 tends to move the piston 428 back again so as to close the port 422 by means of the land 429, so that the net effect is to meter fluid pressure between the land 429 and the port 422 to provide a regulated throttle pressure in the conduit 468 which increases with the movement of the accelerator 187 toward its open throttle position. Flow of TV pressure from the conduit 441 is also through the conduit 468, to the conduit 467, to the port 447 and into the cavity 452 in the casing portion 443 of the compensating valve 190. Flow of TV pressure in the conduit 468 is to the port 514 of the 2–1 downshift plug and into the cavity 525. Also, the flow of TV pressure from the conduit 468 is to the conduit 542, to the port 512 and into the cavity 517. Flow from the cavity 517 is through the port 503 to the conduit 538 and to the conduit 540, to the port 505 and to the cavity 519 of the 1–2 shift valve 194. Flow in the conduit 538 is also to the port 871 and into the cavity 882 of the splitter downshift plug 224.

From the cavity 525, the TV pressure flows through the port 501, to the conduit 536, to the port 575 and into the cavity 586 of the 3–2 downshift plug 201.

Flow of TV pressure from the conduit 536 is also to the conduit 602, to the port 572 and into the cavity 578. Flow from the cavity 578 is through the port 563, to the conduit 599, through the port 565 and into the cavity 580 of the 2–3 shift valve 200.

Flow from the cavity 586 is through the port 561, to the conduit 597, to the port 632 and into the cavity 643 of the 4–3 downshift plug 207.

Flow of TV pressure from the conduit 597 is also to the conduit 657 to the port 629 and into the cavity 636. From the cavity 636 TV pressure flows through the port 621 and into the conduit 655, to the port 622 and into the cavity 637 of the 3–4 shift valve 206.

Flow of TV pressure from the conduit 597 is also to the conduit 898, to the port 869 and into the cavity 874. From the cavity 874, TV pressure flows through the port 860, into the conduit 894, to the port 862 and into the cavity 877 of the splitter shift valve 223.

Compensating pressure is provided by a metering of line pressure between the land 455 of the compensating valve piston 453 and the port 449. Compensating pressure flows around the groove 458 and to the port 445. The compensating pressure flows from the port 445, to the conduit 465, to the port 474 of the first gear pressure control valve 192 and around the piston 477 to the port 470 and into the conduit 481. From the conduit 465, compensating pressure also flows to the conduit 464, to the port 444 and into the cavity 451, where it acts upon the land 454 of the piston 453, so that with the compensating pressure so acting on the land 454 and TV pressure within the cavity 462 acting on the land 456 together with the force of the spring 463, a regulating action of the piston 453 is effected. As is apparent, the throttle pressure applied to the land 456 augments the action of the spring 463 also effective on the land 456 and functions to move the valve piston 453 to the left and open up the port 449. The compensating pressure in the port 444 acting against the land 454 tends to move the piston 453 back again so that the compensating pressure in the conduit 465 varies with but is if different magnitude than throttle pressure.

Flow of compensating pressure in the conduit 481 is to the port 511 of the 1–2 shift valve 194 around the land 516 of the piston 515 to the port 504 and to the conduit 539. From the conduit 539, the pressure flows to the port 571 and around the land 577 of the 2–3 shift valve 200, to the port 564 and to the conduit 600, where it flows to the port 628 of the 3–4 shift valve 206.

Compensating pressure in the conduit 600 flows to the conduit 839 and the conduit 838, and flows in the conduit 838 to the port 868 of the splitter shift valve 223. The flow in the conduit 838 is also to the port 822 and into the cavity 825 of the splitter selector valve 221.

Under the conditions above described, the governor is not in operation, so that governor pressure is not supplied to the control system. Also, with the selector valves 185 and 221 in their neutral positions, no pressures are supplied to the brake servos or to the pressure receiving chambers of the friction clutches, so that no friction element is engaged and the transmission is not conditioned for a forward speed drive or reverse speed drive.

As heretofore stated, the automatic operation of the control system will first be described with respect to the shift patterns illustrated in Figure 4.

To condition the unit A and the splitter B for drive range, the piston 396 of the selector valve 185 is manually moved to the right, as illustrated in the drawings, so that the detent ball 405 is positioned in the groove 399 which corresponds to the "D" position, and the piston 826 of the splitter selector valve 221 is moved to the left, as illustrated in the drawings, so that the detent ball 835 will be positioned in the groove 833 corresponding to its "D" position.

With the selector valves so positioned, line pressure will flow from the conduit 336, around the groove between the lands 397 and 398 of the valve piston 396, through the ports 390 and 385 into the conduits 369 and 407, respectively. Pressure in the conduit 369 is thus supplied to the port 360 of the neutral valve 183 and flows through the groove 367 to the port 359 and into the conduit 368. Any pressure in the conduit 368 flows through the port 361 to the right end of the valve piston 364 and tends to move the valve piston 364 to the left to block the port 360 by means of the land 366. The valve 183 is a regulating valve and supplies a pressure to the conduit 368, which is its output conduit, that is, substantially equal to the pressure supplied to its port 358 from the conduit 355. The conduit 355 carries a basic governor pressure, as will be hereinafter described that increases with the speed of the vehicle, and the valve 183 functions to regulate line pressure from the conduit 369 so as to provide pressure in the conduit 368 that has substantially the same value and varies substantially in the same manner with vehicle speed as the governor pressure in the conduit 355. When the selector valve 185 is first put in its D position, there is an inappreciable pressure in the conduit 368 corresponding to the zero governor pressure in the conduit 355, which pressure in the conduit 368 is just sufficient to move the piston 364 into its position blocking the port 360 supplied with line pressure. Line pressure in the conduit 407 flows through the port 472 in the first gear pressure control valve casing 469, around the groove between the lands 478 and 479, to the port 473 and into the conduit 483. Pressure in the conduit 483 flows to the ports 134 and 135 in the chambers 129 and 130, respectively, of the brake servo 86 and acts against the left faces of the pistons 125 and 136 to move the pistons to the right against the force of the spring 128, to engage the friction brake 19.

At the same time, line pressure no longer flows into the conduit 840 from the port 823 of the splitter selector valve 221, since the port 823 is blocked by the land 830 which is positioned between the ports 823 and 824, but compensating pressure from the conduit 838 flow around the groove between the lands 828 and 829, through the port 821 into the conduit 837, to the port 170 of the servo 88 of the friction brake 68.

Compensating pressure from the port 170 flows into the chamber 163, to the port 169, into the conduit 921, to the port 167 and into the chamber 162. Compensating pressure acting against the left faces of the pistons 158 and 171 moves the pistons to the right against the force of the spring 161 to engage the friction brake 62. The First Low speed power train is thus completed through the transmission assembly.

Thus, when the foot throttle is depressed, the vehicle engine throttle (not shown) will be opened to admit fuel to the engine, and the vehicle will start in First Low speed drive. When this occurs, the shaft 12 will rotate, and the rear pump 83 will draw fluid from the sump 174 through the screen 176, into the conduit 303 and into the pump 83, and will deliver fluid under pressure to the conduits 304 and 382. The check valve 339 prevents the flow of line pressure oil developed by the front pump 81 from flowing to the rear pump 83, but if the pressure from the rear pump 83 becomes sufficiently high, the check valve 339 will open to allow a flow of rear pump oil to the conduit 337. One use of the rear pump is to supply pressure to the conduit 382, the port 372 of the reverse inhibitor valve 184 and to the cavity 376, to act against the land 379 of the piston 377 and move the piston 377 to the left against the force of the spring 380. Such movement blocks the port 371 by means of the land 379 and provides communication between the ports 373 and 374 to prevent any fluid flow from the port 371 to the port 373 and into the conduits 383 and 298, so that the engagement of the reverse brake 18 will be inhibited. The port 374 is vented to the sump 174, and any fluid in the conduits 466, 298 and 383 will flow to the sump.

Since the output shaft 12 is rotating, the housings 316, 321 and 343 will be rotating, and the pistons 328 and 350 of the governor valves 181 and 182, respectively, will be moved outwardly by centrifugal force. The weight 334 attached to the piston 328 of the primary governor valve 181 causes this piston to exert a greater centrifugal force than the piston 350. As before stated, line pressure from the front pump 81 is supplied to the conduits 336 and 335.

Line pressure in the conduit 335 flows to the port 322, and as the piston 328 is moved outwardly to move its land 330 off the port 322, fluid under pressure flows between the lands 330 and 329 to the port 325 which constitutes the output port for the governor valve 181. Because of the differential area of the lands 330 and 329, the land 329 being of a larger diameter than the land 330, fluid pressure between the lands will tend to move the piston 328 inwardly. Just sufficient pressure enters the port 322 as is necessary to balance the effect of centrifugal force on the piston so as to meter fluid between the land 330 and the port 322 and provide a regulated pressure in the port 325, which is hereinafter referred to as primary governor pressure. This is shown in Fig. 6 as curve 973. This primary governor pressure will increase with the rotational speed of the governor 180, since increased centrifugal force on the valve 181 will tend to move the valve piston 328 outwardly and will allow an increased amount of fluid from the port 322 to the port 325. The port 324 acts to vent excess primary governor pressure in the passage 338 off to the drain port 323. This excess governor pressure might occur through a speed reduction, and the port 324 assures that the primary governor pressure in the port 325 decreases along with decreasing governor speed. In this case, the larger diameter land 329 having the excessive fluid pressure applied to it will move the piston 328 inwardly against the action of the centrifugal force thereon which has decreased due to a reduction in speed of the governor 180.

Line pressure in the conduit 336 flows to the port 345, and because the piston 350 of the governor valve 182 is moved outwardly under the action of the centrifugal force moving the land 351 off the port 345, the fluid flows between the lands 351 and 352 to the port 346. The port 346 is the output port of the secondary governor valve 182. The secondary governor valve 182 is substantially identical with the primary governor valve 181 except that no separate weight is provided on the valve 182. As in the primary governor valve, there is a differential area between the lands 351 and 352, the land 352 being of a larger diameter, and the pressure in the port 346 will act on the land 352 tending to move the piston inwardly against the action of the centrifugal force on the piston, so that, if no other forces were applied on the piston 350, the output governor pressure provided in the port 346 would follow the curve 974 in Fig. 6, which is the secondary governor pressure curve. The piston 350 functions to meter fluid flow between the land 351 and the port 345 to the output port 346 in the same manner as the valve piston 328 functions to meter fluid flow from the port 322 to the port 325.

The output governor pressure from the governor valve 181 is impressed on the governor valve 182 so as to provide an output governor pressure in the port 346 which is under the influence of both the governor valves 181 and 182.

Pressure in the passage 338 flows through the passage 317 in the governor casing 316, to the port 319 and into the cavity 318, where it acts upon the plug 320 and moves the plug outwardly, and since the plug 320 abuts the piston 350, the movement of the plug 320 assists the centrifugal force in moving the piston 350 outwardly. Thus, the pressure from the port 346 into the passage 356 and the conduit 355 is modified from that illustrated by the curve 974 and follows the curve 968, Fig. 6. This latter modified pressure is hereinafter referred to as basic governor pressure. As is obvious, governor pressure for any particular speed of the governor, has a value intermediate that of the curves 973 and 974 for the same governor speed.

The neutral valve 183, as has been described, functions as a regulator valve and regulates to supply the same pressure to the conduit 368 since the basic governor pressure from the conduit 355 is applied to the left end of the valve piston 365, and this governor pressure tends to move the piston 264 to the right, opening the port 360 to the port 359 connected with the outlet conduit 368. The pressure in the conduit 368 applied through the port 361 to the right end of the piston 364 tends to move the piston back again to close the port 360 by means of the land 366. The net effect is a metering of the line pressure from the conduit 369 between edges of the land 366 and the port 360 to provide a pressure in the conduit 368 which is substantially the same as basic governor pressure in the conduit 355. Therefore, the same basic governor pressure may be considered to be present in the conduit 368 as is present in the conduit 355 and the pressure in the conduit 368 will hereinafter be referred to as basic governor pressure. The valve 183 will, of course, only be effective to provide governor pressure in its outlet conduit 368 when the line pressure is supplied to the valve 183 to the conduit 269, which is the case only when the selector valve 185 is in its 1, 2, 3 or D positions. Line pressure is not supplied from the selector valve 185 to the conduit 369 in the N and R positions of the selector valve 185 herein described and hence for these latter positions of the selector valve there is no governor pressure in the outlet conduit 368 for the valve 183. The valve 183 is provided with this 1-1 regulating effect so that any unusual leakage in the outlet conduit 368 for the valve 183 will not be effective through the governor conduit 355 on the governor valves 182 and 183 themselves, thus possibly influencing the regulating effect of the governor valves; the valve 183 in effect insulating the basic governor conduit 355 and the governor valves themselves. Flow of governor pressure in the conduit 368 is to the conduits 683 and 728 and to the port 708 of the third speed governor pressure valve 214.

Flow of governor pressure in the conduit 683 is to the port 664, into the cavity 671 of the low-high compensation valve 211 and to the port 663, to the conduit 682 and to the port 693 where it is blocked by the land 697. Governor pressure in the cavity 671 acts against the land 674 of the piston 672 thereby moving the piston 672 to the left and moving the land 673 off the port 667, so that pressure from the line pressure supplied conduit 685 flows to the port 666, which constitutes the output port of the valve 211. Since there is a differential area between the lands 673 and 674, the land 674 being of a larger diameter than the land 673, the pressure in the port 666 and in the conduit 687 connected thereto will tend to move the piston 672 to the right against the governor pressure applied on the right end of the piston 672. The land 673 meters fluid pressure from the port 667 to the port 666, and the pressure in the port 666 acting on the land 674 balances the governor pressure acting on the other side of the land. Assuming that the governor pressure increases, the piston 672 will move to the left and increase the pressure in the conduit 687 until this increased pressure moves the piston 672 back again. Conversely, if the pressure in the conduit 687 is greater than it should be to correspond with the governor pressure in the conduit 682, the piston 672 will move to the right to connect the port 666 with the vent port 665 to relieve some of the fluid pressure in the conduit 687, the metering effect in this case being between the land 674 and an edge of the port 665.

After the pressure in the conduit 687 has increased to a predetermined value, the pressure in the port 666, connected conduit 687 and connected port 669 is effective on the plug 212 and moves the plug to the right against the action of the spring 678 so as to connect the port 669 with the port 660 and allow a flow of fluid pressure to the port 660. The pressure in the port 660 flows through the conduit 680 and port 661 to the right end of the plug 212, and this pressure augments the pressure of the spring 678, tending to move the plug 212 back again to the left so as to close the port 660. The pressure in the conduit 680 is thus regulated to a predetermined lower value with respect to the pressure in the conduit 687. The regulated pressure in the conduit 680 flowing through the port 661 is also applied on the left end of the land 673 on the valve piston 672 and tends to move the piston 672 to the right and decrease the output pressure in the conduit 687 metered from the valve piston 672. The output pressure from the valve piston 672 is thus regulated solely due to output pressure from the valve piston 672 applied to the left end of the large size land 674 and the governor pressure in the conduit 682 applied to the other side of the land 674 until the pressure output from the valve piston 672 in the port 666 and conduit 687 reaches a predetermined value after which the plug 212 moves to the right to open the port 660 and provide a regulated pressure in the conduit 680 which changes the rate of response of the output pressure in the port 666 to the governor pressure in the port 664. The resulting regulated pressure in the conduit 687 is shown by the curve 969 in Fig. 6. The regulated pressure in the conduit 687 is employed for upshifting the unit A when the splitter B is in its low speed drive.

Flow of the output pressure from the valve 211 is through the conduit 684, to the conduit 687, to the port 692 of the control valve 213, between the lands 697 and 698 of the piston 696 to the port 689 and into the conduit 700. Flow of the regulated pressure in the conduit 700 is to the conduits 498 and 558.

Flow in the conduit 498 is to the port 488 of the 1-2 pilot valve 193, between the lands 493 and 494 to the port 485 and to the conduit 496, where it flows to the port 506 in the casing 500 of the 1-2 governor plug 198 and acts against the right hand face of the plug 198 tending to move the plug and the 1-2 shift valve 194 to the left.

Flow in the conduit 558 is to the port 548 of the 2-3 pilot valve 199 between the lands 553 and 554, to the port 545, to the conduit 556 and to the port 566 in the casing portion 560 of the 2-3 governor plug 204, where it acts against the plug 204 tending to move the plug and the 2-3 shift valve 200 to the left.

Flow in the conduit 558 is also to the port 608 of the 3-4 pilot valve 205, between the lands 613 and 614, to the port 605, to the conduit 616, and to the port 623 in the casing portion 619 of the 3-4 governor plug 210, where it acts against the face of the plug 210 tending to move the plug 210 and the 3-4 shift valve 206 to the left.

As heretofore stated, TV pressure is present in the cavity 525 and acts on the 2-1 downshift plug 195 and tends to move the plugs 195, 196 and 197 to the right against the force of the spring 532, but TV pressure is applied to the right face of the downshift inhibitor plug 197 reinforcing the force of the spring 532 and preventing the movement, so that the plugs 195, 196 and 197 remain in the positions shown during upshifting of the transmission. TV pressure is also applied to the left face of the 1-2 shift valve 194 reinforcing the force of the spring 532 holding the piston in its illustrated position, but TV pressure is applied to the differential area of the lands 518 and 516 by means of the conduits 538 and 540, decreasing the effective force of the spring 532 and the pressure against the land 516. Therefore, a predetermined pressure on the plug 198 is required to overcome the forces holding the shift valve 194 in its illustrated position and move the 1-2 shift valve toward the left to cause upshifting of the transmission. The TV pressure is similarly effective for the 2-3 valve 200 and the 3-4 valve 206, so that predetermined governor pressures are required on the plugs 204 and 210, respectively, the 2-3 shift valve 200 and the 3-4 shift valve 206, respectively, to the left to upshift the unit A. These governor pressures will be higher than that for the 1-2 valve because of the relative sizes of the plugs and valves, which may be seen from an inspection of the drawings.

The valve 214 is a regulator valve which functions under the control of the basic governer pressure to provide a governor pressure that varies with the speed of the driven shaft 12 but is lower than basic governor pressure. Basic governor pressure (as shown by curve 968) in the conduit 368 flows to the port 708 of the third speed governor pressure valve 214 into the cavity 704 and acts against the differential area of the lands 716 and 717 tending to move the piston 714 to the right and allowing a flow of fluid pressure into the cavity between the lands 715 and 716 to the port 706, the conduit 725 and the conduit 726. Fluid pressure in the conduit 726 flows to the port 707 and into the cavity 704 where it acts against the right face of the piston 714 thereby tending to move the piston 714 to the left against the action of the pressure on the differential area of the lands 716 and 717, so that the land 716 closes the port 708 with respect to the port 706. The land 716 thus meters fluid flow between it and into the port 708.

Basic governor pressure in the conduit 368 also flows through the conduit 728 to the port 713 and into the cavity 703 where it acts against the plunger 215 tending to move the plunger to the right against the force of the spring 722. When the basic governor pressure in the conduit 728 reaches a predetermined value the plunger 215 will be moved to the right to open the port 712 with respect to the port 713, and the same movement of the plunger 215 also closes the vent port 711. The fluid flowing through the port 712 flows through the conduit 727 and through the port 710 so as to be impressed on the right end of the plunger 215 tending to return the plunger to the left to close the port 712. The plunger 215 thus meters fluid flow between an edge of the port 712 providing a regulated pressure in the conduit 727 which varies with basic governor pressure in the conduit 728, but is less than this basic governor pressure. This regulated pressure in the conduit 727 is also impressed through the port 710 on the left end of the valve 214 so as to assist the action of the governor pressure impressed on the differential area of the lands 716 and 717 in moving the valve 214 to the right and modulates the regulating action of the valve 214 after the predetermined basic governor pressure has been reached that moves the plunger 215 into its regulating position. The valve 214 thus modifies the basic governor pressure shown by curve 968, regulating this pressure to a lower value. The output pressure from the valve 214 is shown by pressure curve 971 in Figure 6 and may be referred to as third speed splitter governor pressure.

Flow of basic governor pressure in the conduit 724 is to the port 736, in the third speed governor pressure control valve 216, and around the piston 738 where it has no effect at this time due to the position of the piston 738. Flow of the third speed splitter governor pressure in the conduit 726 is to the port 735 of the third speed governor pressure control valve 216, between the lands 739 and 740, to the port 731 and to the conduit 746.

Flow of third speed splitter governor pressure in the conduit 746 is to the port 752 of the fourth speed governor pressure valve 217 and into the cavity 755 where it acts against the differential areas of the faces of the lands 758 and 759 and moves the piston 756 to the right. Fluid pressure then flows around the face of the land 758, between the lands 757 and 758 to the port 750 and into the conduit 763, and to the conduit 764. Fluid pressure in the conduit 764 flows to the port 751, into the cavity 755 and acts against the right face of the land 759 to tend to move the piston 756 to the left. This movement to the left of the piston 756 moves the land 758 to block the port 752 and meter fluid flow between the land 758 and an edge of the port 752. A balance of forces is set up between that due to the output pressure in the conduit pressure 763 from the valve 756 applied to the right end of the valve 756 and that due to the third speed splitter governor pressure flowing through the conduit 746 and applied to the left face of the land 759. The valve 756 in its regulating action, in effect, reduces the third speed splitter governor pressure, providing a fourth speed splitter governor pressure in the conduit 763, which is the output conduit of the valve 756, this fourth speed splitter governor pressure being shown by the curve 972 in Figure 6.

Flow of the fourth speed splitter governor pressure in the conduit 763 is to the ports 806 and 807 of the low speed governor pressure valve 220 and into the chamber 811 on opposite sides of the land 814. Pressure acting on the right hand face of the land 814 because of the differential area of the faces of the land 814, will tend to move the piston 812 to the left, but line pressure in the cavity 810 acting against the face of the land 813 resists this movement, so that the fourth speed splitter pressure flows through the port 807 between lands 813 and 814 to the port 805 and to the conduit 818.

Flow of the fourth speed splitter governor pressure in the conduit 818 is to the port 846 of the splitter pilot valve 222 between the lands 851 and 852, to the port 843, to the conduit 856 and to the port 863 of the splitter governor plug 227 and into the cavity 892, where it acts upon the plug 227 tending to move the plug and the splitter shift valve 223 to the left. Like the 1–2, 2–3 and 3–4 valves, TV pressure is applied to the splitter downshift plug 224 tending to move the plugs 224, 225 and 226 to the right, but TV pressure is also applied to the plug 226 assisting the spring 890 in resisting this movement. TV pressure is also applied to the splitter shift valve 223 on lands 873 and 876 which resists movement of the valve 223 in the same manner as described with reference to the 1–2 shift valve 194, so that a predetermined pressure is required to move the plug 227 and the valve 223 to the left to cause upshifting in the splitter.

With the accelerator 187 in a particular position between closed throttle and full throttle positions and with the road speed of the vehicle increasing, the basic governor pressure in the conduit 368 will increase according to the curve 968 (Fig. 6) and the valve 211 will be moved farther to the left, thereby increasing the regulated pressure in the conduits 684 and 687 according to the curve 969. When a predetermined regulated pressure is reached in these conduits which is applied to the 1–2 governor plug 198, and is sufficient to move the plug 198 and the 1–2 shift valve 194 to the left an upshift occurs.

This movement of the plug 198 and the valve 194 to the left is against the action of the throttle pressure which is applied to the left end of the land 516 and is also applied to the land 518 through the conduit 538 and the conduit 540. Since the land 516 is larger than the land 518, the throttle pressure tends to move the valve 194 to the right. Therefore, the governor pressure must be sufficient to overcome the effect of throttle pressure in order for the governor pressure to move the valve 194 to the left; and the more the accelerator is depressed, the greater will be the throttle pressure and the greater must be the governor pressure and vehicle speed before the governor pressure can move the valve 194 to the left.

The initial movement of the valve 194 to the left closes the port 512 by means of the land 516 and connects the port 505 with the vent port 508, so as to drain the throttle pressure applied to the lands 516 and 518. This relief of throttle pressure on the lands 516 and 518 causes the piston 515 to snap or move rapidly to the left. On such movement of the valve 194, the land 516 is moved off the port 511, so as to connect the ports 511 and 510 by means of the groove between the lands 516 and 518. The conduit 481 connected with the port 511 contains compensating pressure as has been previously described, and this compensating pressure thus flows between the ports 511 and 510 and into the conduit 541. Since the land 516 is larger in diameter than the land 518, the compensating pressure passing between these lands exerts a resulting force on the valve 194 tending to move this piston farther to the left and hold it in such position, the movement of the valve 194 due to the compensating pressure effective on the different sized lands 516 and 518 resulting in a second augmented snap action of the valve 194. All of this movement of the valve 194 is against the action of the spring 532 and when the port 512 has been blocked by the land 516, the movement is also against the throttle pressure applied to the plug 195 and with the force being transmitted from the plug 195 through the plugs 196 and 197 to the spring 532. This movement of the valve 194 to the left also allows a dumping of the TV pressure acting on the splitter downshift plug 224 to occur through the conduit 538, the conduit 540, the port 505 and the port 508 for purposes hereinafter to be described.

When the valve 194 has been thus moved to the left, flow of the compensating pressure in the conduit 541 is to the conduit 497, to the port 486 and into the cavity 491 of the 1–2 pilot valve 193, where the pressure reinforces the force of the spring 495 to positively retain the valve 193 in the position shown. The flow of compensating pressure in the conduit 541 is also to the conduit 799 where it flows to the port 150 of the brake servo 87 and through the conduit 916 to the port 151 of the brake servo 87. Compensating pressure flowing through the ports 150 and 151 move the pistons 141 and 153 to the right against the force of the spring 152 to engage the friction brake 20.

At the same time, compensating pressure from the conduit 541 flows through the conduit 482, to the port 471 and into the cavity 476, where it acts upon the first gear pressure control valve 192 and moves it to the left against the force of the spring 480. Movement of the valve 192 blocks the port 472 by means of the land 479 and prevents the flow of line pressure through the port 472, to the port 473, to the conduit 483 and to the ports 134 and 135 of the brake servo 86. The movement of the valve 192 allows a flow of compensating pressure from the conduit 465 to the port 474 between the lands 478 and 479, to the port 473, to the conduit 483 and to the ports 134 and 135 of the brake servo 86, acting against the left faces of the servo pistons 125 and 136.

However, at the same time, compensating pressure from the conduit 541 flows to the conduits 917 and 918 and to the ports 132 and 133, respectively, of the brake servo 86, and the latter acts against the right faces of the pistons 125 and 136. Since the fluid pressure acting on the opposite faces of the pistons is the same, the spring 128 causes disengagement of the friction brake 19.

The flow of compensating pressure in the conduit 799 is also to the port 784 and into the cavity 791 of the first speed governor pressure control valve 219, which pressure assists the spring 798 in maintaining the piston 792 and the plug 794 in the illustrated positions.

The fourth splitter governor pressure (shown by curve 972) applied to the splitter governor plug 227 from conduit 856, at this time, is insufficient to cause the shifting of the plug, so that the friction brake 62 remains engaged. The friction brake 20 and the friction brake 62 being engaged, the transmission is in second low speed drive.

With the accelerator 187 in the same position, and the speed of the vehicle increasing, the basic governor pressure will also increase to a greater value, and the regulated governor pressure from the valve 211 will also increase until it reaches a predetermined value effective to move the connected 2–3 governor plug 204 and the 2–3 shift valve 200 to the left. The action of the 2–3 shift valve 200 is the same as the action of the 1–2 shift valve 194, and TV pressure is blocked from entering the port 572 and the TV pressure in the conduit 599 is dumped to the sump 174 through the port 568.

This movement of the shift valve 200 allows compensating pressure in the conduit 539 to flow from the port 571 to the port 570 into the conduit 601, to the conduit 557, to the port 546 and into the cavity 551 of the 2–3 pilot valve 199 where it assists the spring 555 in maintaining the valve 199 in the illustrated position to insure a flow of the regulated pressure to the 2–3 governor plug 204. Flow of compensating pressure in the conduit 601 is also to the conduits 914 and 913 and thereby to the ports 103 and 104, respectively, of the brake servo 84. The fluid pressure moves the pistons 92 and 97 to the right against the force of the spring 94 to engage the friction brake 17.

At the same time, compensating pressure flows through the conduit 914 to the port 147 of the brake servo 87 and through the conduit 915 to the port 148 of the brake servo 87. Since compensating pressure is acting on the opposite faces of the pistons 153 and 141, the force of the spring 152 moves the pistons to the left and disengages the friction brake 20.

Compensating pressure from the port 148 of the brake servo 87 flows into the chamber 144, to the port 149, and into the conduit 745, where it flows to the port 730 and into the cavity 737 of the third speed governor pressure control valve 216. The compensating pressure plus the force of the spring 744 maintain the piston 738 and the plug 741 in the illustrated positions.

At this time, the fourth splitter governor pressure from conduit 856 on the splitter governor plug 227 is still insufficient to cause a movement of the plug and the piston 872 of the splitter shift valve 223 so that the brake 62 remains engaged. The friction brakes 17 and 62 are now engaged, and the transmission assembly is in Low Third speed drive.

Further increases in the speed of the vehicle with the foot pedal 187 in the same position causes the basic governor pressure in the conduit 368 to increase, with a corresponding increase in the regulated pressure from the valve 211. When a predetermined regulated pressure is attained, the pressure acting on the 3–4 governor plug 210 is sufficient to move the plug and the 3–4 shift valve 206 to the left. The action is the same as the action of the 2–3 shift valve 200 and the 1–2 shift valve 194, respectively, so that TV pressure in the conduit 655 is dumped to the sump 174 through the port 625, and compensating pressure in the conduit 600 flows through the port 628, to the port 627 and into the conduit 656. Flow of compensating pressure in the conduit 656 is to the chamber 45 of the friction clutch 16, where it moves the piston 44 to clutch engaging position. At the same time, the compensating pressure flows to the conduits 617 and 911.

Flow of compensating pressure in the conduit 617 is to the port 606 and into the cavity 611 of the 3–4 pilot valve 205 where it assists the spring 615 in maintaining the valve 205 in the illustrated position. Flow of compensating pressure in the conduit 911 is to the port 100 of the brake servo 84, and to the conduit 912 and thereby to the port 101 of the brake servo 84. Compensating pressure being applied to both sides of the pistons 92 and 97 of the brake servo 84, the spring 94 moves the pistons 97 and 92 to the left to disengage the friction brake 17.

Compensating pressure from the port 101 flows to the chamber 95, to the port 102 and into the conduit 782, where it flows to the port 768 and into the cavity 773 of the fourth speed governor pressure control valve 218 to assist the spring 780 in maintaining the piston 774 and the plug 777 in the illustrated positions.

At this time, the fourth splitter governor pressure from conduit 856 on the splitter governor plug 227 is still insufficient to move the plug and the splitter shift valve 223 to the left, so that the brake 62 remains engaged. The brake 62 and the friction clutch 16 being engaged, the transmission assembly is in Fourth Low speed drive.

Further increases in the vehicle speed with the foot pedal 187 in the same position results in an increase in the basic governor pressure and the regulated pressure from the valve 211. When the fourth splitter governor pressure becomes sufficiently high which occurs on subsequent increases in vehicle speed after the unit A has been fully upshifted, the plug 227 will move to the left and the movement of the plug 227 causes the splitter shift valve 223 to be moved to the left with the same snap actions as the shift valves 194, 200 and 206. TV pressure in the conduit 894 will be dumped to the sump through the port 865, and compensating pressure flows from the port 868 between the lands 873 and 876 to the conduits 895 and 897. The pressure in the conduit 895 flows to the port 901 and into the cavity 905 of the transmission kickdown inhibitor valve and moves the valve 228 to the left against the force of the spring 910. This movement of the valve 228 blocks the port 902 and positively prevents the flow of kickdown oil, if present in the conduit 440, to the port 900 and to the conduit 654 and thereby to the kickdown valves in the unit A as will be described.

The flow of compensating pressure in the conduit 897 is to the conduit 857, the conduit 919 and the cavity 76 of the friction clutch 61 where it causes a movement of the piston 75 and engagement of the clutch and friction plates of the clutch 61. Flow of compensating pressure to the conduit 857 is to the port 844 and into the cavity 849 of the splitter pilot valve 222 where it assists the spring 854 in maintaining the valve 222 in the position shown. Flow of compensating pressure in the conduit 919 is to the port 165 of the brake servo 88 and to the conduit 920 and thereby to the port 166 of the brake servo 88. Since the pressures on the opposite sides of the pistons 158 and 171 of the brake servo 88 are equal, the spring 161 causes the pistons to move to the left and the friction brake 62 becomes disengaged. Compensating pressure from the port 165 flows through the cavity 163 of the brake servo 88 to the port 168 and into the conduit 922, where it flows to the conduits 802 and 747.

The flow of compensating pressure in the conduit 802 is to the port 788 and into the cavity 791, where it acts against the plug 795 of the first speed governor pressure control valve 219 and has no effect because the pressure in the opposite end of the cavity is the same and the spring 798 maintains the piston 792 and the plug 795 in their illustrated positions.

The flow of compensating pressure in the conduit 747 is to the port 766 and into the cavity 773, where it acts against the plug 777 of the fourth speed governor pressure control valve 218, and is also to the port 733 and to the cavity 737 where it acts against the plug 741 of the third speed governor pressure control valve 216. Compensating pressure, however, is also present in the opposite ends of the cavities 773 and 737, as heretofore described, so that the springs 780 and 744 maintain the valves 218 and 216, respectively, in their illustrated positions.

The compensating pressure also flows through the conduit 747, to the port 733, to the port 734 and into the conduit 701. Flow in the conduit 701 is to the port 690, and into the chamber 695 of the transmission governor pressure control valve 213, where it acts upon the piston 696 and moves the piston 696 to the left against the force of the spring 699. The movement of the valve 213 allows the land 698 to block the port 692 and provides a connection of the ports 693 and 689 by means of the space between the lands 697 and 698 to allow basic governor pressure in the conduits 683 and 682 to flow into the conduits 700 and 558. Thus, when the splitter B is upshifted, basic governor pressure is applied to the governor plugs 198, 204 and 210.

As heretofore described, the TV pressure is always applied to the plugs 195, 201 and 207 constituting the 2–1, the 3–2 and the 4–3 downshift plugs. The corresponding downshift plug 224 for the splitter, however, does not have this TV pressure applied to it when the unit A is operating other than its low speed drive due to the fact that the 1–2 shift valve 194 is moved to the limit of its movement to the left to connect the ports 505 and 508 for all speed ratio drives through the unit A except low speed drive.

As has been described, movement of the shift valves 194, 200, 206 and 223 are under the combined action of the TV pressure and governor pressure. The TV pressure will increase on greater engine throttle openings and tend to cause shifting of the valves 194, 200 and 206 from their upshifting positions to their downshifted positions, and a decrease in governor pressure with decreasing vehicle speed also has this same effect. Due to the fact that the plug 224 for the splitter is not supplied with TV pressure during the high speed drive of the unit A, the plug 224 being in effect interlocked with the 1–2 shift valve 194, the governor pressure effective on the plug 227 for the splitter can never decrease sufficiently to reduce the splitter from its high speed drive to low speed drive as long as one of the higher speed ratios exists in the unit A with the particular governor pressures supplied to the splitter governor plug 227.

When either the TV pressure increases or the governor pressure decreases with reduced vehicle speeds, the valves 194, 200 and 206 tend to return to their downshifted positions. The valve 206 is the first to return to its downshifted position when either the TV pressure on the plug 207 becomes excessive or the basic governor pressure on the governor plug 210 is reduced sufficiently.

When the piston 206 of the 3–4 shift valve is moved to its downshifted position, the land 634 will be moved off the port 629 and the port 627 will be placed in communication with the port 626 vented to the sump 174 by means of the groove 638 between the lands 634 and 635. Such movement causes a dumping of the compensating pressure in the conduit 656 through the port 627 between the lands 634 and 635 and to the port 626, which is vented to the sump 174. At the same time, TV pressure flows into the port 629, and into the cavity 636. TV pressure acts on the valve 206, causing a snap action movement of the valve toward the right, and allows a flow of TV pressure through the port 621, to the conduit 655, to the port 622 and into the cavity 637 to act on the opposite end of the shift valve 206.

Since the conduit 656 is vented to the sump, the conduits 911 and 912, which supply pressure to the brake servo 84 to balance brake engaging pressure and also the conduit 782 connected with the conduit 911 through the servo motor 84 will be vented to the sump, thereby allowing the compensating pressure in the conduits 601, 913 and 914 to be effective in the chambers 96 and 95 of the brake servo 84 and cause the pistons 97 and 92 to move to the right, against the force of the spring 94, to cause engagement of the friction brake 17. Compensating pressure remains in the cavity 773 acting on the plug 777, which, since pressure on the piston 774 has been relieved through conduit 911, overbalances the spring 780 and causes the plug 777 and the piston 774 to move to the right. The vent port 771 is now blocked by the land 775 and communication of the ports 769 and 770 by means of the groove between lands 775 and 776 is provide. Therefore, line pressure flows between the lands 775 and 776 to the port 770, to the conduit 762, to the port 749 and into the cavity 754, which acts against the piston 756 of the fourth speed governor pressure valve 217 and moves the piston 756 to the right. The pressure reducing action of the valve 217 is thereby prevented and the pressure from the valve 216, which is the third splitter governor pressure shown on the curve 971, flows between the lands 757 and 758, to the port 750 and into the conduit 763. The flow of the fluid in the conduit 764 and thereby into the cavity 755 acting against the piston 756 has no effect, since the force on the right hand face of the valve 217 is less than that on the left hand face. The flow in the conduit 763 is ultimately to the cavity 892 of the splitter governor plug 227, as previously explained. Therefore, a higher pressure is provided on the splitter governor plug 227 as the transmission unit A downshifts from fourth high to third high speed drive, the higher pressure being selected by the valve 218. This higher governor pressure assures that the splitter plug 227 and valve 223 remain in their upshifted positions.

The venting of compensating pressure from the conduit 656 releases the pressure in the clutch chamber 45 and allows the spring 47 to release the clutch plate and thereby disengages the friction clutch 16.

Since the friction clutch 61 of the splitter remains engaged, the friction clutch 16 of the unit A is disengaged and the friction brake 17 of the unit A is engaged, the transmission assembly has downshifted to the Third High speed drive.

Upon further reduction in the governor speed, the 2–3 valve 200 will downshift in the same manner, as the valve 206 just described. Compensating pressure which flowed to the conduit 601 and thereby to the conduits 557, 913, 914, 915 and 745 will be dumped to the sump 174 through the port 569. Thus, the spring 94 will move the pistons 92 and 97 of the servo 84 to their brake disengagement positions, and disengage the friction brake 17. The removal of the pressure in the chambers 144 and 145 of the brake servo 87 to balance the brake engaging pressure will cause the pistons 141 and 153 to be moved to the right and cause engagement of the friction brake 20.

Since the compensating pressure in the conduit 745 is dumped to the sump, there will be no pressure in the cavity 737 acting on the piston 738 of the third speed governor pressure control valve 216 balancing the pressure in the opposite end of the cavity 737 acting on the plug 741, and as the latter is sufficient to overbalance the spring 744, the plug 741 and the piston 738 will move to the left. The port 735 will thereby be blocked and the ports 736 and 731 will be placed in communication by means of the groove between the lands 739 and 740, so that basic governor pressure will flow to the conduit 746 and thereby, ultimately, to the cavity 892 to act on the splitter governor plug 227. Thus, the pressure reducing action of the valve 214 is effectively removed and a higher pressure is allowed to act on the splitter governor plug 227, which follows the curve 963, to assure that no downshifting will occur in the splitter at this time.

Since the friction clutch 61 of the splitter remains engaged and the brake 20 is engaged, the transmission assembly has downshifted to its Second High speed drive.

Further reduction in the governor pressure allows the 1-2 valve 194 to downshift in the same manner as the 3-4 and 2-3 valves 206 and 200. Compensating pressure which flowed to the conduit 541 and thereby to the conduits 497, 482, 799, 916 and 917 will be dumped to the sump through the port 509. Thus, the spring 152 will move the pistons 141 and 153 of the brake servo 87 to the left, thereby causing disengagement of the friction brake 20. At the same time, no compensating pressure will be in the cavity 476 overbalancing the spring 480, so that the spring 480 will move the piston 477 of the first gear pressure control valve 192 to its illustrated position and the port 473 will be placed in communication with the port 472 instead of the port 474, previously blocked. Therefore, line pressure will flow to the conduit 483 to the ports 134 and 135 and into the chambers 129 and 130, respectively, causing an overbalance of the spring 128, movement of the pistons 125 and 136 to the right and engagement of the friction brake 19.

Since the compensating pressure in the conduit 799 is dumped there is no compensating pressure in the cavity 791 balancing the pressure at the opposite end of the cavity acting on the plug 795 of the first speed governor pressure control valve 219. The pressure in the cavity 791 acting on the plug 795 overbalances the spring 798 and moves the plug 795 and the piston 792 to the left, so that communication between the ports 789 and 785 is blocked by the land 794. The port 785 is placed in communication with the sump vented port 790, and fluid in the conduit 800 and the cavity 810 of the first speed governor pressure valve 220 is dumped to the sump 174. Basic governor pressure in the conduit 763 acts on the land 814 tending to move the valve 220 to the left so as to move the land 813 off the port 808 allowing fluid pressure from the conduit 801 carrying line pressure to flow through the groove 815 and to the port 805. There is a differential area between the lands 813 and 814, the latter being larger in size, so that the pressure in the groove 815 tends to return the valve 220 and again block the port 808 by means of the land 813. There is a balance set up between the governor pressure on the right end of the valve 220 and the effect of the pressure in the groove 815, so that the pressure in the port 805 is regulated to vary with the basic governor pressure applied to the right end of the valve 220. The output pressure of the valve 220 in the port 805 is higher than the basic governor pressure and follows the curve 790 in Figure 6. The output governor pressure from the valve 220 flows through the conduit 818 and is ultimately applied to the splitter governor plug 227. The valve 219 selects this higher governor pressure when the unit A is downshifted from its second speed drive to its first speed drive. This higher governor pressure applied to the splitter valve plug 227 assures that no downshift will occur in the splitter at this time.

TV pressure at this time, is supplied to the conduit 538 from the valve 194 and flows to the port 871 and into the cavity 882, where it conditions the splitter downshift plug 224 for downshifting.

With the clutch 61 remaining engaged, and the friction brake 19 engaged, the transmission assembly has downshifted to its First High speed drive.

Further reduction in the governor speed causes a drop in the first governor splitter pressure applied to the governor plug 227 and causes the splitter valve 223 to downshift in the same manner as the valves 194, 200 and 206.

The compensating pressure in the conduits 897, 857 and 919, and in the clutch chamber 76 will be dumped to the sump 174 through the port 820 and the open end of the splitter selector valve casing 819. The spring 78 will cause disengagement of the clutch 61 and allow the compensating pressure in the conduit 837 to flow through the servo port 170 into the chamber 163, to the port 169, to the conduit 921, to the port 167 and into the chamber 162, to overbalance the spring 161 and move the pistons 158 and 171 to the right into brake engaging positions.

When the pressure is dumped, as above-described, the compensating pressure in the conduits 922, 802, 747, 701 and 687 is also dumped, so that there is no pressure in the cavities 791, 773, 737, 695 and 670 acting on the plugs 795, 777 and 741 of the valves 219, 218 and 216, respectively, and the pistons 696 and 672 of the valves 213 and 211, respectively. Therefore, the valves 219, 218, 216, 213 and 211, and also the valves 217, and 229 will move to their illustrated positions.

With the friction brakes 19 and 62 engaged, the transmission assembly had downshifted to its First Low speed drive.

With the selector valves 185 and 221 in their "D" positions, and the accelerator 187 in kickdown position, the throttle valve 188 will be moved farther to the left, and will contact the kickdown valve 189 and move it to the left. Such movement of the valve 189 provides a communication between the ports 418 and 417 around the reduced portion 431 of the valve 188, so that TV pressure in the cavity 426 from the conduit 441 will flow to the port 417, to the conduit 440 and to the port 902, of the transmission kickdown inhibitor valve 228. From the port 902, kickdown pressure will flow between the lands 907 and 908 to the port 900, to the conduit 654, to the port 620, and into the cavity 646, where it acts upon the face of the plug 203. Flow from the cavity 646 is to the port 631, to the conduit 598, to the port 562 and into the cavity 589, where it acts upon the face of the plug 202. Flow from the cavity 589 is to the port 574, to the conduit 537, to the port 592, and into the cavity 528, where it acts upon the face of the plug 196.

Flow of kickdown pressure (which equals line pressure) in the conduit 440 is also to the conduit 893, to the port 859 and into the cavity 885, where it acts on the face of the plug 225.

With the accelerator 187 being in its kickdown position, the upshifting of the transmission assembly occurs in the same manner and at the same vehicle speeds as when the accelerator 187 is in its fully opened throttle position and before any kickdown pressure is supplied to the conduit 440 by kickdown movement of the accelerator. As has been previously explained, throttle pressure which is equal to line pressure in the full throttle position of the accelerator is supplied to the left end of the plug 195 and to the right end of the plug 197. Movement of the accelerator 187 from its fully opened throttle position to its kickdown position has the effect as just described of supplying kickdown pressure (equal to line pressure) to the port 592, so that line pressure is also applied between the plugs 195 and 196. Therefore, line pressure is applied on both ends of the plug 195, and there is no tendency to move this plug. Line pressure is also applied on the left end of the plug 196 and the right end of the plug 197, and the plugs 196 and 197 remain in their illustrated positions since the plug 197 is larger than the plug 196. Since all three plugs 195, 196 and 197 do not move, upshifting movement of the valve piston 194 occurs as before against the action of the spring 532 and the TV pressure (equal to line pressure at fully opened and kickdown positions of the accelerator) on the shift valve 194. The shift valves 200, 206 and 223 operate in the same manner, upshifting for the same vehicle speed in the kickdown position of the accelerator as for the fully opened throttle position of the accelerator with the plugs 201, 202 and 203, the plugs 207, 208 and 209 and the plugs 224, 225 and 226 remaining in the same position in which they are illustrated when the accelerator is moved from its fully opened throttle position to its kickdown position.

The sequence of upshifts of the transmission assembly is thus the same for the kickdown position of the accelerator as when the accelerator is between its closed and fully opened throttle positions; however, when the accelerator is in the kickdown position, interlock mechanism is provided for causing the sequence downshifts in the transmission assemly to be different from the sequence of downshifts when the accelerator is between its closed and fully opened throttle positions. This interlock mechanism includes the valve 228 which, when the splitter is upshifted, blocks the communication between the ports 902 and 900 to thereby prevent the flow of the line pressure supplied by the kickdown valve 189 from flowing through the conduit 654 to the plugs 208, 202 and 196. The valve 228 is moved to the left against the force of the spring 910 by the application of compensating pressure flowing in the conduit 895 to the port 901 when the splitter shift valve 223 is in its upshifted position, as heretofore described.

Kickdown pressure (line pressure from the kickdown valve 189 transmitted through the conduit 440) is still applied to the splitter kickdown plug 225 even though the valve 228 removes the application of this pressure from the corresponding plugs 208, 202 and 196 for the 3-4, 2-3 and 1-2 valves 206, 200 and 194, respectively, so that the plugs 225 and 226 are moved to the right; and through the spring 890, the splitter shift valve 223 is moved back into its downshifted position. This movement of the valve 223 is against the action of the fourth splitter governor pressure (as shown by curve 972 in Figure 6) and occurs assuming that the vehicle speed and this governor pressure are not too high.

As has been previously explained, throttle pressure (which at kickdown position of the accelerator 187 equals line pressure) is sometimes applied to the left end of the splitter plug 224, but such application does not occur until low speed drive in the unit A has been reached, and for a kickdown to downshift the splitter as just described, the line pressure applied to the left end of the plug 225 is sufficient for this purpose. When the splitter shift valve 223 is in its downshifted position, the splitter B is in its low speed drive as has been previously explained. This movement of the splitter shift valve 223 has the additional effect of relieving compensating pressure (which now is line pressure) from the right end of the valve 228, the pressure draining from this end of the valve 228 through the conduit 895, the port 861, the port 866, the conduit 896, the conduit 836, and the port 820 and through the open end of the cavity 825 to the sump 174, and the valve 228 is moved back again to its illustrated position under the action of the spring 910. The kickdown pressure from the kickdown valve 189 is then again applied through the valve 228 to the plugs 208, 202 and 196, as has been previously explained, and conditions the shift valves 206, 200 and 194 of the unit A for downshifting.

As has been previously explained, the fourth splitter governor presure shown by the curve 972 is effective on the splitter plug 227 in the Fourth Low and Fourth High conditions of the transmission assembly. When the splitter valve 223 moves to the right into its downshift position as just explained, the valve 223 disengages the clutch 61 and engages the brake 62 by relieving compensating pressure from the conduit 897 draining it through the port 866, the conduit 896, the conduit 836, the port 820 and the open end of the cavity 825. The conduit 897 is connected through the servo motor 88, to the conduit 922 and to the conduits 802, 747 and 701. Compensating pressure is thus relieved from the plug ends of the valves 219, 218 and 216. However, the valve 219, 218 and 216 were in and remain in their illustrated positions because compensator pressure from the main transmission servo is backing up the springs regardless of the action of the splitter clutch apply pressure, so that the relatively low fourth splitter governor pressure remains applied to the splitter governor plug 227, and this governor pressure is not sufficient to cause a subsequent upshifting in the splitter B. The valves 219, 218 and 216 with the compensating presure disapplied are inactive to select any of the higher governor pressure shown by the curves 971, 968 and 970 for application to the splitter governor plug 227.

At the same time, the draining of compensating pressure from the piston 696 of the valve 213 through the conduit 701 allows the valve 213 to return to its illustrated position by means of the spring 699, so that basic governor pressure acting on the plugs 210, 204 and 198 of the unit A is replaced by the regulated governor pressure (shown by the curve 969) from the valve 211.

The basic purpose of the valve 211 is to provide substantially the same governor pressure to the governor plugs 210, 204 and 198 for the 3-4, 2-3 and 1-2 shift valves 206, 200 and 194, respectively, for any certain predetermined speed of the driven shaft 12 of the transmission, regardless of whether the splitter unit B is in its direct drive or is in its low speed drive condition, so that the upshifts and downshifts in the unit A take place at the same predetermined speeds of the output shaft 11a of the unit A regardless of the speed ratio in which the unit B is driving. With the splitter B in its high or direct drive ratio the valves 211 and 212 perform no function. The basic governor pressure by-passes the valves 211 and 212 through the conduits 683 and 682 and through the valve 213 to the governor plugs 210, 204 and 198. The valve 213 is moved to the left in splitter high or direct drive ratio and the output of the valves 211 and 212 is stopped in the port 692 of the valve 213 by means of the land 698. The valves 211 and 213 provide the regulated higher governor pressure 969 when the splitter B is in its low speed drive condition.

The application of downshift pressure (which is line pressure at kickdown position of the ccelerator) from the kickdown valve 189 through the conduit 654 to the plug 208 causes the 3-4 shift valve 206 to move back into its downshifted position against the action of the regulated governor pressure (shown in curve 969) applied on the governor plug 210, assuming that the speed of the vehicle is not too high. It should be noted that a downshifting action of the 3-4 shift valve 206 occurs at higher vehicle speeds when the accelerator is in its kickdown position than if it is only in its open throttle position. In the latter case, throttle pressure (which is line pressure at this time) would be applied to the relatively small sized plug 207, while in the kickdown position of the accelerator, line pressure is applied to the relatively large sized plug 208. The valve 206 in its downshifted position causes a disengagement of the clutch 16 and an engagement of the brake 17 as has been previously described.

The kickdown downshifting action of the other shift valves 200 and 194 are the same as that of the valve 206, except that these actions occur sequentially, the 2-3 shift valve 200 downshifting first and then subsequently the 1-2 shift valve 194 downshifts. The transmission unit A is, therefore, sequentially downshifted from its fourth to its third, then to its second and finally to its first speed ratio, with the splitter unit B remaining in its low speed condition.

When the piston 396 of the transmission selector valve 185 is moved to its "3" or third speed drive position, the detent ball 405 will be positioned in the groove 400. It is assumed that the piston 826 of the splitter selector valve 221 remains in its "D" or drive position. Due to the position of the piston 396, line pressure flows between the lands 397 and 398 to the port 391; to the conduit 409, to the conduits 658 and 618 and to the port 772 of the fourth speed governor pressure control valve 218. Flow of pressure in the conduit 658 is to the port 630 and into the cavity 649 where it acts against the face of the plug 209 and also against the face of the plug 208, so that the plug 209 is moved to the right, compressing the spring 650 and, when throttle or TV pressure is less than line pressure, holding the 3–4 shift valve 206 in its downshifted position, as illustrated. Flow of pressure in the conduit 618 is to the port 610 and into the cavity 611, acting against the piston 612 of the 3–4 pilot valve 205, and moving the valve 205 to the right against the force of the spring 615. The movement of the valve 205 blocks the port 608 and connects the port 605 and 607. Therefore, the flow of regulated pressure from the valve 211 or basic governor pressure to the 3–4 governor plug is prevented and any fluid within the cavity 653 is dumped to the sump through the port 623, the conduit 616, the port 605, and through the port 607. In view of this, upshifting to fourth speed drive in the unit A is inhibited.

The flow of line pressure to the port 772 is to the cavity 773, where it acts against the face of the plug 777 and the piston 774 of the fourth speed governor pressure control valve 218. The plug 777 will remain in its illustrated position, and the piston 774 will be moved to the right against the action of the spring 780. No fluid pressure will be present in the cavity 773 at the opposite end of the piston 774 because the clutch 16 is not engaged and will not become engaged. Movement of the piston 774 to the right will connect the ports 769 and 770 between the lands 775 and 776, so that line pressure will flow to the port 770, into the conduit 762, to the port 749 and into the chamber 754, acting against the piston 756 of the fourth speed governor pressure valve 217 and moving the piston 756 to the right. Such movement of the piston 756 overrules the regulating action of the valve 217 and allows the flow of third splitter governor pressure from the valve 216 to the splitter governor plug 227. Thus, third splitter pressure, following the curve 971, is fed to the splitter governor plug 227 and causes an upshift in the splitter after the transmission unit A has upshifted to its third speed drive.

The upshifting of the transmission assembly from First Low to Second Low and to third low, with the throttle in its part or full throttle position, is the same as previously described when both selector valves were in their "D" positions, with the splitter upshifting to third high speed drive last.

However, since the relatively high third splitter governor pressure as shown by curve 971 is applied to the splitter governor plug 227 rather than the relatively low fourth splitter governor pressure as shown by the curve 972, as would be the case when the selector valve piston 396 is in its "D" position, the last upshift of the transmission assembly which is in the splitter will occur at a lower vehicle speed than otherwise to prevent an undue gap in upshifting vehicle speeds between the shift from Third low to Third high speed drives. Downshifting under decreasing speeds of the vehicle and of the governor occurs in the same manner as when the selector valve piston 396 is in its "D" position, with the last downshift being in the splitter due to the interconnection of the splitter downshift plug 224 by means of the conduit 538 with the 1–2 shift valve 194. Thus, the high speed to which the transmission assembly can upshift, which is Third High, is determined by the transmission selector valve 185.

When the accelerator 187 is in its kickdown position, upshifting and downshifting of the transmission assembly is the same as upshifting and downshifting with the selector valves both being in their "D" positions and the accelerator 187 in its kickdown position; however, the highest speed to which the transmission assembly will upshift is determined by the transmission selector valve 185 to be the third speed drive in the unit A and the Third High drive in the transmission assembly.

This is due to the fact that the selector valve 185 in its "3" position puts the 3–4 shift valve 206 out of action as has been explained. The selector valve 185 in its "3" position also puts the valve 218 and the regulator valve 217 out of action, so that the third splitter governor pressure shown by curve 971 is applied on the splitter governor plug 227 instead of the fourth splitter governor pressure shown by curve 972. A kickdown will thus be obtained from Third High to Third Low at a lower vehicle speed than when the selector valve 185 is in its "D" position.

When the piston 396 of the transmission selector valve 185 is moved to its "2" or second speed drive position, the detent ball 405 will be positioned in the groove 401. The piston 826 of the splitter selector valve 221 is allowed to remain in its "D" or drive position. Line pressure will continue, as when the selector valve piston 396 is in its "3" position, to flow into the conduit 409 to continue to put out of action the 3–4 shift valve 206 and also to put out of action the valve 218 and the regulator valve 217. In the "2" position of the piston 396 line pressure will, in addition, flow through the conduit 410 into the conduits 559 and 603 and to the port 732 of the third speed governor pressure control valve 216. The flow of line pressure in the conduit 559 is to the port 550 and into the cavity 551 of the 2–3 pilot valve 199 where it acts on the valve 199 and moves the valve 199 to the right against the force of the spring 555. The movement of the valve 199 blocks the port 548 and provides communication between the ports 454 and 547, so that regulated governor or basic governor pressure cannot flow to the cavity 594 and act against the 2–3 governor plug 204. Any fluid in the cavity 594 flows to the port 566, the conduit 556, the port 545, and to the port 547 which is vented to the sump 174.

The fluid pressure in the conduit 603 flows to the port 573 and into the cavity 592 where it acts upon the plugs 202 and 203. The pressure moves the plug 203 to the right, compressing the spring 595 and holding the 2–3 shift valve 200 in its illustrated downshifted position. Therefore, the unit A cannot upshift into third speed drive and also, as before stated, cannot upshift into fourth speed drive.

The flow of line pressure in the conduit 410 is also to the port 732 and into the cavity 737 where it acts upon the piston 738 and the plug 741 of the third speed governor pressure valve 216. The plug 741 is retained in its illustrated position, and the piston 738 is moved to the left against the force of the spring 744. No balancing pressure exists in the cavity 737, since the brake 17 is not and cannot be engaged. The movement of the piston 738 allows basic governor pressure to flow from the port 736 to the port 731 and into the conduit 746, and since the regulating action of the valve 217 is prevented by pressure acting on the piston 756, basic governor pressure 968 is supplied ultimately to the splitter governor plug 227.

The unit A will upshift from first to second with the accelerator 187 in part or full throttle positions in the same manner as previously described with the final upshifting being in the splitter due to the action of the basic governor pressure on the plug 227. Likewise, when the accelerator is in its throttle operating range, downshifting occurs first in the unit A with the final downshifting occurring in the splitter.

When the accelerator 187 is in its kickdown position, upshifting and downshifting of the transmission assembly is the same as upshifting and downshifting previously described with the selector valves both in their "D" positions and the accelerator 187 in its kickdown position; however, the highest speed to which the transmission assembly will upshift is determined by the transmission selector valve 185 to be in this case Second High speed drive.

The basic governor pressure applied to the splitter governor plug 227 to cause the upshifting in the splitter remains applied to the plug 227 after the splitter valve 223 has downshifted due to the kickdown pressure being applied to the plug 225, and this basic governor pressure is not sufficient to cause a subsequent upshifting in the splitter after a downshifting from second speed drive to first speed drive occurs in the unit A by kickdown. Therefore, there can be no subsequent upshifting in the splitter, unless the vehicle speed increases and the unit A upshifts and then the unit B upshifts (the same as when starting), and the splitter will remain in its low condition during the downshifting in the unit A.

In summary with regard to the action of the valves 216, 218 and 219, with the splitter selector valve 221 in its "D" or drive position, on an upshift, or at any time when the splitter is in its low range drive (even after a splitter kickdown), the particular governor pressure applied to the splitter governor plug 227 is determined by the position of the transmission selector valve 185. This leaves the splitter conditioned for an upshift after the transmission A reaches the top gear called for by the selector valve 185.

For downshifting with the splitter B in high range, the governor pressures, as shown by the curves 972, 971, 968 and 970, applied to the splitter governor plug 227 are progressively changed as the transmission unit A downshifts, thus keeping a high pressure on the plug 227 and preventing a splitter downshift until the first gear drive in the transmission A is reached.

With the piston 396 of the transmission selector valve 185 in its "1" or first speed drive position, the detent ball 405 will be positioned in the groove 402. As before, the splitter selector valve 221 remains in its "D" or drive position. The fluid flow in the conduits 409 and 410, and the connected parts remain the same as when the selector valve 185 is in its "2" or second speed drive position with the addition of a flow of line pressure between the lands 397 and 398 to the port 393 and into the conduit 411.

The line pressure flows in the conduit 411 to the conduits 543 and 499 and to the port 787 of the first speed governor pressure control valve 210. The line pressure in the conduit 499 flows to the port 490 and into the cavity 491, where it acts upon the 1–2 pilot valve and moves the valve to the right against the force of the spring 495. Such movement of the valve 193 blocks the port 488 and provides communication between the ports 485 and 487, the latter of which is vented to the sump 174, so that any fluid pressure in the cavity 535 acting against the 1–2 governor plug 198 flows to the port 506, through the conduit 496, to the port 485, to the port 487 and thereby to the sump 174. The blocking of the port 488 prevents regulated or basic governor pressure from acting on the 1–2 governor plug 198.

The line pressure flows in the conduit 543 to the port 513 and into the cavity 531, where it acts upon the plug 197 and moves the plug 197 to the right, compressing the spring 532 and thereby retains the 1–2 shift valve 194 in its illustrated downshifted position.

The flow of line pressure in the conduit 411 is to the port 787 and to the cavity 791, where it acts upon the plug 795 and the piston 792 of the first speed governor pressure control valve 219, retaining the plug 795 in its illustrated position and moving the piston 792 to the left against the force of the spring 798. No fluid pressure exists in the opposite end of the cavity 791 to resist this movement, since the brake 20 is not and cannot become engaged. The movement of the piston 792 connects the ports 785 and 790, so that the pressure in the cavity 810 acting on the piston 812 flows through the port 809, the conduit 800, the port 785, between the lands 793 and 794 to the port 790 and thereby to the sump 174. The valves 218, 217 and 216 remain overruled, so that the valve 220 provides the relatively high first splitter governor pressure 970 for application to the splitter governor plug 227, as heretofore described.

The unit A will stay in first speed drive with the brake 19 engaged, and the upshift and the downshift will occur in the splitter. The upshift and downshifting in the splitter occurs in the same fashion as has been previously described. This is true for any position of the accelerator 187, whether it be part throttle, full throttle or kickdown position.

With the transmission selector valve 185 in its "D" or drive position and the splitter selector valve 221 in its "L" or low position, line pressure will flow into the cavity 849 from the ports 824 and 823, the conduit 840 and the port 848 and overbalance the spring 854, so that the piston 850 of the splitter pilot valve will be moved to the right. This movement of the piston blocks the port 846 and connects the ports 843 and 845, so that no governor pressure can flow to the cavity 892 and cause movement of the splitter governor plug 227 and therefore, no upshifting in the splitter can occur. Also, compensating pressure will flow through the conduit 838, to the port 822 between the lands 828 and 829, to the port 821, into the conduit 837, and to the port 170 of the brake servo 88 and also to the port 169, the conduit 921 and the port 167. This flow of compensating pressure causes engagement of the brake 62 and locks the brake in its engaged position, so that the splitter B remains in low speed drive.

In any position of the accelerator 187, all upshifting will occur in the unit A, and likewise, all downshifting will occur in the unit A. The upshifting and downshifting in the unit A occurs in the same manner as previously described.

With the splitter selector valve 221 in its "H" or high position and the transmission selector valve 185 in its "D" or drive position, compensating pressure will be applied to the brake servo 62 in the same manner as when the splitter selector valve is in its low position, but compensating pressure will also flow to the port 820 of the selector valve 221 into the conduit 836 and into the conduit 896. The flow of fluid in the conduit 896 is to the port 866 and around the groove 875 of the splitter shift valve 223, to the port 867, to the conduit 897 and to the chamber 76, where the pressure causes engagement of the clutch 61. The flow of pressure from the conduit 897 is also to the conduits 919 and 920, to the ports 165 and 166, respectively and into the chambers 162 and 163 of the brake servo 88. Compensating pressure is applied to both faces of the pistons 158 and 171, and therefore they are balanced; however, the spring 161 disengages the brake 62. The flow of compensating pressure in the conduit 896 is also to the chamber 905 at the left of the kickdown inhibitor valve 228; however, the flow is also around the groove 875, to the port 861, to the conduit 895, to the port 901 and into the chamber 905 at the opposite end of the valve 228. Therefore, the spring 910 retains the kickdown inhibitor valve 228 in its illustrated position.

With the splitter selector valve 221 moved to its "H" position, it blocks line pressure from the conduit 817 into the port 823 and conduit 840, so that the valve 222 may be moved back by the spring 854 into its illustrated position. Various governor pressures may thus be applied on to the governor plug 227 from the conduit 818 and through the valve 222 and conduit 856 which may at times move the splitter shift valve 223 from its downshifted position to its upshifted position. Regardless of this movement, however, the clutch 61 remains applied. Compensating pressure is applied to the clutch piston 75 when the valve 223 is in its downshifted position as has been just described. When the valve 223 is moved into its upshifted position by governor pressure on the plug 227, compensating pressure will in this case be supplied from the compensator conduit 838 through the port 868, the groove between the lands 873 and 876, and the port 867 and the conduit 897 as has been previously described in connection with upshifted conditions of the splitter B. With the valve 223 being either in its upshifted or downshifted positions, the splitter B will immediately seek the gear that is proper as determined by the vehicle speed and the accelerator position, if the selector valve 221 is moved from its "H" to its "D" position.

The unit A will upshift as previously described from its first, to its second, to its third, and finally to its fourth speed drives; and will downshift in the reverse sequence, either under the action of the governor 180 or under the control of the kickdown valve 189 all as previously described. With the splitter B being maintained in its high speed drive condition by means of the splitter selector valve 221, the basic governor pressure 968 is selected by the valve 213 for causing the upshift in the unit A.

A noteworthy feature of the control system is the inhibiting action provided for preventing a downshift in the unit A by movement of the selector valve 185 from higher forward speed positions to a lower forward speed position, assuming that the vehicle speed is too high, so that an overspeeding of the vehicle engine would be caused on such downshift. Assuming that the unit A is in its fourth speed ratio, in this case all of the shift valves 194, 200 and 206 are in their upshifted positions. It is assumed that the selector valve 185 is in its "D" position. Under these conditions of operation, compensating pressure flows from the conduit 600 through the valve 206 into the conduit 656 for applying the clutch 16 and allowing a disapply of the brake 17. This compensating pressure is also effective on the right end of the valve 205, augmenting the action of the spring 615 in holding the valve 205 to the limit of its movement to the left.

If the selector valve 185 is now moved from its "D" position to its "3" position, as has been previously described, line pressure is applied to the right end of the valve 205 from the conduit 409 and the conduit 618. Such application of line pressure to the left end of the valve 205 is, however, insufficient to move the valve 205 to the left since the compensating pressure and the force due to the spring 615 are sufficient to hold the valve 205 to the limit of its movement to the left, even though the compensating pressure is at a minimum value corresponding to closed throttle accelerator position.

The governor plug 210 for the 3–4 shift valve 206 thus remains connected with the governor pressure supply conduit 558, and the valve 206 and the plug 210 do not move into their downshifted positions until the speed of the vehicle and the speed of the governor 180 drop sufficiently. The line pressure supplied to the left end of the valve 205 is, however, also supplied to the plug 209, so there is an additional tendency for the shift valve 206 to move into its downshifted position, the line pressure being effective through the plug 209 and the spring 650 tending to move the valve 206 to the right to its downshifted position. When the speed of the vehicle and the speed of the governor 180 drop sufficiently, the valve 206 moves to the right to its downshifted position and blocks compensating pressure from the conduits 656 and 617 and vents these conduits, so that the valve 612 is then moved to the right against the action of the spring 615, blocking by means of its land 613 any further application of governor pressure through the conduits 558 and 616 to the governor plug 210.

The valves 199 and 193 operate in the same manner with respect to the shift valves 200 and 194, respectively, forcing a downshift from third to second and from second to first, respectively, in the unit A with movement of the valve 185 to its "2" and "1" positions, respectively, in the same manner as does the valve 205 with respect to the shift valve 206, just described.

The transmission may, in addition to the automatic operation described, be upshifted through all eight steps and downshifted through all eight steps by proper manipulation of the selector valves 185 and 221. One method of upshifting the transmission in this manner is to position the splitter selector valve 221 in its drive position, position the accelerator 187 in its kickdown position and manipulate the transmission selector valve 185 through its increasing steps, i.e., from "1" to "2," to "3" and to "D." With this method the shift to high splitter must be permitted in each range. Another method is to manipulate the transmission selector valve 185 through its increasing steps and manipulate the splitter selector valve between its high and low positions, this being true for any position of the accelerator 187.

The transmission may be downshifted through each of the eight speed ratios by manipulating the splitter selector valve 221 between its high and low positions, or drive and low positions, in conjunction with the manipulation of the transmission selector valve 185 through its decreasing drive positions.

For reverse drive, the transmission selector valve 185 is moved to position the detent ball 405 in the groove 404 corresponding to "R" or reverse drive position, and the splitter selector valve is positioned in any of its drive positions. With the selector valve 185 so positioned, the ports 385, 390, 391, 392 and 393 will be in communication with the port 394, which is vented to the sump 174, so that fluid in the conduits 407, 369, 409, 410 and 411 and any ports connected thereto will be dumped to the sump.

Since no pressure is flowing in the conduit 369, the neutral valve 183 cannot perform its regulating function, the valve 183 will be in its illustrated position and no basic governor pressure can flow to the conduit 368 and any ports or conduits connected thereto. Also, no fluid pressure will be supplied to the valve 184 of the reverse inhibitor valve 184 through the conduit 382 from the rear pump 83, since the latter is inoperative or else is driven in the reverse direction. The valve 184 will thus be positioned as illustrated.

The fluid pressure from the front pump 81 will flow through the conduit 272, the conduit 337, the conduit 336, to the port 389, through the cavity 395 and across the grooves 399, 400, 401, 402, 403 and 404 of the transmission selector valve 185, to the port 388, to the conduit 381, to the port 371, to the port 373, to the conduit 383 and to the conduit 298. Flow in the conduit 298 is to the port 276 of the pressure regulator valve 179, to the port 291 and into the cavity 293, where it acts upon the piston 295 and moves it downwardly to assist the spring 297 in moving the piston 285 downwardly. Movement of the piston 285 downwardly opens the port 281 to vent through port 277 and provides communication between the ports 280 and 287, so that fluid under pressure is supplied to the cavity 262 at the bottom of the housing 263, from the pump outlet conduit 272 and through the cavity 286, ports 287 and 280 and conduit 274, to assist the spring 267 in moving the housing 263 upwardly to increase the eccentricity between the rotor 265 and the housing 263. This increase in eccentricity increases the output volume of the pump 81 and increases the pressure in the output port 272 for the pump until this pressure is sufficient to move the piston 285 upwardly substantially into its illustrated position against the action of not only the spring 297 which is effective in the forward drives, but also against the action of the piston 295. The piston 285 regulates in the same manner as for the forward drives to maintain the output pressure of the pump in the conduit 272 at its increased value for reverse drive brought about by the action of the piston 295. The reverse line pressure in the conduit 272 and connected conduits may be approximately 200 p.s.i.

The fluid pressure in the conduit 298 also flows to the port 282 into the conduit 259, to the port 249 and the cavity 252 of the converter feed valve 178 and moves the valve 178 to the left against the pump pressure acting on the face of the land 255. Thus, the flow of fluid to the converter 13 is reduced, as previously explained.

The flow of fluid pressure in the conduit 298 is also to the conduit 466 and the ports 116 and 117 of the reverse brake servo 85. The fluid pressure thus flows into the chambers 113 and 144 and moves the pistons 109 and 120 to the right against the force of the spring 112 to engage the friction brake 18 and to complete a reverse drive through the unit A. The flow of pressure in the conduit 466 is to the port 446 and to the cavity 452 where it acts against the plunger 191 of the compensating valve. Movement of this plunger collapses the spring 463, so that the plunger 191 abuts the valve 190 and moves it and holds it to the limit of its movement to the left. Conduit 439 contains line pressure, and this conduit will be opened to the port 445 through the groove between the lands 455 and 456, maintaining line pressure in the conduit 465. When the splitter selector valve 221 is positioned in its "L" or "D" positions, line pressure will be supplied from the conduit 465, conduit 481, conduit 539, conduit 600, conduit 839, and conduit 838 through the valve 221 and conduit 837, the latter connections being previously described. The brake 62 is thus engaged, and a low reverse speed drive is provided through the transmission assembly by means of the engaged brakes 18 and 62. No upshifting in the splitter B can occur since there is no pressure supplied to the splitter governor plug 227 to cause such upshifting, the basic governor pressure being blocked, by the neutral valve 183 as above-described. When the valve 221 is positioned in its "H" position, a high reverse speed drive is provided with the brake 18 and the clutch 61 engaged. Line pressure will then be supplied to the clutch piston 75 to cause the engagement of the clutch 61 in the same manner as previously described, when the splitter selector valve was positioned in it "H" position, the connection being from the conduit 838 just mentioned above, the condunit 836, the conduit 896 and the conduit 897. The same pressure is applied to the brake servo 88, so that equal pressure is applied to opposite faces of the pistons 158 and 171, allowing the spring 161 to cause a disengagement of the brake 62.

If the valve 221 is positioned in its "H" or high speed position, a high reverse speed drive is provided with the brake 18 and the clutch 61 engaged. Line pressure will then be supplied from the conduit 897 to cause the engagement of the clutch 61, in the same manner as previously described, when the splitter selector valve was positioned in its "H" or high position.

The modification shown in Figure 2DD provides for lubrication of the transmission and splitter by means of the valves 927 and 928. When the engine is idling, there is insufficient pressure in the system, and the spring 960 will move the valve 928 to the right, so that fluid pressure will not flow to the lubrication duct 946. When the line pressure reaches its normal value of 95 p.s.i., for forward drives, the line pressure in the conduit 337 acts on the valve 928 and moves the valve to the left, so that the fluid pressure in the conduit 337 flows from the port 949, around the groove 957, to the port 948, into the conduit 943, past the restriction 945 with a drop in pressure, to the conduit 946. The movement of the valve 928 is due to the differential areas of the lands 956 and 958, the land 956 being of a greater diameter.

In reverse drive, the fluid pressure flows through the conduit 961, to the port 952 and causes the valve 928 to move to the right, blocking the port 948 and preventing the flow of fluid pressure to the conduit 943 and through the restriction 945. However, the fluid acts on the valve 927, and because of the differential areas of the lands 938 and 939, moves the valve 927 to the left. The spring 942 exerts a force sufficient to overcome forward drive line pressure, but is insufficient with respect to reverse boost pressure, and therefore, the valve 927 moves to the left under the action of reverse boost pressure. Such movement of the valve 927 opens the port 933, so that fluid pressure flows around the groove 940, to the port 933 and into the conduit 943. In the conduit 943, the fluid flows through the restriction 944 to the lubrication conduit 946, the restriction 944 being smaller in diameter than the restriction 945, so that a greater pressure drop occurs to keep the lubrication flow to a predetermined amount even under reverse boost pressure.

The modification shown in dotted lines in Figures 2A, 2B and 2E which involves the addition of the conduit 962 provides a boost of line pressure when the unit A is in first speed drive. This modification may be used when the vehicle engine used is particularly powerful, so that the high reaction on the first speed brake 19 will be sufficient to cause its slippage when starting the vehicle in low speed drive in the unit A. TV pressure flows into the conduit 962 from the TV pressure conduit 538, to the ports 283 and 290. The ports 283 and 290 are both open when the conduit 962 is not used; however, when this conduit is used, it is connected to the port 290, and the port 283 is blocked. The TV pressure in the conduit 962 acts against the plug 294 to move the plug 294, the piston 295 and the piston 285 downwardly; and the pistons 285 and 295 increase the line pressure of the pump 81 in the same manner as for the reverse boost; however, in this case, the output pressure in the conduit 272 is varied with accelerator positions, being at a relatively low value of 95 p.s.i. for a relaxed accelerator position and being at a relatively high value of 135 p.s.i. for full open throttle position. As has been previously explained, the TV pressure in the TV output conduit 538 varies with accelerator position as shown by the curve 966. This variable TV pressure is applied to the piston 294, as just explained, causing the line pressure boosting function of the piston 285 to vary. This provision of a variable boost of line pressure for low speed drive in the unit A assures a smooth engagement of the starting vehicle brake 19 when the selector valve 185 is moved from its neutral into one of its forward drive positions, regardless of the fact that this movement of the valve 185 is made when the accelerator is in some open throttle position. Such a movement of the selector valve 185 is usual, for example, when it is desired to rock the vehicle out of sand or snow. If a fixed high line pressure is used in this case for engagement of the low speed brake 19, the result is a relatively harsh engagement of the starting brake, and the provision of this TV controlled line pressure for the brake 19 softens its engagement, varying it with the accelerator position and therefore with the output torque of the vehicle engine. In lieu of this, a greater servo area for the brake 19 may be used.

Attention is now directed to the second embodiment of the invention which is for use with the four speed unit A without the splitter B, and which is illustrated when Figures 2A, 2D, 3B, 3E and 3G are assembled in the manner shown in Figure 3. For the following description, it will be assumed that the vehicle engine is operating and line pressure is being supplied by the front pump 81 to the hydraulic system in the same manner as described with reference to the embodiment of the invention for the units A and B used together, and which is illustrated in Figures 2A, 2D, 2B, 2E, 2G, 2C, 2F and 2H, being assembled in the manner shown in Figure 2.

Basically, the Figure 3 hydraulic control system is the same as the portion of the Figure 2 embodiment shown in Figures 2A, 2D, 2B, 2E and 2G, except that all conduits leading to the splitter portion of the controls shown in Figures 2C, 2F and 2H are deleted. All of these conduits, with the exception of two conduits, carry fluid pressure from the unit A portion of the controls to the splitter portion of the controls for controlling the latter. The two excepted conduits which carry fluid pressure from the splitter portion of the controls to the unit A portion of the controls are conduit 700 and conduit 654. The conduit 700 carries governor pressure from the splitter portion of the controls to the unit A portion of the controls, and the conduit 654 carries kickdown pressure from the former to the latter. When the unit A is controlled by itself by the Figure 3 controls, it is therefore necessary to connect these two conduits, 700 and 654, to various parts of the Figure 3 controls, so that governor pressure will be supplied to the former and kickdown pressure to the latter, at the proper times for proper control.

The governor conduit 700 has been connected in the Figure 3 embodiment to the basic governor pressure line 368 by the conduit 963. The kickdown conduit 654 in the Figure 2 embodiment supplies kickdown pressure to the conduits 598 and 537, and therefore, in the Figure 3 embodiment, the latter two conduits have been connected to the kickdown supply conduit 440 by means of the branch conduit 964. The connecting governor conduit 963 in the Figure 3 embodiment carries basic governor pressure to the governor plugs 198, 204 and 210 to cause the upshifting of the shift valves 194, 200 and 206, in sequence, as the governor pressure increases. This action is the same as in the Figure 2 embodiment of the controls when the splitter selector valve 221 is positioned in its "H" position, in which the clutch 61 is locked in engagement. The downshifting in the Figure 3 embodiment is likewise the same under decreasing governor and vehicle speeds as the downshifting in the Figure 2 embodiment with the clutch 61 of the splitter in its locked condition.

The kickdown pressure is supplied by means of the connecting kickdown conduit 964 to the plugs 196, 202 and 208 whenever the accelerator is moved to its kickdown position, the same as in the Figure 2 embodiment when the splitter B is permanently held in its high speed drive condition with the selector valve 221 in its "H" position, maintaining the interlock valve 228 in its illustrated position supplying kickdown pressure to the conduit 654.

While we have described our invention in connection with certain specific embodiments thereof, it is to be understood that this is by way of illustration and not by way of limitation and the scope of our invention is defined solely by the appended claims which should be construed as broadly as the prior art will permit.

We claim:

1. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through said first gearing between various drive ratios thereof, said last-named means including a governor driven by said driven shaft and providing an output pressure that varies with changes in driven shaft speed, and means operably connected with said second gearing for providing a governor pressure effective on said drive changing means for one of the drive ratios in said second gearing which is different from said governor pressure which is effective for another drive ratio in said second gearing.

2. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through said first gearing between various drive ratios thereof, said last-named means including a governor driven by said driven shaft and providing an output pressure that varies with changes in driven shaft speed, means operably connected with said second gearing for applying said output governor pressure on said drive changing means when said second gearing is driving in one of its drive ratios, and means for providing a pressure that varies with and is increased with respect to said first-named output governor pressure and which is applied on said drive changing means for another of the drive ratios in said second gearing.

3. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing low and high drive ratios therethrough, means for automatically changing the drive through said first gearing between various drive ratios thereof, said last-named means including a governor driven by said driven shaft and providing an output pressure that varies with changes in driven shaft speed, means for connecting said governor output pressure with said drive changing means for said high speed ratio drive in said second gearing, means for providing a governor varied pressure that is increased with respect to said first-named governor output pressure, and means for connecting said increased governor pressure with said drive changing means for the low drive ratio through said second gearing.

4. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing low and high drive ratios therethrough, means for automatically changing the drive through said first gearing between various drive ratios thereof, said last-named means including a governor driven by said driven shaft and providing an output pressure that varies with changes in driven shaft speed, means for providing a pressure that varies with said governor output pressure and is increased with respect to said governor output pressure, and a selector valve responsive to driving conditions in said second gearing for directly connecting said first-named governor output pressure with said drive changing means in the high speed drive condition of said second gearing and for connecting said increased governor pressure with said drive changing means in the low speed ratio drive condition of said second gearing.

5. In a transmission mechanism, the combination of a drive shaft, a driven shaft, a first power transmitting gearing driven by said prive shaft providing a plurality of drive ratios therethrough, a second power transmitting gearing connected to be driven by said first gearing and to drive said driven shaft and providing low and high drive ratios therethrough, means for automatically changing the drive through said first gearing between various drive ratios thereof, said last-named means including a governor driven by said driven shaft and providing an output pressure that varies with changes in driven shaft speed, means including a regulator valve for providing a pressure that varies with said first-named governor output pressure and is increased with respect to said governor output pressure, means for providing a variation in said increased governor pressure when said increased governor pressure reaches a predetermined value, and a selector valve that is responsive to driving conditions in said second gearing for directly connecting said first-named governor output pressure with said drive changing means in the high speed drive condition of said second gearing and for connecting said increased and varied increased governor pressure with said drive changing means in the low speed ratio drive condition of said second gearing.

6. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through one of said gearings between various drive ratios thereof, said last-named means including a governor driven by one of the rotary elements of the transmission mechanism and providing an output pressure that varies with the speed of said rotary element, and means operably connected with the other one of said gearings for providing a governor pressure effective on said automatic drive changing means for one of the drive ratios in said last-named gearing which is different with respect to a governor pressure effective for another drive ratio in said last-named gearing.

7. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and to provide a plurality of different drive ratios therethrough, means for automatically changing the drive through said second gearing between various drive ratios thereof, said last-named means including a governor driven by one of said shafts and providing an output pressure that varies with changes in shaft speed, and means operably connected with said first gearing for providing a governor pressure effective on said drive changing means for one of the drive ratios in said first gearing which is different with respect to a governor pressure effective for another drive ratio in said first gearing.

8. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and to provide a plurality of different drive ratios therethrough, means for automatically changing the drive through said second gearing between various drive ratios thereof, said last-named means including a governor driven by one of said shafts and providing an output pressure that varies with changes in driven shaft speed for causing a ratio change on variation of the governor pressure, a selector element for setting said first gearing into various of its drive ratios, means under the control of said element for providing a governor pressure varying with said first-named governor pressure and effective on said drive changing means for one of the drive ratios in said first gearing and which is different with respect to said first-named governor pressure effective for another drive ratio in said first gearing.

9. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through said second gearing between different drive ratios thereof, said last-named means including a governor driven by said driven shaft and providing an output pressure that varies with changes in driven shaft speed for causing a ratio change on variation of governor pressure, a selector element for setting said first gearing into various of its drive ratios, and means for providing a governor pressure under the control of said governor which pressure is different than said first-named output governor pressure, and means under the control of said selector element for connecting said first-named output governor pressure or said second-named governor pressure with said automatic drive changing means for control of the latter depending on the position of said selector element.

10. In a transmission mechanism, the combination of a drive shaft, a driven shaft, a first power transmitting gearing driven by said drive shaft providing three drive ratios therethrough, a second power transmitting gearing connected to be driven by said first gearing and providing a plurality of different drive ratios therethrough, means for automatically changing the drive through said second gearing between various drive ratios thereof, said last-named means including a governor driven by said driven shaft and providing an output pressure that varies with changes in driven shaft speed for causing a ratio change on variation of governor pressure, a selector element for causing completion of the various drives through said first gearing, means providing a governor pressure which varies with governor speed and is greater than said first-named governor output pressure, means providing a governor pressure regulated by said governor which varies with governor speed and is less than said first-named governor output pressure, and means responsive to the positioning of said selector element in its various drive ratio positions for alternatively connecting said first-named output governor pressure or said changed governor pressures with said automatic drive changing means depending on the positioning of said selector element.

11. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a low and a high speed ratio therethrough, means for automatically upshifting said first gearing from lower to higher speed ratio drives, means for automatically changing the drive through said second gearing between its said low and high drive ratios, said automatic means including a governor driven by said driven shaft and providing an output pressure that varies with changes in driven shaft speed for causing ratio changes on a variation of governor output pressure, a control element for said first gearing having a plurality of different positions in each of which it limits the upshifting action by said first-named automatic drive changing means to certain different speed ratios of said first gearing when the control element is put in different positions, means for providing governor pressures that are different from said first-named governor output pressure and that vary with the speed of said governor, and means under the control of said control element for alternatively connecting said various governor pressures with said second-named automatic drive changing means for causing said second gearing to upshift at different speeds of said driven shaft in accordance with the different setting of said control element.

12. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a low and high speed ratio therethrough, means for automatically upshifting said first gearing from lower to higher speed ratio drives, means for automatically changing the drive through said second gearing between its said low and high drive ratios, automatic means including a governor driven by said driven shaft and providing an output pressure that varies with changes in said driven shaft speed for causing ratio changes on a variation of governor output pressure, a source of fluid pressure for energizing the drive completing means in said gearings, a control valve for said first gearing connected with said pressure source having a plurality of different positions in which it limits the upshifting action by said first-named automatic drive changing means to certain different speed ratios of said first gearing when the control valve is put in different positions, regulating valves under the control of said first-named governor pressure for providing governor pressures that are different from said first-named governor pressure, selector valves for controlling said last-named means so as to cause application of the different governor pressures upon said second automatic drive changing means, and means connecting said selector valves with said said control valve so as to render said different selector valves operable for changing the governor pressure that is applied on said second automatic driving changing means with different positions of said control valve.

13. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically changing the drive through said first gearing between various drive ratios thereof, means for automatically changing the drive through said second gearing between various drive ratios thereof, a control element for controlling said first automatic drive changing means so that said first gearing is automatically upshifted from lower to different ones of higher speed ratios depending on the positioning of said control element, and a control element for said second automatic means having a position in which it causes automatic upshifting from a lower to higher speed ratio in second gearing and having two other positions in which it respectively causes said second gearing to remain in its lower and higher speed ratios.

14. In a transmission mechanism, the combination of a drive shaft, a driven shaft, a first power transmitting gearing driven by said drive shaft providing a plurality of drive ratios therethrough, a second power transmitting gearing connected to be driven by said first gearing and adapted to drive said driven shaft and providing a plurality of different drive ratios therethrough, first control means for automatically upshifting said first gearing from lower to higher speed ratios, and second control means for automatically upshifting said second gearing from lower to higher speed ratios, said two last-named control means including a governor driven by a rotatable part of the transmission mechanism tending to cause the upshifting in both of said gearings as the speed of said rotatable part increases, said last named means also including a device for limiting the effectiveness of said governor so that said second control means operates to upshift said second gearing after said first control means has shifted said first gearing to its highest speed ratio.

15. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a relatively low and a relatively high ratio therethrough, means for automatically upshifting the drive through said first gearing from lower to higher speed ratios, means for automatically upshifting said second gearing from its lower to its higher speed ratios, said automatic means including a governor driven by said driven shaft tending to cause said automatic means to upshift in speed ratio as the speed of said driven shaft increases, said first automatic means including a control element positionable in a plurality of different positions in each of which it limits the upshifting action by said first-named automatic means to different predetermined higher speed ratios, said second-named automatic means being so constructed and arranged that all of the upshifting action of said first-named automatic means occurs prior to any upshifting action of said second-named automatic means, and means under the control of said control element for causing said second-named automatic means to upshift said second gearing at higher speeds of said driven shaft as said control element is moved into its higher speed ratio positions.

16. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing relatively low and high drive ratios therethrough, means for automatically upshifting and downshifting said first gearing between relatively low and relatively high speed ratios, means for automatically upshifting said second gearing from its said low to its said high drive ratio, said two last-named means including a governor driven by a rotatable part of the transmission mechanism which causes upshifting action of said automatic means on increasing governor speeds and a downshifting action of said first-named automatic means on decreasing governor speeds, said automatic means being so constructed and arranged that said first-named automatic means is operable to complete its upshifting action and said second automatic means is subsequently effective to upshift said second-named gearing, and means for maintaining said second gearing in its high speed ratio drive as said first automatic means under decreasing governor speeds functions to downshift said first gearing to the lower speed ratio drives.

17. In a transmission mechanism, the combination of a drive shaft, a driven shaft, a first power transmitting gearing driven by said drive shaft providing a plurality of drive ratios therethrough, a second power transmitting gearing connected to be driven by said first gearing and to drive said driven shaft and providing a relatively low and high drive ratio therethrough, means for automatically upshifting and downshifting said first gearing between relatively low and relatively high speed ratios, means for automatically upshifting and downshifting said second gearing between its said low and high speed ratios, said two last-named means including a governor driven by said driven shaft which causes upshifting action of said automatic means on increasing governor speeds and downshifting action of said automatic means on decreasing governor speeds, said automatic means being so constructed and arranged that said first-named automatic means is operative to complete its upshifting action and said second automatic means is subsequently effective to upshift said second gearing, an interlock mechanism effectively connecting said two automatic means for maintaining said second gearing in its said high speed ratio until said first gearing is fully downshifted under the action of said governor to its lowest speed ratio and then causing downshifting of said second gearing to its low speed ratio.

18. In a transmission mechanism for an automotive vehicle having a throttle controlled driving engine, the combination of an accelerator for the driving engine, a drive shaft, a driven shaft, a first power transmitting gearing driven by said drive shaft providing a plurality of drive ratios therethrough, a second power transmitting gearing connected to be driven by said first gearing and to drive said driven shaft and providing relative low and high drive ratios therethrough, means for automatically upshifting and downshifting said first gearing between relatively low and relatively high speed ratios, means for automatically upshifting and downshifting said second gearing between its said low and high speed ratios, said automatic means each including a shift valve for changes between consecutive speed ratios, a hydraulic governor driven by said driven shaft and providing a fluid pressure effective on said shift valves tending to move them in an upshifting direction and means under the control of said accelerator for providing a fluid throttle pressure that increases with engine throttle opening effective on said valves tending to move them in the opposite direction, said automatic means being so constructed and arranged that said first-named automatic means is operative to complete its upshifting action and said second automatic means is subsequently effective to upshift said second-named gearing, the shift valve in said first-named automatic means which is effective for completing a low speed ratio through said first gearing when the valve is in its downshifted position having a land for blocking said throttle pressure from said shift valve for said second gearing when the valve for said first gearing is in its upshifted position so that said shift valve for said second gearing functions to be moved by said throttle pressure in a downshifting direction only after said first automatic means downshifts said first gearing to its low speed ratio.

19. In a transmission mechanism for an automotive vehicle having a driving engine with a throttle, the combination of an accelerator for controlling the engine throttle, a drive shaft, a driven shaft, a first power transmitting gearing driven by said drive shaft providing a plurality of drive ratios therethrough, a second power transmitting gearing connected to be driven by said first gearing and to drive said driven shaft and providing relatively low and high drive ratios therethrough, means for automatically upshifting said first gearing from a relatively low speed ratio to a relatively high speed ratio, means for subsequently automatically upshifting said second gearing, means under the control of said accelerator for downshifting said first and second gearings from their respective high speed ratios to their low speed ratios and an interlock mechanism for rendering said accelerator control means ineffective on said first-named automatic means for said first gearing until after said second gearing has been downshifted under the control of said accelerator.

20. In a transmission mechanism for an automotive vehicle having a driving engine with a throttle, the combination of an accelerator for controlling the engine throttle, a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically upshifting said first gearing from a relatively low speed ratio drive to a relatively high speed ratio drive, means for subsequently automatically upshifting the drive through said second gearing from a relatively low ratio speed drive to a relatively high ratio drive, means under the control of said accelerator for downshifting said gearings when the accelerator is moved to an open throttle kickdown position and including a fluid pressure supply and a valve providing a fluid pressure to said automatic means when the accelerator is moved to its open throttle kickdown position, and an interlock valve under the control of said second-named automatic means for preventing the application of said fluid pressure to said first-named automatic means when said second gearing is driving in a relatively high speed ratio.

21. In a transmission for an automotive vehicle having a driving engine with a throttle, the combination of an accelerator for controlling the engine throttle, a drive shaft, a driven shaft, a first power transmitting gearing driven by said drive shaft providing a plurality of drive ratios therethrough, a second power transmitting gearing connected to be driven by said first gearing and to drive said driven shaft and providing a plurality of different drive ratios therethrough, means for automatically upshifting said first gearing between relatively low and high speed ratios, means for automatically upshifting the drive through said second gearing between relatively low and high speed ratios thereof, each of said two last-named means including a shift valve movable between upshifted and downshifted positions, a hydraulic governor driven by said driven shaft for applying fluid pressure to said valves tending to move them from their downshifted to their upshifted positions as the speed of said driven shaft increases and valve means under the control of said accelerator for supplying fluid pressure to said first-named valves tending to move them from their upshifted positions to their downshifted positions, and an interlock valve under the control of said shift valve for said second gearing for blocking application of fluid pressure under the control of said accelerator to said shift valve for said first gearing until said shift valve for said second gearing is in its downshifted position.

22. In a transmission for an automotive vehicle having a driving engine with a throttle, the combination of an accelerator for controlling the engine throttle, a drive shaft, a driven shaft, means for providing a low speed drive between said shafts adapted for starting the vehicle from rest, means for providing a relatively high speed drive between said shafts which may be completed in lieu of said low speed drive when the vehicle is moving, said drive providing means each including a fluid pressure engaged friction engaging device for completing the respective drives, means for providing a fluid pressure of a certain fixed value, means for providing a fluid pressure under the control of said accelerator which increases with engine throttle opening, means for connecting said fixed fluid pressure with said low speed drive completing device for starting the vehicle and valve means for causing disengagement of said last-named friction engaging device and for applying said throttle variable pressure to said friction device for said high speed drive for engaging said latter device.

23. In a transmission for an automotive vehicle having a driving engine with a throttle, the combination of an accelerator for controlling the engine throttle, a drive shaft, a driven shaft, means for providing a low speed drive between said shafts adapted for starting the vehicle from rest, means for providing a high speed drive between said shafts which may be completed in lieu of said low speed drive when the vehicle is moving, each of said drive providing means including a friction engaging device for completing the respective drive, a piston for applying each of said friction devices, means for providing a fixed fluid pressure, means for providing a fluid pressure under the control of said accelerator which increases with engine throttle opening, valve means for applying said fixed pressure to the piston for said low speed friction device for starting the vehicle, valve means for supplying said variable pressure to the piston for said other friction device engaging the latter to complete the high speed drive and for supplying said variable pressure to the piston for said low speed friction device tending to disengage the latter device, and valve means effective for changing the fixed pressure applied to the piston for said first engaging device to the variable pressure when said variable pressure is applied to said second device whereby for causing disengagement of said first friction device.

24. In a transmission mechanism, the combination of a drive shaft, a driven shaft, a power transmitting gearing for driving said driven shaft at a plurality of drive ratios therethrough, a plurality of means for upshifting said gearing each being effective for a shift from a certain relatively low ratio to a certain relatively high speed ratio and each of said means including a shift valve having a low and a high speed position, a hydraulic governor driven by said driven shaft for applying hydraulic governor pressure on said shift valves that increases with the speed of said driven shaft for causing an upshifting movement of the shift valves from their low speed positions to their high speed positions, each of said shift valves having a pilot valve which when actuated blocks the governor pressure with respect to the corresponding shift valve, and selector valve means for selectively applying pressure on one or more of said pilot valves simultaneously for putting the corresponding shift valves out of action to upshift.

25. In a transmission mechanism, the combination of a drive shaft, a driven shaft, a power transmitting gearing providing a plurality of forward drive ratios and a reverse drive between said drive and driven shafts, means for automatically upshifting said gearing from a relatively low forward ratio to a relatively high forward ratio, said means including a hydraulic governor driven by a rotatable part of the transmission mechanism and providing a governor pressure that increases with the speed of said rotatable part to cause an upshift with such increase in governor pressure, a selector valve for conditioning said gearing for its forward or reverse drives, and another selector valve under the control of said first-named selector valve for effectively disconnecting said governor with respect to said automatic means when said first-named selector valve is moved into its reverse drive position.

26. In a transmission mechanism, the combination of a drive shaft, a driven shaft, a power transmitting gearing driven by said drive shaft and providing a low and an intermediate and a high speed drive between said shafts, means for automatically upshifting said gearing from said low to said intermediate speed drive and including a shift valve having an upshifted and downshifted position, means for automatically upshifting said gearing from said intermediate to said high speed drives and including a second shift valve having an upshifted and downshifted position, a hydraulic governor driven by said driven shaft for providing a governor pressure that increases with driven shaft speed and which is applied on said shift valves tending to move them into their upshifted positions, and means for holding said valves selectively in their downshifted positions and including a manually operated selector valve for selectively applying fluid pressure either on said second shift valve alone or on both of said shift valves and acting against said governor pressure, depending on the position of said selector lever.

27. In a transmission mechanism, the combination of a drive shaft, a driven shaft, a power transmitting gearing driven by said drive shaft and providing a low and an intermediate and high speed drive between said shafts, means for automatically upshifting said gearing from said low to said intermediate speed drive and including a shift valve having an upshifted and downshifted position, means for automatically upshifting said gearing from said intermediate to said high speed drives and including a second shift valve having an upshifted and downshifted position, a hydraulic governor driven by said driven shaft for providing a governor pressure that increases with driven shaft speed and which is applied on said shift valves tending to move them into their upshifted positions, and means for holding said valves selectively in their downshifted positions and including a manually operated selector valve for selectively applying fluid pressure either on said second shift valve alone or on both of said shift valves and acting against said governor pressure, depending on the position of said selector lever, and a pilot valve for each of said shift valves and each subject to the fluid pressure from said selector valve applied to the respective shift valves for blocking governor pressure application on the respective shift valves while fluid pressure from said selector valve is applied on the respective shift valves.

28. In a transmission mechanism, the combination of a drive shaft, a driven shaft, a power transmitting gearing driven by said drive shaft and providing a forward drive and a reverse drive therethrough, each of said drives including a fluid pressure operated device for completing the drive with the device for the reverse drive requiring a higher pressure than that for the forward drive, a source of fluid pressure for said drive completing devices, means for regulating the pressure of said system and including a regulating valve having a fluid pressure applied thereto for the reverse drive for regulating the pressure in the system to the higher pressure for the reverse drive, said transmission including a device requiring fluid supplied thereto for operation, a conduit including a restriction connecting said pressure source and said last-named device, a valve for blocking said restriction and subject to the fluid pressure applied to said regulating valve for blocking said restriction for the reverse drive, a conduit including a second restriction of smaller cross-sectional area, and a second valve subject to the fluid pressure applied to said reverse drive providing device and opening said last-named conduit including said restriction of smaller cross-sectional area to said device requiring fluid when the pressure in said fluid system is increased for the reverse drive.

29. In a transmission mechanism, the combination of a drive shaft, a driven shaft, a power transmitting gearing providing a plurality of forward drive ratios and a reverse drive between said drive and driven shafts, means for automatically upshifting said gearing from a relatively low forward ratio to a relatively high forward ratio, said means including a hydraulic governor driven by a rotatable part of the transmission mechanism and providing a governor pressure that increases with the speed of said rotatable part, a selector valve for conditioning said gearing for its forward or reverse drives, and means under the control of said selector valve for providing a pressure substantially the same as said governor pressure and which increases in the same manner as said governor pressure to cause an upshift with said increase, said last-named means being rendered ineffective for providing its said pressure when said selector valve is moved into its reverse drive position.

30. In a transmission mechanism, a combination of a drive shaft, a driven shaft, a power transmitting gearing providing a plurality of forward drive ratios and a reverse drive between said drive and driven shafts, means for automatically upshifting said gearing from a relatively low forward ratio to a relatively high forward ratio, said means including a hydraulic governor driven by said driven shaft and including a regulating valve providing a governor pressure that increases with the speed of said driven shaft, a selector valve for conditioning said gearing for its forward or reverse drives, and a second regulating valve providing a pressure which is substantially the same and which increases in the same manner as said governor pressure to cause an upshift with said increase, said second regulating valve regulating a pressure supplied thereto by said selector valve by means of said governor pressure, said second regulating valve being rendered ineffective for providing its said pressure when said selector valve is moved into its reverse drive position.

References Cited in the file of this patent

UNITED STATES PATENTS

| | | |
|---|---|---|
| 2,595,969 | McFarland | May 6, 1952 |
| 2,640,373 | Jandasek | June 2, 1953 |
| 2,667,085 | Ackerman | Jan. 26, 1954 |
| 2,711,656 | Smirl | June 28, 1955 |
| 2,713,273 | Ebsworth | July 19, 1955 |

Notice of Adverse Decision in Interference

In Interference No. 91,916 involving Patent No. 2,926,543, J. W. Holdeman and S. Dabich, Transmission controls, final decision adverse to the patentees was rendered June 5, 1963, as to claims 1, 2 and 6.

[*Official Gazette August 20, 1963.*]

Disclaimer 2,926,543.—*John W. Holdeman* and *Sam Dabich*, Detroit, Mich. TRANSMISSION CONTROLS. Patent dated Mar. 1, 1960. Disclaimer filed Aug. 26, 1964, by the assignee, *Borg-Warner Corporation*.

Hereby enters this disclaimer to claims 3, 14, 18, 19 and 25 of said patent.
[*Official Gazette December 1, 1964.*]